(12) United States Patent
Okada

(10) Patent No.: US 7,145,587 B2
(45) Date of Patent: Dec. 5, 2006

(54) THERMAL DEVELOPMENT APPARATUS

(75) Inventor: Koichi Okada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 217 days.

(21) Appl. No.: 10/926,449

(22) Filed: Aug. 26, 2004

(65) Prior Publication Data

US 2005/0052629 A1   Mar. 10, 2005

(30) Foreign Application Priority Data

Aug. 29, 2003  (JP)  ............ P. 2003-307808
Jul. 2, 2004   (JP)  ............ P. 2004-197083

(51) Int. Cl.
    *G03D 13/00*   (2006.01)
(52) U.S. Cl. .................... 347/228; 430/351
(58) Field of Classification Search .......... 347/228; 430/350, 351
    See application file for complete search history.

(56) References Cited

U.S. PATENT DOCUMENTS 6,335,153 B1 * 1/2002 Toya .................... 430/350
6,784,911 B1 * 8/2004 Umeki et al. ........... 347/228
6,911,994 B1 * 6/2005 Sumi et al. ............. 347/228
2003/0118926 A1 * 6/2003 Sumi et al. ............. 430/30
2004/0152023 A1 * 8/2004 Okutsu et al. .......... 430/350
2005/0058954 A1 * 3/2005 Okada .................. 430/348

FOREIGN PATENT DOCUMENTS

JP         2003-285455 A     10/2003

* cited by examiner

Primary Examiner—Huan Tran
(74) Attorney, Agent, or Firm—Sughrue Mion, PLLC

(57) ABSTRACT

A thermal development apparatus comprises: a photothermographic recording material feed section that contains a supply tray in the photothermographic recording material feed section, the supply tray being for containing a photothermographic recording material; an exposure section that subjects the photothermographic recording material to exposure; a first conveyance section that conveys the photothermographic recording material from the supply tray to the exposure section; a thermal development section that effects thermal development of the photothermographic recording material; a second conveyance section that conveys the photothermographic recording material from the exposure section to the thermal development section; a cassette storage section that contains a cassette, the cassette being for containing a double-sided photothermographic recording material having image forming layers on both sides of the double-sided photothermographic recording material; and a third conveyance section that conveys the double-sided photothermographic recording material from the cassette to the first conveyance section.

10 Claims, 8 Drawing Sheets

THERMAL DEVELOPMENT APPARATUS

BACKGROUND OF THE INVENTION

1. Field of the Invention

The present invention relates to an improvement of a thermal development apparatus for exposing to laser beams or the like a photothermographic material using a dry material. More particularly, the invention relates to a thermal development apparatus which can develop dual-sided photosensitive films.

2. Description of the Related Art

An image recording apparatus for recording images for medical use such as a digital radiography system, CT, or MR (Magnetic Resonance) using a heat-accumulating phosphor sheet employs a wet system. In a wet system, a reproduction image which has been photographed or recorded on a silver salt photographing photosensitive material is obtained through wet processing.

In contrast, recent efforts have focused on a recording apparatus that employs a dry system rather than a wet process. Such a recording apparatus uses a film of photosensitive and/or thermal-sensitive photothermographic material or thermal-development recording material (hereinafter referred to as photothermographic material). In a dry system recording apparatus, a photothermographic material is irradiated (scanned) with a laser beam to form a latent image in an image exposure section, brought into contact with heating means to undergo thermal development in a thermal development section, and discharged out of the apparatus.

Such a dry system is advantageous in that image formation is completed in a shorter time than in a wet system and that the issue of waste liquid disposal is not involved, and demand for a dry system is expected to increase.

The Japanese applicant has previously filed several applications on thermal development apparatus such as that shown in FIG. 4 (see, for example, JP-A-2003-285455) with Japanese Patent Office.

A thermal development apparatus of the related art will be described hereinafter with reference to FIGS. 4 to 8.

FIG. 4 shows a schematic structural view of a thermal development apparatus 100 having mounted therein an image forming apparatus 1 of the related art. The thermal development apparatus 100 is an apparatus which uses a photothermographic material which does not require a wet photo-development process, and forms a latent image on the photothermographic material by means of scanning exposure with a laser light beam, and thereafter effects thermal development to obtain a visible image, followed by slow cooling and cooling to room temperature.

The basic components of the thermal development apparatus 100 are a photothermographic recording material feed section A, an image exposure section (corresponding to the image forming apparatus 1) B, a thermal development section C, a slow cooling section D, and a cooling section E, in the sequence of a photothermographic material path. The thermal development apparatus 100 is also provided with delivery means located at important points between the sections, which deliver the photothermographic material, and with a power/control section F for driving/controlling each section. The power/control section F is provided with a CPU, whereby various controls (exposure control, running speed control, and others) can be operated.

The thermal development apparatus 100 is arranged such that: the power/control section F is disposed on the bottommost portion thereof; the photothermographic recording material feed section A is disposed on the power/control section F; and the image exposure section B, the thermal development section C, the slow cooling section D, and a cooling section E are disposed on the thermographic material feed section A, wherein the image exposure section B and the thermal development section C are located close to each other.

According to the configuration, the exposure and thermal development processing can be carried out within a short conveyance distance so as to minimize the transport path of the photothermographic material and shorten the required time to output one cut sheet. Furthermore, one cut sheet of the photothermographic material can be subjected to the steps of exposure and thermal development simultaneously.

The photothermographic material to be used may be a photothermographic material or a photo-thermal sensitive recording material. The photothermographic material is a photosensitive material which records (exposes) an image with a light beam (e.g., a laser beam), and the colors thereof are developed by thermal development. Meanwhile, the photo-thermal sensitive recording material is a photosensitive material which records image with a light beam, and the colors thereof are developed by thermal development, or the colors thereof are developed simultaneously with image recording by a heat mode (heat) of the laser beam, followed by color fixation with light radiation.

The photothermographic recording material feed section A is a section in which a photothermographic material is picked up from a supply tray one cut sheet at a time and fed downstream to the image exposure section B, and the feed section A comprises: three loading sections 10a, 10b, and 10c; three feed roller pairs 13a, 13b, and 13c which are provided to the respective feed sections; and a delivery roller and delivery guides, which are not shown. Specifically, inside the loading sections 10a, 10b, and 10c, which are provided in a triple-stacking structure, supply trays 15a, 15b, and 15c are inserted. In the supply trays, photothermographic materials of different sizes (e.g., B4 size, a double-legal size (356 by 432 mm)) are contained so that a size and an orientation of a material can be selected from those contained in respective trays.

The photothermographic material, manufactured in a sheet form, is usually available in the form of a stack of a prescribed number (e.g., 100) of cut sheets, packaged in a bag or with a band. The packages are housed in the respective supply trays and loaded in respective layers of the photothermographic recording material feed section A.

FIG. 5 is a enlarged cross-sectional view of driving rollers, including their vicinity, which convey a photothermographic material 5 supplied from the photothermographic recording material feed section A to the image exposure section B.

A driving roller 21 receives a driving force via transmission means such as gears or belts from an unillustrated driving means such as a motor, thereby rotating clockwise in FIG. 5. A driving roller 22, having the same structure as the driving roller 21, is provided at the boundary between a sloped portion 26 and an abutting section 29, for the purpose of discharging the photothermographic material 5.

An example of the driving roller 21 is described in detail below. The driving roller 21 is disposed so as to oppose a bent portion 31 which is a boundary between the abutting section 29 and a sloped portion 25. As shown in FIG. 5B, which shows a enlarged schematic side view of a portion of FIG. 5A, the driving roller 21 is preferably disposed in the range where a straight line M, which passes through the bent portion 31 (the point where the angle changes) of a guide plate 23 and bisects the inner angle (180°-φ) of the guide plate, contacts the outer periphery of the driving roller 21. Note that no particular limitation is imposed on the relationship between the diameter of the driving roller 21 and the length of the guide plate 23.

A predetermined gap G is formed between the peripheral surface of the driving roller 21 and the guide plate 23. This gap G is preferably equal to 10 times a thickness "t" of the photothermographic material 5 ($t \leq G \leq 10t$).

In the above structure of a conveying section for the sub-scanning direction 17, when the photothermographic material 3 enters from the leading end of the sloped portion 25, the leading end of the photothermographic material 3 enters into the region between the guide plate 23 and the driving roller 21. In this process, because the abutting section 29 of the guide plate 23 and the sloped portion 25 are bent to form a predetermined angle φ, when the photothermographic material 3 moves from the sloped portion 25 to the abutting section 29, the photothermographic material 3 is flexed. This flexure imparts an elastic repulsion onto the photothermographic material 3 itself. In response to this elastic repulsion, a predetermined frictional force arises between the photothermographic material 3 and the driving roller 21, and the conveying driving force is reliably transmitted from the driving roller 21 to the photothermographic material 3. Consequently, the photothermographic material 3 is conveyed.

The gap G between the driving roller 21 which is driven clockwise and the guide plate 23 is set within the range of t to 10t (t is the thickness of the photothermographic material 3). Therefore, when the photothermographic material 3 enters between the guide plate 23 and the driving roller 21, the conveyance of the photothermographic material 3 is not affected by vibration or the like of the driving roller 21 due to an external disturbance. In other words, when an external disturbance arises, it is absorbed by an elastic force (displacement in the direction of thickness) of the photothermographic material 3 and does not affect conveyance.

With the presence of the sloped portion 26 and the driving roller 22, even at a discharging of the photothermographic material 3 from the guide plate 23, bending of the photothermographic material 3 produces an elastic repulsion, whereby a predetermined frictional force arises between the photothermographic material 3 and the driving roller 22, and the photothermographic material 3 is reliably conveyed.

Also, the photothermographic material 3 is pressed onto the abutting section 29, which suppresses fluttering of the photothermographic material 3 up from the conveying surface. In other words, vertical fluttering is suppressed. When a laser beam is irradiated onto the photothermographic material 3 between the driving rollers, a satisfactory recording free from exposure displacement can be obtained.

The image exposure section B scans the photothermographic material conveyed from the photothermographic recording material feed section A, with a light beam L in the main scanning direction. It also conveys the photothermographic material in the sub-scanning direction (i.e., the conveying direction) perpendicular to the main scan direction, thereby recording a desired image on the photothermographic material to form a latent image.

Next, the image exposure section B will be described.

FIG. 6 shows the image exposure section B, wherein 1 denotes an image forming apparatus of the related art, 2 denotes a semiconductor laser, and 5 denotes a photosensitive material. A light beam 111 emitted from the semiconductor laser 2 is collimated by a collimator lens 112, and subsequently impinges upon a polygon mirror 113, which serves as main scanning means. The light beam 111 is reflected and deflected by the polygon mirror 113 in the direction indicated by arrow A, and subsequently the laser beam 111 passes through a scanning lens 114, which is generally constituted of an fθ lens, and scans the photosensitive material 5 in a main scanning direction, indicated by arrow X. The photosensitive material 5 is conveyed at a predetermined speed by a driving roller 116 serving as sub-scanning means in the direction indicated by arrow Y, which is perpendicular to the main scanning direction X. As described above, the photosensitive material 5 can be scanned by the light beam 111 in the main scanning and sub-scanning directions.

Meanwhile, a digital image signal D is subjected to a gradation correction process in accordance with a gradation correction table in a gradation correction device 120 and fed into a D/A converter 121, wherein the digital image signal D is converted into an analog image signal S. The image signal S is amplified by a variable gain amplifier 122 and is then fed into a third switch 123. The third switch 123 is switched by a control circuit 124, and when the third switch 123 is in a closed position, the image signal S is fed into a semiconductor laser drive circuit 125 as a modulating signal. The semiconductor laser driving circuit 125 drives the semiconductor laser 2, and when the image signal S is fed into the semiconductor laser driving circuit 125, the semiconductor laser 2 is directly modulated in accordance with the image signal S. As described above, the intensity of the light beam 111 is modulated on the basis of the image data D, and the image carried by the image data D is recorded as a photographic latent image on the photosensitive material 5. Thereafter, the photosensitive material 5 is subjected to a thermal development process to obtain a visible image from the latent image.

The semiconductor laser drive circuit 125 is connected to a first driving signal generator 132 via a first switch 130 and to a second driving signal generator 133 via a second switch 131. These signal generators 132 and 133 respectively generate a first fixed-level driving signal S1 and a second fixed-level driving signal S2, which respectively drive the semiconductor laser 2 at predetermined outputs. The switching of the first switch 130 and that of the second switch 131 are controlled by the control circuit 124.

Meanwhile, at a position outside of the effective main scanning region of the light beam 111 with respect to the photosensitive material 5, there is provided a main scanning start point detecting sensor 134, comprising a photodiode for detecting the laser beam 111 or the like. Inside the scanning line, a leading end detecting sensor 135 is provided. The leading end detecting sensor 135 allows the laser beam 111, which is located within the effective main scanning region, to receive a beam. The leading end detecting sensor 135 may comprise a photodiode or the like. Output signals P1 and P2 generated by the main scanning start point detecting sensor 134 and the leading end detecting sensor 135, respectively, are input to the control circuit 124.

When the photosensitive material 5 is conveyed by the driving roller 116 in the direction indicated by the arrow Y and the leading end of the photosensitive material 5 reaches the position indicated by the arrow B, the control circuit 124 detects this state by means of, for example, predetermined sequence control. Upon this detection, the control circuit 124 starts controlling the opening and closing operations of the first switch 130 and the second switch 131. Specifically, during the main scanning period, in which the light beam 111 impinges upon the vicinity of the main-scanning start point detecting sensor 134, the first switch 130 is set to a close position, and the second switch 131 is set to an open position. During the effective main scanning period, in which the light beam 111 is capable of scanning the photosensitive material 5, the first switch 130 is set to the open position, and the second switch 131 is set to the close position.

During the main scanning period, in which the light beam 111 impinges upon the vicinity of the main-scanning start point detection sensor 134, the first fixed-level driving signal S1 is input to the semiconductor laser driving circuit 125. The semiconductor laser 2 is thereby caused to emit the light beam 111 with a first predetermined intensity level L1.

Also, during the effective main scanning period, the second fixed-level driving signal S2 is input to the semiconductor laser driving circuit 125, and the semiconductor laser 2 is thereby caused to emit the light beam 111 with a second predetermined intensity level L2.

In addition, controlling the opening and closing operations of the first switch 130 and the second switch 131 in a manner approximately synchronized with the main scanning of the light beam 111 can be achieved by having the polygon mirror drive circuit 113 input a polygon mirror rotation angle signal R to the control circuit 124, or by other means.

When the light beam 111 from the semiconductor laser 2 is received, the main-scanning start point detection sensor 134 generates the output signal P1. The leading end detection sensor 135 generates the output signal P2, such as that shown in FIG. 6. During the main scanning period, in which the light beam 111 impinges upon the vicinity of the main-scanning start point detection sensor 134, the intensity of the light beam 111 is set at the first level L1, which is comparatively high. Therefore, the output signal P1 produced by the main-scanning start point detection sensor 134 upon detection of the light beam 111 rises with a clear waveform. Accordingly, in the control circuit 124, a horizontal synchronizing signal Hsync, which indicates that the light beam 111 has passed through the predetermined main-scanning start point, can be generated by, for example, shaping the waveform of the output signal P1.

When the photosensitive material 5 is further conveyed and its leading end reaches the position exposed to the light beam 111, the light beam 111, which has been set to enter the leading end detection sensor 135, is blocked by the leading end of the photosensitive material 5. As a result, a pulsed waveform, which has been generated as a result of the light beam detection, disappears from the output signal P2 of the leading end detection sensor 135. The control circuit 124 detects the disappearance of the pulsed waveform. Thereafter, during the effective main scanning period in which the second switch 131 has been closed, the control circuit 124 opens the second switch 131 and closes the third switch 123. During the effective main scanning period, the image signal S is input to the semiconductor laser driving circuit 125, and the semiconductor laser 2 emits the light beam 111 which has been modulated in accordance with the image signal S, thereby subjecting the photosensitive material 5 to image recording.

In this case, the input timing of the image signal S to the semiconductor laser driving circuit 125 is synchronized with the main scanning of the light beam 111, by means of inputting a pixel clock signal synchronized with a horizontal sync signal Hsync produced by the control circuit 124 in accordance with the signal P1 output from the main-scanning start point detection sensor 134 is inputted to a digital-to-analog converter 121, to thus control a timing at which the digital image data D are to be subjected to digital-to-analog conversion.

As described above, when the photosensitive material 5 conveyed in the direction indicated by the arrow Y reaches a position where the leading end thereof is exposed to the light beam 111, the light beam 111, which has been set to enter the leading end detection sensor 135, is blocked by the leading end of the photosensitive material 5. As a result, the pulsed waveform, which has been generated in response to the laser beam detection, disappears. In this process, because the permeability of the photosensitive material 5 is lowered by addition of sensitized material, the light beam 111 can be reliably blocked.

The thermal development section C effects thermal development by means of performing thermal treatment of the post-scan photothermographic material 5 while conveying the same. The thermal development section C has such a structure that a plurality of plate heaters 51a, 51b, and 51c, which are arranged in series in the conveying direction of the photothermographic material and serve as a heating member with a required heating capability for processing the photothermographic material 5, are curved and are arranged so as to form a serial circular arc.

More specifically, the thermal development section C including the plate heaters 51a, 51b, and 51c has a structure that, as shown in FIG. 4, each plate heater is provided with a concave surface, causing the photothermographic material 5 to come in contact with the concave surface of the plate heater and sliding the photothermographic material in relation to the plate heaters. As conveying means of the photothermographic material 5, there are provided a feeding roller 53 and a plurality of pressing rollers 55, which also serve to transfer heat from each plate heater to the thermal development recording material. The pressing rollers 55 are in contact with the peripheral surface of a rotating disk 52, and are driven by the rotation of the rotating disk 52. As the press rollers 55, metal rollers, resin rollers, rubber rollers, or the like can be used. According to the configuration described above, the photothermographic material 5 is pressed against the plate heaters 51a, 5b, and 51c while being conveyed. Consequently, buckling of the photothermographic material 5 can be prevented. At the downstream end of the photothermographic material 5 path inside the thermal development section C, there is provided a discharge roller 57 for transferring the photothermographic material.

FIG. 7 is an explanatory diagram showing the layer constitution of a photothermographic material.

First, the constitution of the photothermographic material 5 will be described. As shown in FIG. 7, the photothermographic material is formed by means of: coating a base film—which has a thickness of 176 μm and is composed of PET (polyethylene terephthalate) or other material—with an emulsion layer Em having a thickness of 20 μm; and by further coating the emulsion layer Em with a protective layer PC having a thickness of 4 μm. On the back side of the base film, a backcoat layer BC and an antihalation layer AH, having a total thickness of 3 μm, are coated. The total thickness of the photothermographic material 5 is set within the range of 150 to 250 μm.

The refractive indexes of the respective layers are set as follows: 1.52 for the protective layer PC, 1.54 for the emulsion layer Em, 1.66 for the base film (PET), 1.52 for the backcoat layer BC, 1.52 for the antihalation layer AH, for an average of approximately 1.5 to 1.7. A blank photothermographic material 5 having an optical permeability of 50% or lower is used, with an optical permeability of 30% or lower being preferred.

When a laser beam is radiated from the protective layer PC side of the photothermographic material 5, the laser beam travels ahead while its light path is refracted, and reaches the interface of the bottommost backcoat layer BC and the air below the antihalation layer AH. The laser beam is reflected at the interface, and the reflected beam returns back to the protective layer PC. When the distance Lm between the laser beam incoming position P1 and the outgoing position P2 of the reflected beam on the surface of the photothermographic material is larger than a diameter of the laser beam, the problem of interference can be avoided.

FIG. 8 is an enlarged perspective view of one of the plate heaters 51a, 51b, and 51c; for example, the plate heater 51b. The drawing shows the heater rack with its cover removed. The plate heater 51b includes an aluminum guide plate 51G, a silicon rubber heater 51H, a thermistor (not shown), a heater terminal (protector) 51P, and pressing rollers 55.

The aluminum guide plate 51G is shaped to form a concave surface along the conveying direction of the photothermographic material. In the width direction of the aluminum guide plate 51G, seven pressing rollers 55 are laid at uniform intervals along the conveying direction. The metal pressing rollers 55 act to convey a photothermographic material, which has been transferred on the concave surface, while pressing it against the concave surface.

The curved plate heater above is an embodiment and may be built to include an endless belt and a separation pawl through use of another flat plate heater or a heating drum.

The photothermographic material 5 conveyed out from the thermal development section C is gradually cooled carefully so as not to generate any wrinkle and to have a curled shape at the slow cooling section D.

Within the slow cooling section D, a plurality of slow cooling roller pairs 59 are arranged so as to impart a desirable constant curvature R in the path of the photothermographic material 5. This implies that the photothermographic material 5 is delivered with the constant curvature R until it is cooled to or below the glass transition point of the material. Because the curvature is intentionally imparted to the photothermographic material, no unnecessary curl is formed before the photothermographic material is cooled to or below the glass transition point. No new curl is formed at the grass transition point or less; therefore, a curl amount is not varied.

Furthermore, the temperatures of the slow cooling rollers themselves and the internal atmosphere of the slow cooling section D are regulated. Such temperature regulation minimizes the difference between the condition immediately after startup and that after sufficient running. Thereby, the density variation can be reduced.

The photothermographic material 5, which is cooled to or below the glass transition point of the material in the slow cooling section D, is conveyed to the cooling section E by the rollers pair 59 provided in the vicinity of the exit of the slow cooling section D.

In the cooling section E, a cooling plate 61 is provided. Here, the photothermographic material 5 is further cooled to a temperature at which an operator does not receive a burn when touching it. Thereafter, the photothermographic material is discharged to a discharge tray 16 by a discharge roller pair 63.

SUMMARY OF THE INVENTION

Meanwhile, an X-ray film for direct radiography comprises an image forming layer arranged on one side of a support, and a fluorescent intensifying layer arranged on another side of the support. When exposed to X-rays, the fluorescent intensifying layer is pumped and emits fluorescence to expose the image-forming layer made of a photosensitive material, thereby forming a latent image. The double-sided photosensitive film, which is exposed to X-rays and on which a latent image is formed, is loaded into a thermal development apparatus designed exclusively for a double-sided photosensitive film as is stringently stored in a cassette. Inside the thermal development apparatus, the double-sided photosensitive film is picked up from the cassette, and subjected to thermal development, wherein the film is heated to process a latent image into a visible image.

As a natural result, users (e.g., hospitals) purchase and use the following apparatus independently: (1) a thermal development apparatus for exposing/developing images obtained from CT or MRI, and (2) a double-sided photosensitive film thermal development apparatus for developing double-sided photosensitive films used with an X-rays apparatus. As described above, because users use two different types of development apparatus, each apparatus requires not only purchasing and maintenance expenses, but also installation space.

In addition, a double-sided photosensitive film requires work for loading each sheet thereof into a cassette. However, in view of the characteristics of a photosensitive film, this operation cannot be performed in a lighted room, and on each occasion must be performed in a darkroom by a skilled operator. This work is quite cumbersome.

In the case where the above operation is performed in a lighted room, a film loader (automatic film loading machine) is required. However, such a film loader is expensive, and requires installation space.

The present invention was conceived to solve the problems described above, and an object of the invention is to provide a photothermographic apparatus which can be used in common for both MRI/CT and X-rays, and which does not require a wide installation space and involves lower expenses.

In order to solve the problems, according to a first aspect of the invention, there is provided a thermal development apparatus comprising: a photothermographic recording material feed section that contains a supply tray in the photothermographic recording material feed section, the supply tray being for containing a photothermographic recording material; an exposure section that subjects the photothermographic recording material to exposure; a first conveyance section that conveys the photothermographic recording material from the supply tray to the exposure section; a thermal development section that effects thermal development of the photothermographic recording material; a second conveyance section that conveys the photothermographic recording material from the exposure section to the thermal development section; a cassette storage section that contains a cassette, the cassette being for containing a double-sided photothermographic recording material having image forming layers on both sides of the double-sided photothermographic recording material; and a third conveyance section that conveys the double-sided photothermographic recording material from the cassette to the first conveyance section.

According to a second aspect of the invention, there is provided a thermal development apparatus as set forth in the first aspect of the invention, wherein the thermal development section comprises a heating section that heats both front and back sides of the photothermographic recording material passing through a conveyance path.

According to a third aspect of the invention, there is provided a thermal development apparatus as set forth in the second aspect of the invention, wherein the heating section is a combination of a curved plate heater and heated pressing rollers which are arranged close to the curved plate heater.

According to a fourth aspect of the invention, there is provided a thermal development apparatus as set forth in the second aspect of the invention, wherein the heating section is a combination of a heating drum and heating rollers which are arranged close to a surface of the heating drum.

According to a fifth aspect of the invention, there is provided a thermal development apparatus as set forth in any of the second to fourth aspects of the invention, wherein a conveyance speed of the double-sided photothermographic recording material while passing through the heating section, the double-sided photothermographic recording material being from the cassette, is set at a different speed from that of the photothermographic recording material while passing through the heating section, the photothermographic recording material being from the supply tray.

According to a sixth aspect of the invention, there is provided a thermal development apparatus as set forth in any of the second to fourth aspects of the invention, wherein, a temperature of the double-sided photothermographic recording material while passing through the heating section, the double-sided photothermographic recording material being from the cassette, is set at a different temperature from that of the photothermographic recording material while passing through the heating section, the photothermographic recording material being from the supply tray.

According to a seventh aspect of the invention, there is provided a thermal development apparatus as set forth in the first aspect of the invention, wherein the third conveyance section comprises a photothermographic recording material detection sensor, and an operation of the exposure section is switched ON or OFF based on an output of the photothermographic recording material detection sensor.

According to an eight aspect of the invention, there is provided a thermal development apparatus as set forth in the first aspect of the invention, wherein, at the exposure section, an apparatus information of the thermal development apparatus is recorded on the photothermographic recording material from the supply tray and on the double-sided photothermographic recording material from the cassette.

According to a ninth aspect of the invention, there is provided a thermal development apparatus as set forth in the first aspect of the invention, wherein the first conveyance section and second conveyance section are operable to convey the photothermographic recording material from the supply tray to the cassette.

According to a tenth aspect of the invention, there is provided a thermal development apparatus as set forth in the first aspect of the invention, wherein an operation of the exposure section is deactivated in the case where the double-sided photothermographic recording material is subjected to thermal development.

DETAILED DESCRIPTION OF THE INVENTION

By reference to the drawings, the invention will be described in detail below.

[First Embodiment]

Figure 1:
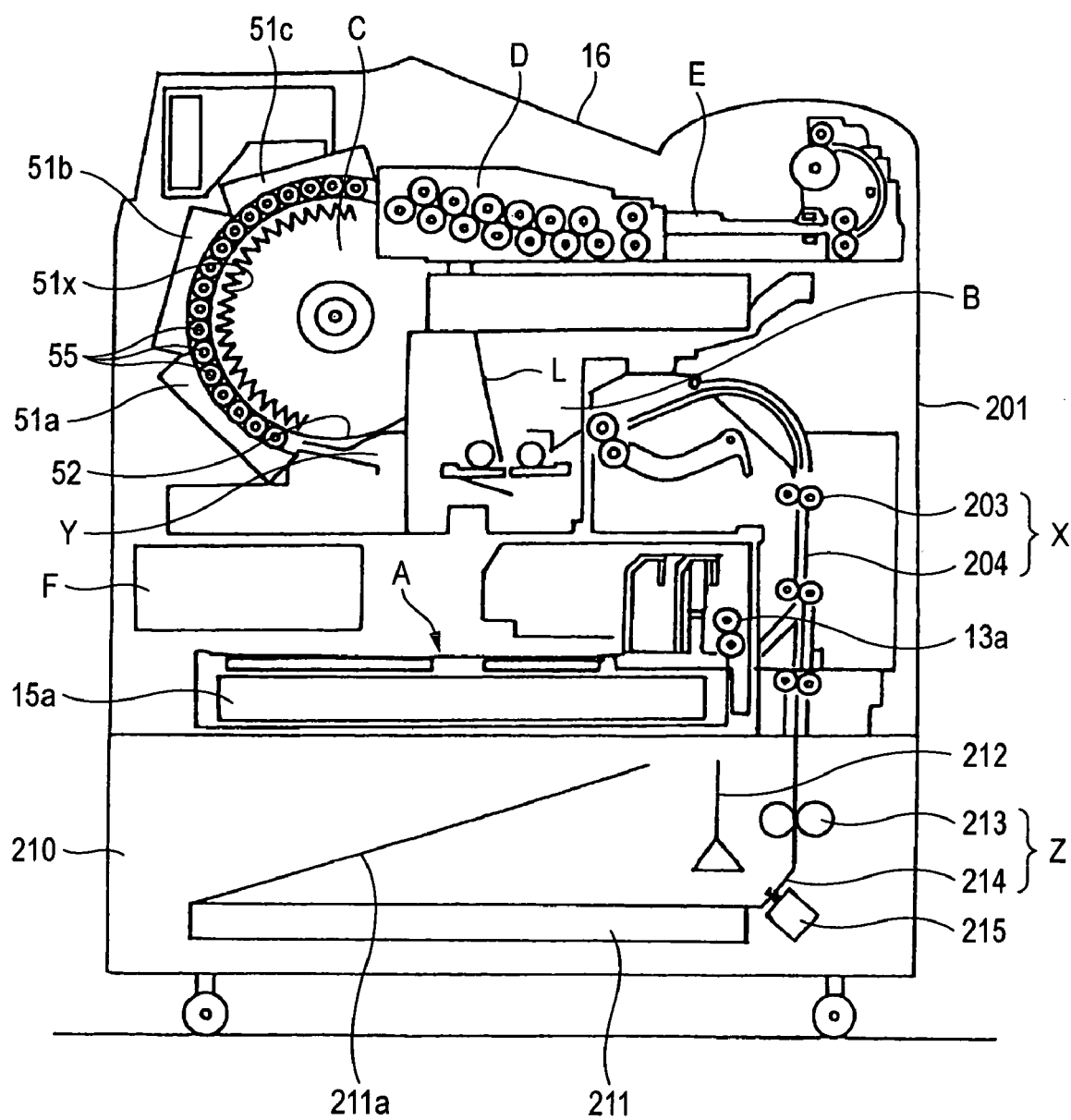
FIG. 1 shows a thermal development unit having a cassette storage section in the lower portion thereof.

A thermal development recording apparatus according to a first embodiment of the invention allows double-sided heating. The thermal development apparatus is shown in FIG. 1. In FIG. 1, reference numeral 200 denotes the thermal development recording apparatus (image processing apparatus) of a first embodiment of the invention. The thermal development recording apparatus 200 comprises: (1) a thermal development apparatus 201 for exposing/developing images obtained from CT or MRI; and (2) a double-sided photosensitive film cassette storage section 210 which is located under the thermal development apparatus 201 and whose purpose is to convey to the thermal development apparatus 201 a double-sided photosensitive film photographed with an X-ray apparatus.

The thermal development apparatus 201 and the double-sided photosensitive film cassette storage section 210 will be explained below. The thermal development apparatus 201 picks up cut sheets of a photothermographic material one at a time from a supply tray 15a in a photothermographic recording material feed section A by means of pick-up rollers 13a, and feeds it downstream to an image exposure section B via a first conveyance section X which conveys the photothermographic material from the supply tray 15a to the image exposure section B. After exposure, the thermal development apparatus 201 subjects the photothermographic material to thermal treatment at a thermal development section C, the photothermographic material being from the image exposure section B via a second conveyance section Y, then cools it gradually at a slow cooling section D and cools it at a cooling section E, and finally discharges the photothermographic material to an external discharging cassette. Elements other than the thermal development section C that are identical with elements of the related art explained in FIG. 4 are denoted by the same reference numerals, and their repeated explanations are omitted here.

The thermal development section C subjects the post-scan photothermographic material to thermal development by means of thermal treatment while conveying the same. As shown in FIG. 1, there is provided the thermal development section C in which a plurality of plate heaters 51a, 51b, 51c serving as a heater to reach a necessary temperature for processing the photothermographic material 5 are arranged in the conveyance direction of the photothermographic material, each of the heaters being curved, these plate heaters 51a, 51b, 51c are arranged so as to form a successive circular arc shape, and another heating means 51x is provided to face the plate heaters 51a, 51b, 51c.

Figure 4:
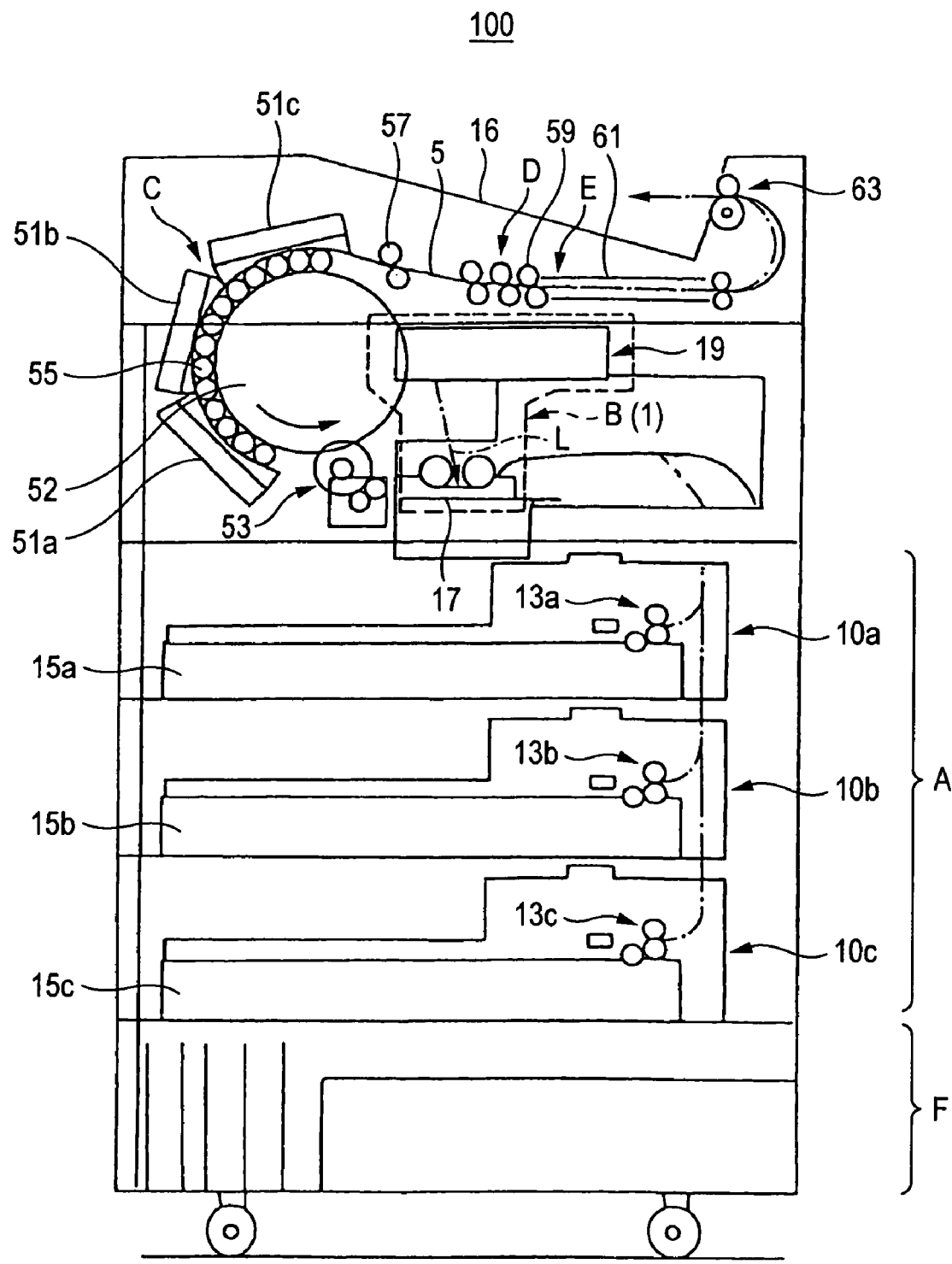
FIG. 4 shows a thermal development unit described in JP-A-2003-285455.
Figure 5A:
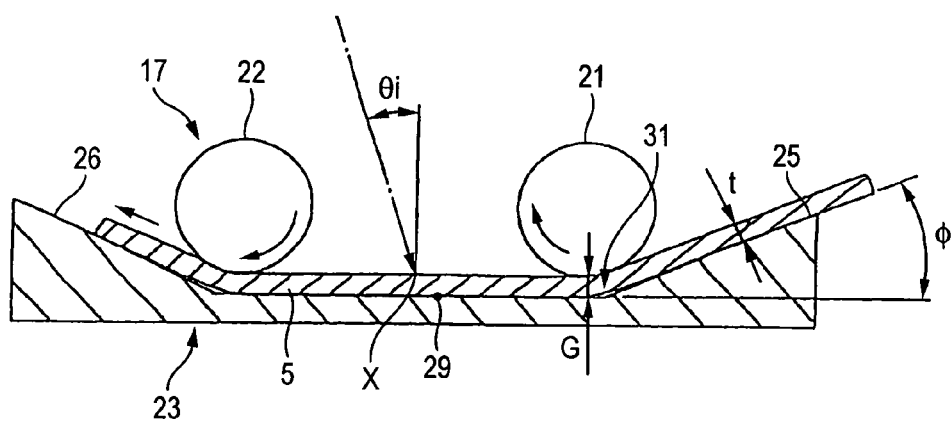
FIG. 5A–5B are enlarged cross-sectional views of driving rollers and their vicinity which convey a photothermographic material to an image exposure section.
Figure 5B:
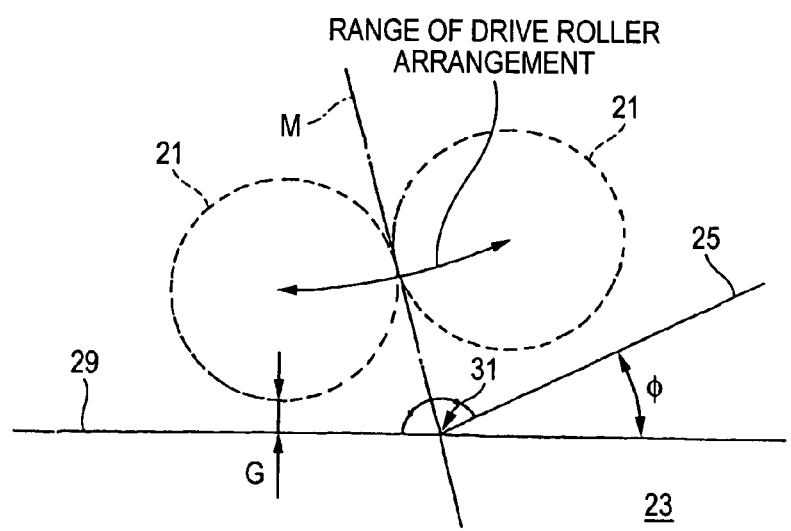
Figure 6:
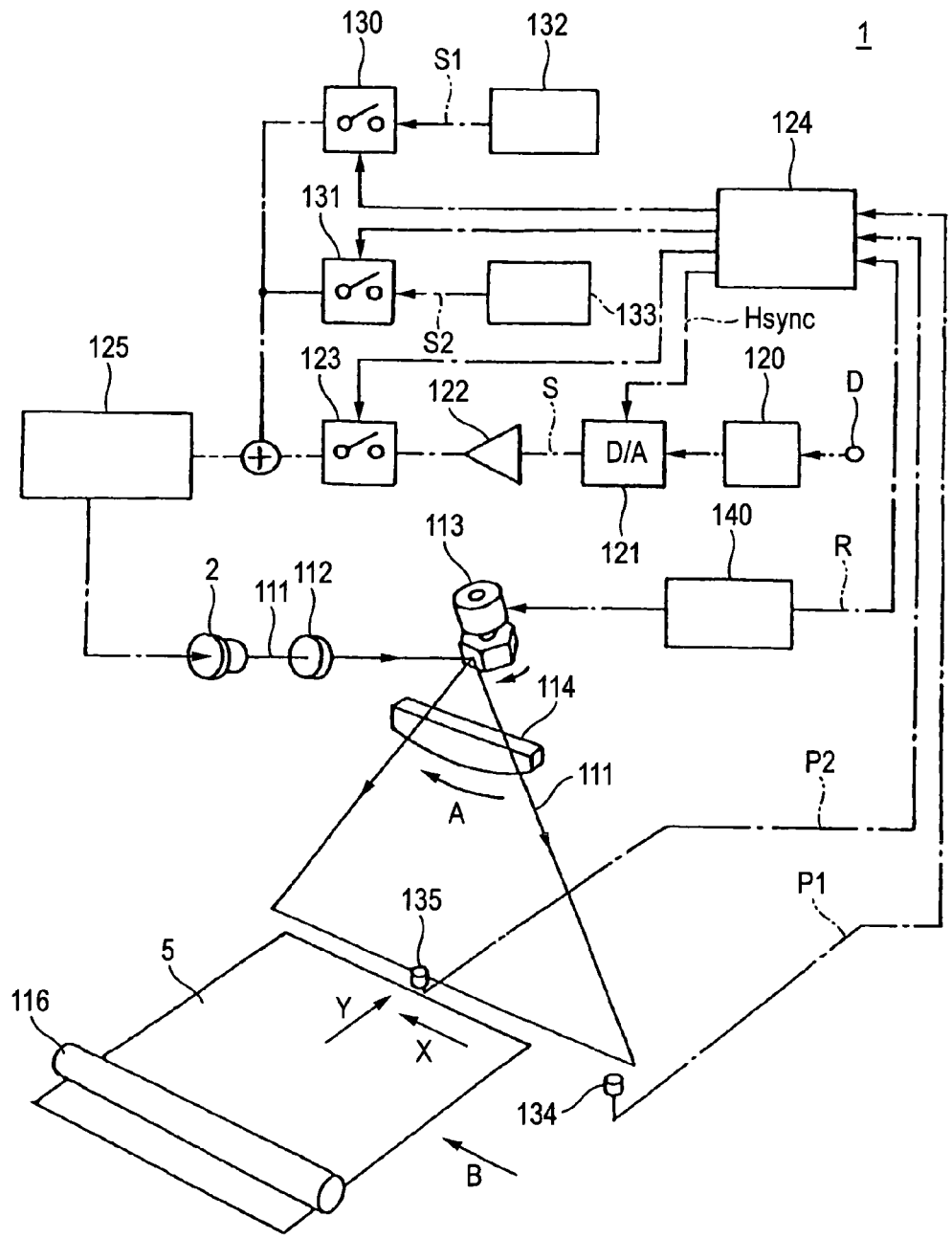
FIG. 6 is a descriptive view of an exposure system of an image exposure section.
Figure 7:
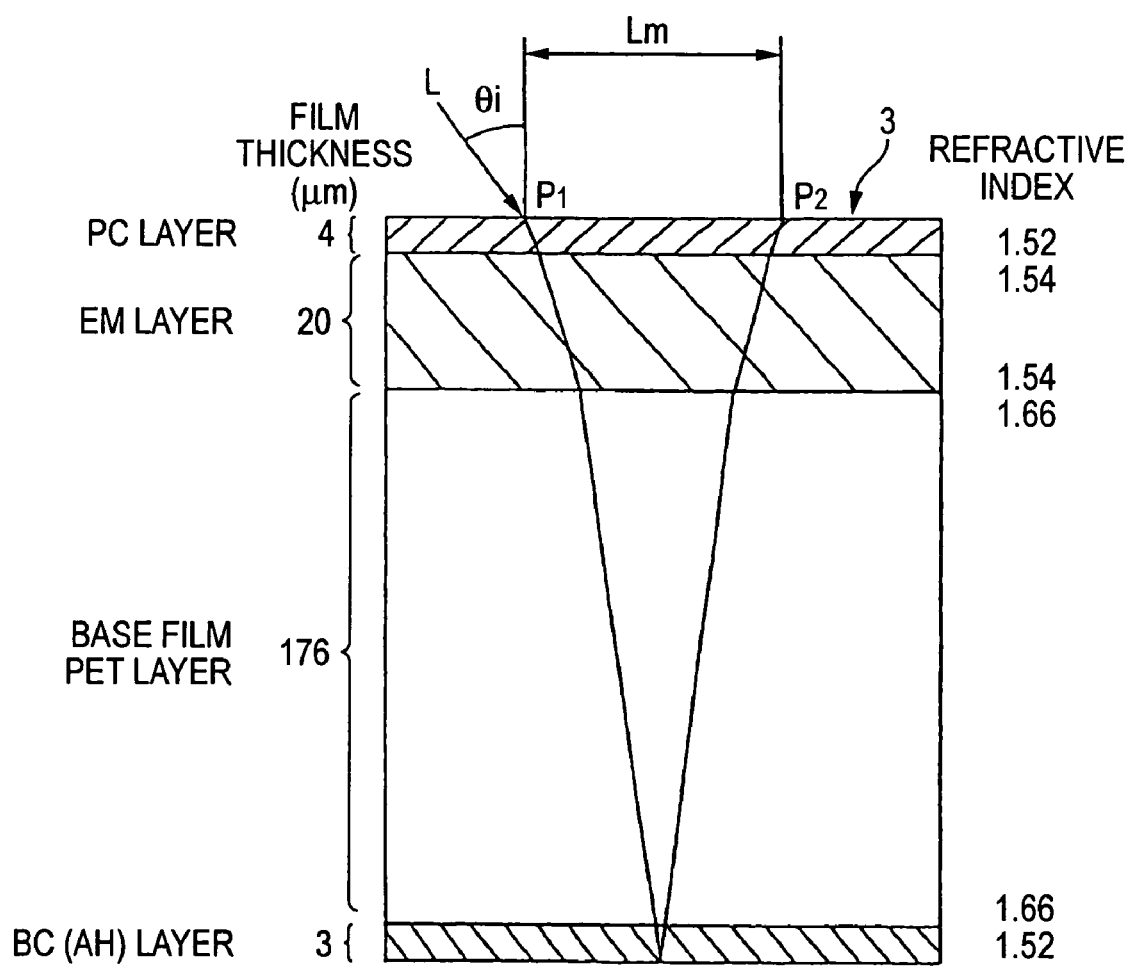
FIG. 7 is an explanatory diagram showing the layer constitution of a photothermographic material.
Figure 8:
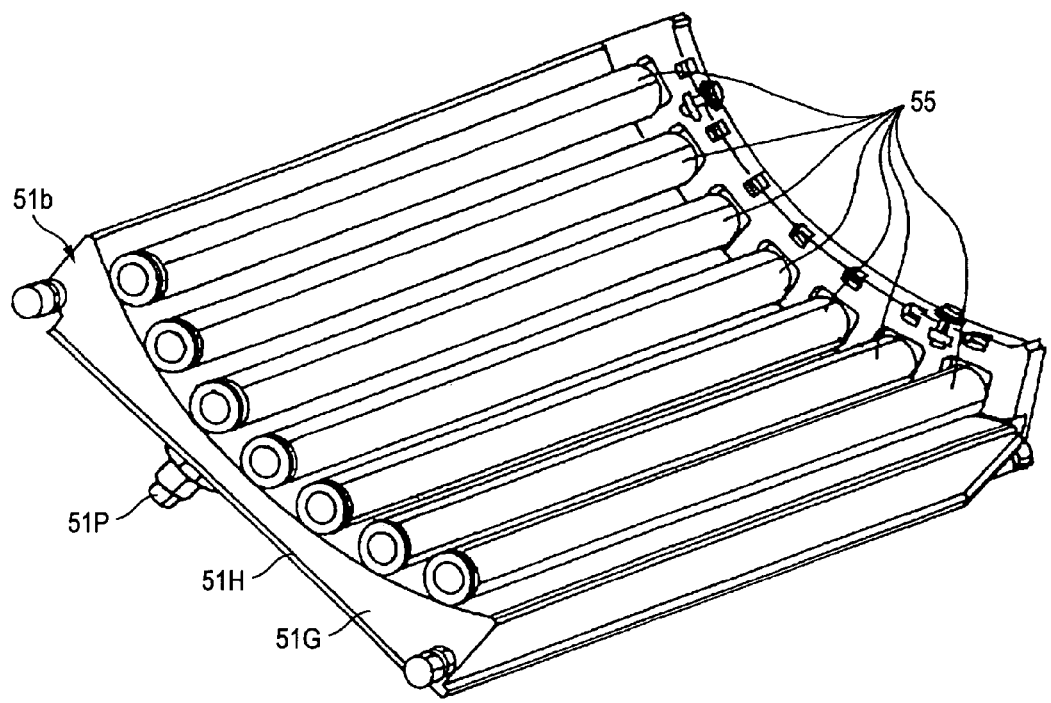
FIG. 8 is an enlarged perspective view of the vicinity of the plate heater described in JP-A-2003-285455.

More specifically, the thermal development section C includes plate heaters 51a, 51b, and 51c has a structure such that, as shown in FIG. 4, each plate heater is provided with a concave surface, causing the photothermographic material 5 to come in contact with the concave surface of the plate heater and sliding the photothermographic material relatively. As conveyance means of the photothermographic material 5, there are provided a plurality of metal pressing rollers 55, which also serve as heat transfer means from each plate heater to the photothermographic material 5. The metal pressing rollers 55 are in contact with the peripheral surface of a rotating disk 52, and are driven by the rotation of the rotating disk 52. According to the configuration described above, the photothermographic material 5 is pressed against the plate heaters 51a, 51b, and 51c while being conveyed. Consequently, buckling of the photothermographic material 5c an be prevented. In addition, the heating means 51X is provided on the rotating disk 52 side of the metal pressing rollers 55 so as to be adjacent to the metal pressing roller 55, whereby the metal pressing rollers 55 are heated by the heating means 51X. Therefore, both sides of the photothermographic material conveyed by the metal pressing rollers 55 are developed by being heated with the plate heaters 51a, 51b, and 51c, and the metal pressing rollers 55.

Figure 2:
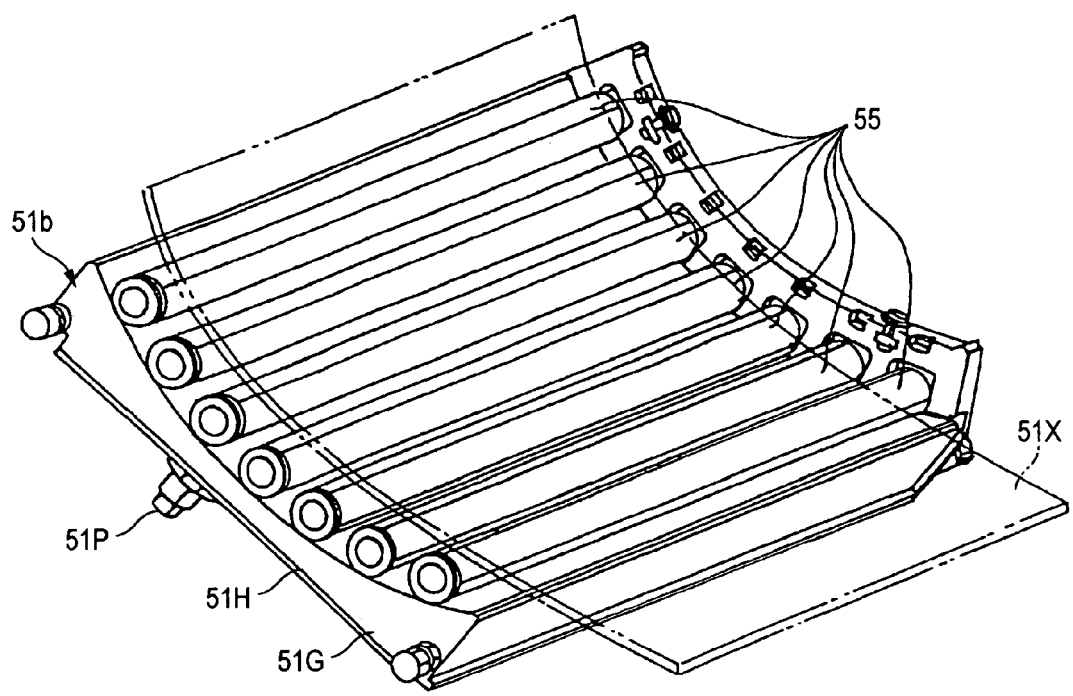
FIG. 2 is a perspective view of a specific example of a thermal development unit C.

FIG. 2 is a perspective view of a specific example of a thermal development unit C. In FIG. 1, 51b indicates a plate heater comprising an aluminum guide plate 51G, a silicon rubber heater 51H, a thermistor (not shown), a heater terminal (protector) 51P, and metal pressing rollers 55. The aluminum guide plate 51G is shaped to form a concave surface along the conveyance direction of the photothermographic material. In the width direction of the aluminum guide plate 51G, seven metal pressing rollers 55 are laid at uniform intervals along the conveyance direction. The metal pressing rollers 55 act to convey a photothermographic material, which has been transferred on the concave surface, while pressing it against the concave surface.

The heating means 51X, which is another plate heater provided in the first embodiment, is located adjacent to the pressing rollers 55 thereby heating the metal pressing rollers 55.

Hence, the surface side of the photothermographic material conveyed by the plate heater 51b is heated by the plate heater 51b, and its back side is heated by the metal pressing rollers 55, the metal pressing rollers being heated by a plate heater 51X; consequently, both sides thereof are heated.

According to the related art inventions, single-side heating is performed in the thermal development section C. In contrast, the present invention provides double-sided heating. Therefore, when a photothermographic material loaded in a supply tray 15a is thermally developed in the thermal development section C, as might be expected, the heating temperature should be adjusted by regulating the conveyance speed of the photothermographic material.

Thus, the present invention has additional advantages such that the processing time for thermal development can be reduced.

Alternatively, the heating means of the thermal development section C may comprise a heating drum in which a heating unit is provided, and a plurality of heating rollers disposed on the surface of the heating drum. In this case, by rotating the heating drum, the photothermographic material is subjected to double-sided heating while being conveyed between the heating drum and the heating rollers.

By virtue of having a halogen lamp or a heating element disposed at the internal center of a hollow cylindrical drum, the heating drum is a heating device of lower cost and provides more uniform heating than a plate heater with a sheathed heater.

Specific examples of a photothermographic film to be used include; for example, DI-AL Em. No. 51151 manufactured by Fuji Photo Film Co., Ltd. (Expiration date of December 2003).

In addition, a thermal development apparatus according to the first embodiment of the invention contains a double-sided photosensitive film cassette.

As shown in FIG. 1, the thermal recording apparatus is characterized in that, in addition to the supply tray 15a, a double-sided photosensitive film cassette storage section 210 is provided at the lower portion of the apparatus. The double-sided photosensitive film cassette storage section 210 will be explained in detail below.

A sheet of a double-sided photosensitive film having a latent image formed on the image forming layer thereof is loaded in a cassette 211, and the cassette 211 is loaded in to the cassette storage section 210, which encloses the double-sided photosensitive film in the cassette 211. An opening and closing cover 211a of the cassette 211 is opened, and a recording material is picked up from the cassette 211 by a pick-up means such as a suction cup 212 (or a pick-up roller).

The thus picked-up double-sided photosensitive film is connected to the first conveyance section X of the thermal development apparatus 201 by way of a third conveyance section Z comprising a conveyance guide 214 and a conveyance roller pair 213, then transferred to the image exposure section B located downstream along the conveyance direction. However, as a double-sided photosensitive film on which a latent image is already formed will not be subjected to exposure at the exposure section B, thereby just passing through the section. Therefore, when an operator performs thermal development of a double-sided photosensitive film in the double-sided photosensitive film cassette storage section 210, an operation panel or an exposure section off switch (not shown) must be turned to off so as to deactivate the exposure section B.

In order to automate the above procedure, a recording material detection sensor 215 may be provided in the vicinity of the outlet of the cassette 211 so that when the recording material detection sensor 215 detects a double-sided photosensitive film, an exposure section deactivating signal is sent to a control section F, whereby the operation of the exposure section B is stopped automatically. In place of the recording material detecting sensor 215 in the vicinity of the cassette-dismounting outlet 211, exposure operation at the exposure section B may be automatically stopped by way of synchronization with the up-down movement of the suction cup 212.

Furthermore, apparatus information identifying a double-sided photosensitive film may be embedded in a portion thereof so that the information is read by a reading device provided inside the apparatus, thereby automatically stopping exposure operation at the exposure section B.

The recording material having thus passed through the exposure section B without being exposed is conveyed to a thermal development section C by the second conveyance section Y. The double-sided photosensitive film is conveyed to the thermal development section C, wherein the surface side of the double-sided photosensitive film is heated by the plate heater 51b described in FIG. 2, and the back side thereof is heated by the metal pressing rollers 55 heated by the plate heater 51x.

After completion of thermal development, the photothermographic material is carefully cooled to or below the glass transition point of the material at a slow cooling section D so as not to generate a wrinkle or impart a curled shape, and then conveyed to a cooling section E. In the cooling section E, the photothermographic material is further cooled to a temperature which will not result in an operator receiving a burn when touching the photothermographic material, and finally, the photothermographic material is discharged to a discharge tray 16.

In view that a latent image is already formed on the double-sided photosensitive film, exposure at the exposure section B is not necessary. However, apparatus information can be recorded on the double-sided photosensitive film at the exposure section B. Similarly, apparatus information can be recorded on a single-sided photosensitive film (photothermographic material) of a supply tray at the exposure section B. Materials of double-sided photosensitive films will be explained later.

[Second Embodiment]

A thermal development apparatus according to a second embodiment of the invention allows loading of a raw film.

Usually, a sheet of a double-sided photosensitive film is loaded into a double-sided film cassette, and this loading is performed by an X-ray technician or by use of a film loader (automatic film loading machine). Thus, loading work for loading a double-sided photosensitive film into a double-sided photosensitive film cassette is cumbersome. In addition, the film loader is expensive and requires installation space.

The thermal development apparatus shown in FIG. 1, is provided with a supply tray 15*a* which contains a photothermographic material, and a raw film for laser recording is loaded therein. As described above, the raw film is usually conveyed from the supply tray to a laser recording section B by way of a first conveyance section X (a conveyance roller pair 203 and a conveyance guide 204). At the laser recording section B, a latent based on image data is recorded on the film, which is then sent to a thermal development section C by way of a second conveyance section Y. At the thermal development section C, the film is subjected to thermal development, and finally discharged to a discharge tray 16.

The second embodiment allows conveyance of a raw film located in the supply tray 15*a* to a cassette 211.

First, the empty cassette 211 is inserted into a cassette storage section 210. As a result of an operator selecting "AUTO LOAD" from an operation panel (not shown) or operating a dedicated switch (not shown), a sheet of raw film contained in the supply tray 15*a* is picked up, and sent to the first conveyance section X (the conveyance roller pair 203 and the conveyance guide 204). Then, it is sent backward from the first conveyance section X to a third conveyance section Z (a conveyance means from the cassette 211 to the first conveyance section X (the conveyance roller pair 213 and the conveyance guide 204)), and finally loaded into the cassette 214 in the cassette storage section 210.

Thus, using the apparatus can eliminate need for a film loader and manual loading. The above description assumes that the film for a laser imager and double-sided photosensitive film is identical; however, in the case where the film for a laser imager and a double-sided photosensitive film are different, a double-sided photosensitive film may be loaded in the supply tray 15*a* beforehand, or there may be provided another supply tray 15*b* (In FIG. 1, only a supply tray 15*a* is shown, but actually, as explained with reference to FIG. 4, a plurality of supply trays 15*b* and 15*c* for different sizes of films are provided, and one of those supply trays is available).

In addition, a double-sided film cassette 211 is contained in a cassette storage section. The entire cover of the cassette can be opened (211*a*); however, it may be designed to open only a part thereof, so that a film can be sucked from the opening and thereby conveyed into the apparatus.

[Third Embodiment]

A thermal development apparatus according to a third embodiment of the invention can locate a position where a double-sided photosensitive film cassette is loaded. The thermal development apparatus is shown in FIG. 3.

FIG. 1 shows a thermal development apparatus having a cassette storage section in the lower portion thereof, although the cassette storage section maybe provided on the side portion thereof. FIG. 3 shows an example wherein the cassette storage section is provided on the side portion of the apparatus.

Figure 3:
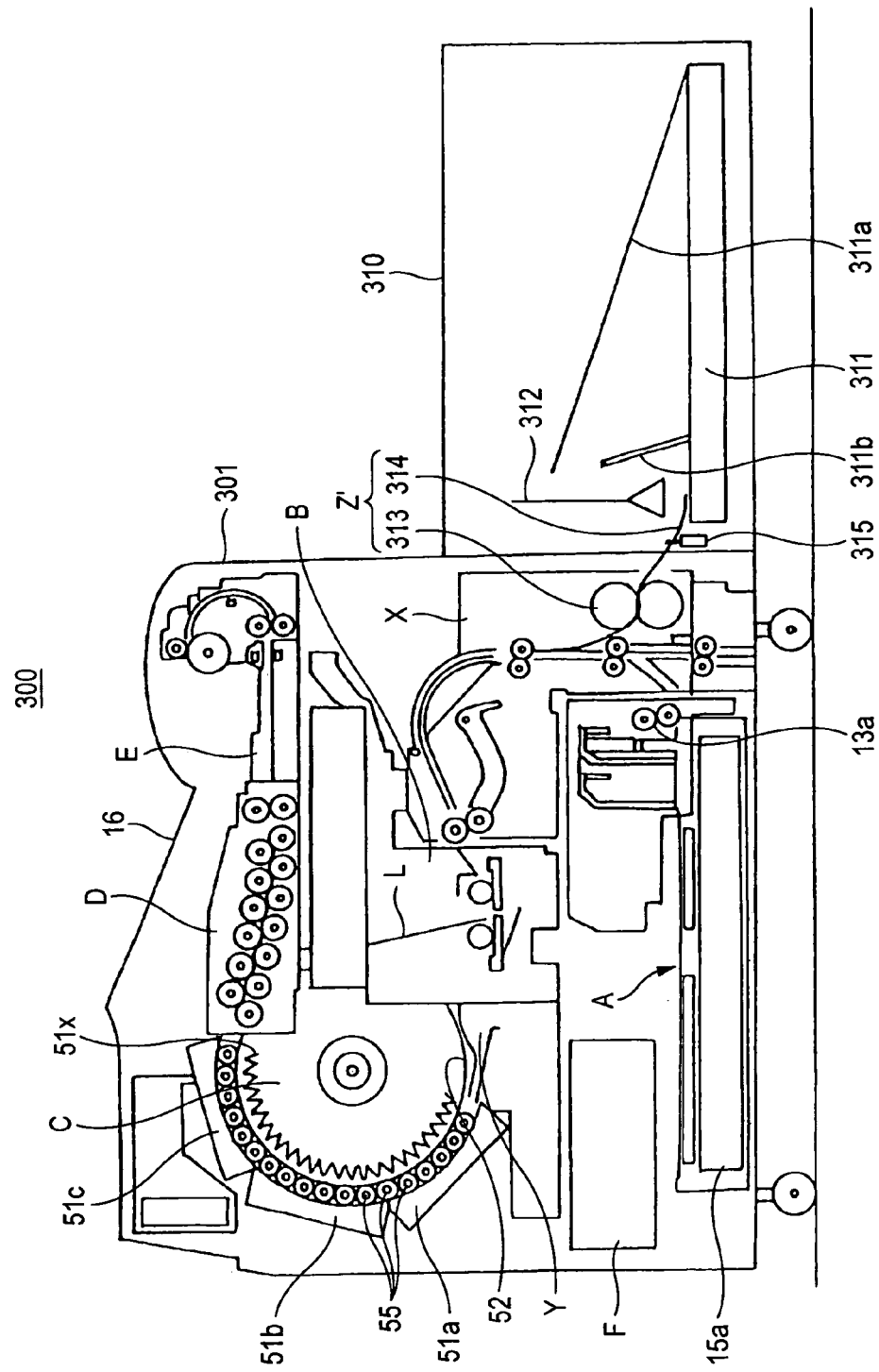
FIG. 3 shows a thermal development unit having a cassette storage section at the side portion thereof.

In FIG. 3, 300 denotes the thermal development apparatus (image-processing apparatus) related to the third embodiment of the invention. The thermal development apparatus 300 comprises: (1) a thermal development unit 301 for exposing/developing images obtained from CT or MRI; and (2) a double-sided photosensitive film container 310 which is located on the side portion of the thermal development unit 301 for the purpose of conveying to the thermal development unit 301 a double-sided photosensitive film photographed with an X-ray apparatus. In view that the thermal development unit 301 is identical with the thermal development apparatus 201 shown in the drawing, its repeated explanation is omitted here.

The double-sided photosensitive film container 310 contains a cassette 311. An opening and closing cover 311*a* of the cassette 311 is opened, and a double-sided photosensitive film is picked up from the cassette 311 by pick-up means such as a suction cup 312, then retrieved from the side of the thermal development apparatus by way of a conveyance roller pair 313.

The thus retrieved double-sided photosensitive film is connected to a first conveyance section of the thermal development apparatus 301 by way of a third conveyance section Z' comprising a conveyance guide 314 and the conveyance roller pair 313, then transferred to an exposure section B located downstream along the conveyance direction. After passing through the exposure section B, the film is conveyed to a thermal development section C via a second conveyance section Y, wherein both sides of the double-sided photosensitive film are heated; the surface side is heated with a plate heater 51*b*, and the back side with metal pressing rollers 55 heated by a plate heater 51X. Thereafter, the film is carefully cooled to or below the glass transition point of the material in a slow cooling section D so as not to generate a wrinkle or impart a curled shape, then conveyed to a cooling section E, where the photothermographic material is further cooled to the temperature at which an operator does not receive a burn upon contact, and finally, the film is discharged to a discharge tray 16.

As described above, the thermal development apparatus according to the fifth embodiment can be used effectively at a location of limited height.

Next, the photothermographic material used in the thermal development recording apparatus used in the invention will be described in detail. A photographing photosensitive material to be used is not one in which image information is written by scanning with a laser beam or the like, but one in which an image is recorded by exposure in focal planes.

Conventionally, such films have been commonly used in a field of wet system photosensitive material, and known examples include: film for medical use, direct or indirect X-ray films and mammography films or the like; various films for printing plates; industrial recording films; or films for ordinary photographs. Specific examples include a photothermographic material for use with double-sided coating type X-ray apparatus which utilizes a blue fluorescent intensifying screen (e.g., see Japanese Patent Publication No. 3229344), a photothermographic material which uses tabular grains of silver iodide (e.g., see JP-A-59-142539), or photosensitive material for medical use wherein both sides of a support are coated with tabular grains having a high content of silver chloride having a (100) principal plane (e.g., JP-A-10-282606). In addition, material for double-sided coating photothermographic material is also disclosed in other patent documents. (e.g., see JP-A-2000-227642, JP-A-2001-22027, JP-A-2001-109101, JP-A-2002-90941). Although a material using silver halide fine grains of 0.1 μm or less according to these known examples did not exhibit deteriorated haze, such material has been found insufficient for practical use, because of low sensitivity. Meanwhile, a material using silver halide fine grains of 0.3 μm or more has been found insufficient for practical use, in view of severe deterioration in image quality due to deterioration in haze caused by remaining silver halide, and deterioration in printout.

Photosensitive materials using tabular grains of silver iodides as silver halide grains are known in the field of wet developing (e.g., See JP-A-59-119344 and JP-A-59-119350), however, there are no precedent examples of its application to a photothermographic material. The reason for this is that such material has low sensitivity, as described above, and lacks effective sensitization means. An additional reason is a more challenging technical barrier in applying such a material to thermal development.

In order to be suitable for use as such a photographic photosensitive material, a photothermographic material is required to have further enhanced sensitivity, and is required to have a higher level of picture quality in view of haze or the like in obtained images.

The following are useful components of a heat development photosensitive material which satisfies the above requirements.

1. Heat Development Photosensitive Material

A photothermographic material of the embodiment has an image-forming layer has, on at least one side of a support, a photosensitive silver halide, a non-photosensitive organic silver salt, a reducing agent, and a binder. Preferably, the photothermographic material also may have a surface protective layer provided on the image-forming layer or a back layer or a back protective layer which is provided on the opposite side of the imaging-forming layer.

The structures and preferred constituents of these layers will be described in detail below.

(Compounds Which Substantially Reduce Visible Light Absorption Due to Photosensitive Silver Halide)

In the embodiment, there is preferably added a compound which exhibits substantially reduced visible light absorption after thermal development as compared with before thermal development. A silver iodide complex forming agent is particularly preferably used as the compound which has substantially reduced visible light absorption due to photosensitive silver halide after thermal development.

(Description of Silver-Iodide-Complex-Forming Agent)

The silver-iodide-complex-forming agent according to the embodiment can contribute to Lewis acid-base reaction, a reaction wherein at least one of nitrogen atoms and sulfur atoms of the compound donate their electrons to silver ions as ligand atoms (electron donor: Lewis base). Stability of a complex can be defined by a stepwise stability constant or an overall stability constant; however, the definition depends on a combination of a silver ion, iodide ion, and the silver-complex-forming agent thereof. In general, a high stability constant can be obtained through methods including: forming a chelating ring in the molecule, thereby obtaining chelating effect; and increasing an acid-base dissociation constant of ligands.

The working mechanism of the silver-iodide-complex-forming agent in the embodiment has not yet been elucidated; however, it can be surmised that a silver iodide is solubilized by forming a stable complex comprising at least three components including an iodide ion. The silver-iodide-complex-forming agent employed in the embodiment exhibits poor ability to sulubilize silver bromide or silver chloride, although it acts specifically on silver iodide.

Details of the mechanism of the silver halide-complex forming agent employed in the embodiment improving the storage stability of an image have not yet been elucidated. However, it can be surmised that at least a portion of photosensitive silver halide and the silver-iodide-complex-forming agent employed in the embodiment react during thermal development, and form a complex, thereby reducing or eliminating the photosensitivity, and in turn improving storage stability under radiation with light. In addition to the above, the silver-halide-complex-forming agent has a distinctive characteristic that a clear and high-quality image can be obtained because haze on a film caused by silver halide is also reduced. Haze on a film can be checked by measuring a decrease in ultraviolet-visible absorption in a spectral absorption spectrum.

In the embodiment, an ultraviolet-visible absorption spectrum of a photosensitive silver halide can be measured by a transmission method or a reflection method. In the case where absorption due to other additive compounds in the photothermographic material overlaps with that of the photosensitive silver halide, possible counter measures include employing a differential spectrum, removal of the other compound by use of solvent, and a combination thereof. Such countermeasures allow observation of the ultraviolet-visible absorption spectrum of the photosensitive silver halide.

The silver-iodide-complex-forming agent employed in the embodiment differs from conventional silver-ion-complex-forming agents in that an iodide ion is essential for forming a stable complex. The conventional silver-ion-complex-forming agents act on salts containing silver ions and solubilizes them. Examples of such a salt include organic complex salts such as silver bromide, silver chloride, and silver behenate. In contrast, the silver-iodide-complex-forming agent employed in the embodiment is characterized in that it works only in the presence of silver iodide.

Specific compounds of the silver-iodide-complex-forming agent employed in the embodiment include those described in detail of Japanese Patent Application No. 2002-367661, Japanese Patent Application No. 2002-367662, and Japanese Patent Application No. 2002-367663. In addition, specific examples of compounds described in these patent applications can also be referred to as specific examples of compounds of the embodiment.

In the embodiment, in order to improve storage stability of an image, especially to improve storage stability to a great extent under radiation with light, the intensity of the ultraviolet-visible absorption spectrum of the photosensitive silver halide after thermal development is preferably 80% or less that before thermal development, more preferably 40% or less, particularly preferably 20% or less, most preferably 10% or less.

The silver-iodide-complex-forming agent employed in the embodiment maybe incorporated in a coating solution and thereby into a photosensitive material in any form, such as a solution, an emulsified dispersion, or a solid fine grain dispersion. Examples of well-known emulsification dispersion methods include a method for effecting dissolution through use of an oil, such as dibutyl phthalate, tricresyl phosphate, glyceryl triacetate, or diethyl phthalate, or an auxiliary solvent, such as ethyl acetate or cyclohexanone, and mechanically forming an emulsified dispersion.

(Description of Photosensitive Silver Halide)

1) Halogen Composition

The photosensitive silver halide to be used in the embodiment must have a high silver iodide content of 40 to 100 mol %. No particular limitations are imposed on the other components, which can be selected from silver halides such as silver chloride and silver bromide; and organic silver salts such as silver thio cyanate and silver phosphate; however, silver chloride and silver bromide are particularly preferred. Employment of a silver halide having such a high silver iodide content enables design of a preferable photothermographic material exhibiting excellent storage stability after development; particularly, a considerably small increase in haze, which would otherwise be caused by exposure.

Furthermore, from the viewpoint of storage stability of an image against radiation with light after treatment, the silver iodide content of the photosensitive silver halide is preferably 70 to 100 mol %, more preferably 80 to 100 mol %, particularly preferably 90 to 100 mol %.

The halogen composition distribution within the grains may be uniform, or the halogen composition may be changed stepwise or continuously. In addition, a silver halide grain having a core/shell structure is preferably used. A preferred structure is a twofold to fivefold structure, with a core/shell grain having a twofold to fourfold structure being more preferred. Also preferred is a silver iodide-rich core structure which has a high content of silver iodide in the core part, or a silver iodide-rich shell structure which has a high content of silver iodide in the shell part. A technique of localizing silver bromide or silver iodide to the surface of a grain as an epitaxial portion is preferably employed.

No particular limitations are imposed on the β phase to γ phase ratio of the iodide complex of the embodiment. The term "β-phase" refers to a silver iodide-rich structure having a hexagonal wurtzite structure, and "γ-phase" refers a silver iodide-rich structure having a cubic zinc-blend structure. The term "γ-phase content ratio" referred to here means the ratio determined by a method suggested by C. R. Berry. The method is used to determine a γ-phase content ratio based on peak ratios of β-phase of silver iodide (100), (101), (002) to γ-phase (111) which are obtained from X-ray powder diffraction. For details of the method, refer to, for example, Physical Review, Volume 161, No. 3, P. 848–851(1967).

2) Grain Size

For the silver-iodide-rich silver halide used in the embodiment, a grain whose size is large enough to achieve high photosensitivity can be selected. In the embodiment, the average sphere-equivalent diameter of silver halide is preferably 0.3 to 5.0 µm, more preferably, 0.5 to 3.0 µm. The term "sphere-equivalent diameter" referred to here indicates a diameter of a sphere having the same volume as one grain of the silver halide. The sphere-equivalent diameter can be obtained as follows: calculate the volume of a grain from the projection area and thickness as observed under an electron microscope; then, convert the volume into a sphere having the same volume.

3) Amount of Coating

In general, the coating amount of a photothermographic material whose silver halide remains even after thermal development has been restricted to a small amount, in spite of requirements to enhance sensitivity. The reason for this restriction is as follows: when the coating amount of silver halide is increased, the transparency of a film is lowered, which is undesirable for an image. However, in the embodiment, because thermal development can reduce film haze due to silver halide, the coating amount of silver halide can be increased. The coating amount per mol of non-photosensitive organic silver salt in the embodiment is preferably 0.5 to 100 mol %, more preferably 5 to 50 mol %.

4) Method of Grain Formation

The method of forming a photosensitive silver halide is well known in the art and, for example, the methods described in Research Disclosure, No. 17029 (June, 1978) and U.S. Pat. No. 3,700,458 may be used. Specifically, there is employed a method for preparing a photosensitive silver halide by means of adding a silver-supplying compound and a halogen-supplying compound gelatin or other polymer solution, and for mixing the silver halide with an organic silver salt. In addition, the methods described in paragraph numbers 0217 to 0224 of JP-A-11-119374, JP-A-11-352627, and JP-A-2000-347335are also preferred.

In relation to a method for forming a tabular grain of silver halide, the methods described in the JP-A-59-119350 and JP-A-59-119344 are preferably used.

5) Grain Shape

The silver halide grain employed in the invention preferably assumes a tabular shape. More particularly, tabular grains include tabular-octahedral grains, tabular-tetradecahedral grains, and tabular-icosahedral grains, in terms of the structure of the lateral planes. Of these, tabular-octahedral grains and tabular-tetradecahedral grains are preferred. The term "tabular-octahedral grain" referred to here means a grain having $\{0001\}$, $\{1(-1)00\}$ planes or a grain having $\{0001\}$, $\{1(-2)10\}$, $\{(-1)2(-1)0\}$ planes; the term "tabular-tetradecahedral grain" means a grain having $\{0001\}$, $\{1(-1)00\}$, $\{1(-1)01\}$ planes, a grain having $\{0001\}$, $\{1(-2)10\}$, $\{(-1)2(-1)0\}$, $\{1(-2)11)\}$, $\{(-1)2(-1)1\}$ planes, a grain having $\{0001\}$, $\{1(-1)00\}$, $\{1(-1)0(-1)\}$ planes, a grain having $\{0001\}$, $\{1(-1)00\}$, $\{1(-1)0(-1)\}$ planes, or a grain having $\{0001\}$, $\{1(-2)10\}$, $\{(-1)2(-1)0\}$, $\{1(-2)1(-1)\}$, $\{(-1)2(-1)(-1)\}$ planes; the term "tabular-icosahedral grain" means a grain having $\{0001\}$, $\{1(-1)00\}$, $\{1(-1)01\}$, $\{1(-1)0(-1\}$ planes, or a grain having $\{0001\}$, $\{1(-2)10\}$, $\{(-1)2(-1)0\}$, $\{1(-2)11\}$, $\{(-1)2(-1)1\}$, $\{1(-2)1(-1)\}$, $\{-1)2(-1)(-1)\}$planes. The notation "$\{0001\}$" in the above indicates a crystal plane group having a plane index equivalent to that of a $\{0001\}$ plane. Other tabular grains having shapes other than the above are also preferable.

The dodecahedral, tetradecahedral, and octahedral grains of silver iodide can be prepared by reference to JP-A-2002-080120, JP-A-2003-287835, or JP-A-2003-287836.

In the invention, a projected-area-equivalent diameter of the silver halide assuming the form of a tabular grain preferably falls within the range of 0.4 to 8.0 µm, more preferably from 0.5 to 3 µm. The "projected-area-equivalent diameter" as used herein means a diameter of a circle having the same area as a projected area of a single grain of the silver halide. The projected-area-equivalent diameter can be measured by converting the projected areas of individual grains—which have been obtained by observing the grain with an electron microscope—into the diameter of a circle of the same area.

Grain thickness of the photosensitive silver halide used in the invention is preferably 0.3 μm or lower, more preferably 0.2 μm or lower, further preferably 0.15 μm or lower. An aspect ratio of the photosensitive silver halide preferably ranges from 2 to 100, more preferably 5 to 50.

The silver-iodide-rich silver halide of the embodiment can have a complicated shape. A joint grain as shown in P. 164, FIG. 1 of R. L. JENKINS et al., J. of Photo. Sci., 28 (1980) is preferably employed. Such a flat grain shown in the same FIG. 1 is also preferable. A silver halide grain having a rounded corner is also preferred. No particular limitations are imposed on the plane indices (Miller indices) of the outer surface plane of the photosensitive silver halide grains; however, preferably a large percentage of the [100] plane shows a high spectral sensitization efficiency upon adsorption of a spectral sensitizing dye. The percentage is preferably 50% or more, more preferably 65% or more, still more preferably 80% or more. The percentage of a plane with a Miller index of [100] can be determined by the method described in T. Tani, J. Imaging Sci, 29,165 (1985), which is based on the plane dependency of adsorption of the sensitizing dye between the [111] and [100] planes.

6) Heavy Metal

The photosensitive silver halide grain for use in the embodiment can contain a metal of Group III to Group XIV in the Periodic Table (Group I to Group XVIII are shown) or a metal complex thereof. Preferably, the metal of Group VIII to Group X of the Periodic Table or the center metal of the metal complex is preferably rhodium, ruthenium, or iridium. These metal complexes may be used individually, or in combination of two or more complexes of the same metal or different metals. The metal complex content is preferably $1 \times 10^{-9}$ to $1 \times 10^{-3}$ mol per mol of silver. These metals and metal complexes, along with their addition methods, are described in JP-A-7-225449, paragraph Nos. 0018 to 0024 of JP-A-11-65021, and paragraph Nos. 0227 to 0240 of JP-A-11-119374.

In the embodiment, a silver halide grain comprising a hexacyano metal complex on is preferred. Examples of the hexacyano metal complex include: $[Fe(CN)_6]^{4-}$, $[Fe(CN)_6]^{3-}$, $[Ru(CN)_6]^{4-}$, $[Os(CN)_6]^{4-}$, $[Co(CN)_6]^{3-}$, $[Rh(CN)_6]^{3-}$, $[Ir(CN)_6]^{3-}$, $[Cr(CN)_6]^{3-}$, and $[Re(CN)_6]^{3-}$.

Other than by being mixed with water, the hexacyano metal complex can be added by being mixed with an appropriate organic solvent which is miscible with water (e.g., alcohols, ethers, glycols, ketones, esters, amides, or the like), or by being mixed in gelatin.

The amount of the hexacyano metal complex is preferably $1 \times 10^{-8}$ to $1 \times 10^{-2}$ mol per mol of silver, more preferably $1 \times 10^{-7}$ to $1 \times 10^{-3}$ mol.

Metal atoms (e.g., $[Fe(CN)_6]^{4-}$) which can be contained in the silver halide grain for use in the embodiment, along with methods for desalting and chemical sensitization of a silver halide emulsion, are described in paragraph Nos. 0046 to 0050 of JP-A-11-84574, paragraph Nos. 0025 to 0031 of JP-A-11-65021, and paragraph Nos. 0242 to 0250 of JP-A-11-119374.

7) Gelatin

Various gelatins can be used as a gelatin contained in the photosensitive silver halide emulsion for use in the embodiment. In order to maintain good dispersion of the photosensitive silver halide emulsion in a coating solution containing organic silver salt, a low-molecular-weight gelatin having a molecular weight of 500 to 60,000 is preferably used. These low molecular weight gelatins may be used either during grain formation or during dispersion after the desalting process; however, use during the dispersion after the desalting process is preferred.

8) Chemical Sensitization

The photosensitive silver halide in the embodiment can be used without chemical sensitization, but is preferably chemically sensitized by at least one of: a chalcogen sensitization method, a gold sensitization method, and a reduction sensitization method. Chalcogen sensitization methods include a sulfur sensitization method, a selenium sensitization method, and a tellurium sensitization method.

For sulfur sensitization, a non-labile sulfur compound can be used. Such non-labile sulfur compounds are described in P. Grafkides, Chemie et Pysique Photographique (Paul Momtel, 1987, 5th edition), Research Disclosure (Vol. 307, No. 307105), and the like.

In particular, there can be used known sulfur compounds such as thiosulfates (e.g., hypo); thioureas (e.g., diphenylthiourea, triethylthiourea, N-ethyl-N'-(4-methyl-2-thiazolyl) thiourea, and carboxymethyltrimethylthiourea); thioamides (e.g., thioacetamide); rhodanines (e.g., diethylrhodanine, 5-benzylydene-N-ethylrhodanine); phosphinesulfides (e.g., trimethylphosphinesulfide); thiohydantoins; 4-oxo-oxazolidin-2-thione derivatives; disulfides or polysulfides (e.g., dimorphorinedisulfide, cystine, hexathiocan-thione); polythionates; elemental sulfur; and active gelatin. of these, thiosulfate, thiourea, and rhodanines are particularly preferable.

In selenium sensitization, labile selenium compounds can be used. Labile selenium compounds that can be used include those described in JP-B-43-13489 and JP-B-44-15748, JP-A-4-25832, JP-A-4-109340, JP-A-4-271341, JP-A-5-40324, JP-A-5-11385, Japanese Patent Application No. 4-202415, Japanese Patent Application No. 4-330495, Japanese Patent Application No. 4-333030, Japanese Patent Application No. 5-4203, Japanese Patent Application No. 5-4204, Japanese Patent Application No. 5-106977, Japanese Patent Application No. 5-236538, Japanese Patent Application No. 5-241642, Japanese Patent Application No. 5-286916, and the like.

In particular, there can be used colloidal metal selenide; selenoureas (e.g., N,N-dimethylselenourea, trifluoromethylcarbonyl-trimethylselenourea, and acetyl-trimethylselemourea); selenamides (e.g., selenamide and N,N-diethylphenylselenamide); phosphineselenides (e.g., triphenylphosphineselenide and pentafluorophenyl-triphenylphosphineselenide); selenophosphates (e.g., tri-p-tolylselenophosphate and tri-n-butylselenophosphate); selenoketones (e.g., selenobenzophenone); isoselenocyanates; selenocarbonic acids; selenoesters; and diacylselenides. Furthermore, non-labile selenium compounds such as selenius acid, selenocyanic acid, selenazoles, and selenides described in JP-B-46-4553and JP-B-52-34492can also be used. In particular, phosphineselenides, selenoureas, and salts of selenocyanic acids are preferred.

In the tellurium sensitization, labile tellurium compounds are used. Usable tellurium sensitizers include labile tellurium compounds described in JP-A-4-224595, JP-A-4-271341, JP-A-4-333043, JP-A-5-303157, JP-A-6-27573, JP-A-6-175258, JP-A-6-180478, JP-A-6-208186, JP-A-6-208184, JP-A-6-317867, JP-A-7-140579, JP-A-7-301879, JP-A-7-301880, and the like.

Specifically, there may be used phosphinetellurides (e.g., butyl-diisopropylphosphinetelluride, tributylphosphinetelluride, tributoxyphosphinetelluride, and ethoxy-diphenylphosphinetellride); diacyl(di)tellurides (e.g., bis(diphenylcarbamoyl)ditelluride, bis(N-phenyl-N-methylcarbamoyl)

ditelluride, bis(N-phenyl-N-methylcarbamoyl)ditelluride, bis(N-phenyl-N-benzylcarbamoyl)telluride, and bis(ethoxycarmonyl)telluride); telluroureas (e.g., N,N'-dimethylethylenetellurourea and N,N'-diphenylethylenetellurourea); telluramides; telluroesters; and the like. Of these, diacyl(di) tellurides and phosphinetellurides are particularly preferred. The compounds described in paragraph No. 0030 of JP-A-11-65021 and compounds represented by general formulas (II), (III), and (IV) of JP-A No.5-313284 are still more preferred.

Selenium sensitization and tellurium sensitization are preferred examples of chalcogen sensitization, with tellurium sensitization being more preferred.

In gold sensitization, a gold sensitizer described in P. Grafkides, Chemie et Pysique Photographique (Paul Momtel, 1987, 5th edition) and Research Disclosure (Vol. 307, No. 307105) can be used. Specifically, chloroauric acid, potassium chloroaurate, potassium aurithiocyanate, gold sulfide, gold selenide, and the like can be used. There can also be used other noble metal salts of metals other than gold, such as platinum, palladium, and iridium described in P. Grafkides, Chemie et Pysique Photographique (Paul Momtel, 1987, 5th ed.,) and Research Disclosure (Vol. 307, No. 307,105).

Gold sensitization can be used independently; however, it is preferably used in combination with the aforementioned chalcogen sensitization. Specific examples of such combinations include gold-sulfur sensitization (gold-plus-sulfur sensitization), gold-selenium sensitization, gold-tellurium sensitization, gold-sulfur-selenium sensitization, gold-sulfur-tellurium sensitization, gold-selenium-tellurium sensitization, and gold-sulfur-selenium-tellurium sensitization.

In the embodiment, chemical sensitization can be applied at any timing, so long as it is after grain formation and before coating. Such timings after desalting include: (1) before spectral sensitization, (2) simultaneously with spectral sensitization, (3) after spectral sensitization, and (4) just before coating.

The amount of chalcogen sensitizer used in the embodiment may vary depending on the silver halide grain used, the chemical ripening condition, and the like, and the chalcogen sensitizer is used in an amount of about $10^{-8}$ to $10^{-1}$ mol per mol of silver halide, preferably $10^{-7}$ to $10^{-2}$ mol.

Similarly, the addition amount of the gold sensitizer used in the embodiment may vary depending on various conditions and is generally about $10^{-7}$ to $10^{-2}$ mol, preferably $10^{-6}$ to $5 \times 10^{-3}$ mol, per mol of the silver halide. No particular restriction is imposed on the condition wherein an emulsion is chemical sensitized. However, pAg is 8 or less, preferably 7.0. or less, more preferably 6.5 or less, and particularly preferably 6.0 or less; and pAg is 1.5 or more, preferably 2.0 or more, and particularly preferably 2.5 or more; pH is 3 to 10, preferably 4 to 9; and the temperature falls within the range of approximately 20 to 95° C., preferably 25 to 80° C.

In the embodiment, reduction sensitization can also be used in combination with the chalcogen sensitization or the gold sensitization. Specifically, reduction sensitization is preferably employed in combination with the chalcogen sensitization. Specific examples of reduction sensitizers that are preferably used in the reduction sensitization include ascorbic acid, thiourea dioxide, and dimethylamine borane, as well as stannous chloride, aminoimino methane sulfonic acid, hydrazine derivatives, borane compounds, silane compounds, and polyamine compounds. The reduction sensitizer may be added at any stage in the photosensitive emulsion production process from crystal growth to the preparation step just before coating. Further, reduction sensitization is preferably performed by ripening while the pH of the emulsion is maintained at 8 or higher and the pAg at 4 or lower. Also, reduction sensitization is preferably performed by introducing a single addition portion of silver ions during grain formation.

The amount of the added reduction sensitizer may vary depending on various conditions, and is generally about $10^{-7}$ to $10^{-1}$ mol, preferably, $10^{-6}$ to $5 \times 10^{-2}$ mol, per mol of the silver halide.

In the silver halide emulsion for use in the embodiment, a thiosulfonic acid compound may be added by the method described in EP No. 293,917.

The photosensitive silver halide grain in the embodiment is preferably chemically sensitized by at least one method of the gold sensitization method and the chalcogen sensitization method, in order to design a high-photosensitive photothermographic material.

9) Compound capable of undergoing a one-electron oxidation to thereby form a one-electron oxidation product thereof, wherein the one-electron oxidation product is capable of releasing one or more electrons.

The photothermographic material according to the embodiment preferably contains a compound capable of undergoing a one-electron oxidation to thereby form a one-electron oxidation product thereof, wherein the one-electron oxidation product is capable of releasing one or more electrons. Such a compound can increase the sensitivity of silver halide by being used independently or in combination with the aforementioned various chemical sensitizers.

The compound contained in the photothermographic material of the embodiment and capable of undergoing a one-electron oxidation to thereby form a one-electron oxidation product thereof, wherein the one-electron oxidation product is capable of releasing one or more electrons, is one component of types 1 through 5 below.

(Type 1)
a compound capable of undergoing a one-electron oxidation to thereby form a one-electron oxidation product thereof, wherein the one-electron oxidation product is capable of further releasing two or more electrons accompanying a subsequent bond cleavage reaction;

(Type 2)
a compound capable of undergoing a one-electron oxidation to thereby form a one-electron oxidation product thereof, wherein the one-electron oxidation product is capable of further releasing one electron accompanying a subsequent carbon-carbon bond cleavage reaction, and the compound having, in its molecule, two or more groups adsorptive to silver halide;

(Type 3)
a compound capable of undergoing a one-electron oxidation to thereby form a one-electron oxidation product thereof, wherein the one-electron oxidation product is capable of further releasing one or more electrons after going through a subsequent bond forming process;

(Type 4)
a compound capable of undergoing a one-electron oxidation to thereby form a one-electron oxidation product thereof, wherein the one-electron oxidation product is capable of further releasing one or more electrons after going through a subsequent intramolecular ring cleavage reaction; and (Type 5)
a compound represented by X-Y, wherein X represents a reducing group, Y represents a split-off group, and a one-electron oxide product thereof generated by one-electron oxidation of the reducing group represented by X is capable of leaving Y to generate an X radical accompanying a subsequent cleavage reaction of X-Y bonding, and is capable of releasing another electron.

Among the compounds of type 1, and types 3 through 5, preferred are "compounds each having, in a molecule thereof, an adsorptive group acting on silver halide" or "compounds each having, in a molecule thereof, a partial structure of a sensitizing dye," and more preferred are "compounds each having, in a molecule thereof, an adsorptive group acting on silver halide." The compounds of types 1 through 4 are, more preferably, "compounds having a nitrogen-containing heterocyclic group substituted with two or more mercapto groups as the adsorptive group."

The compounds of types 1 through 4 of the embodiment are identical with those described in detail in JP-A-2003-114487, JP-A-2003-114486, JP-A-2003-140287, JP-A-2003-75950, JP-A-2003-114488, Japanese Patent Application No. 2003-25886 and Japanese Patent Application No. 2003-33446. The specific compounds described in these patent applications are also examples of the compounds of types 1 through 4 of the embodiment. The synthesis examples for compounds of types 1 through 4 of the embodiment are also identical with those disclosed in these patents.

Specific examples of compounds of type 5 of the embodiment are the compounds denominated as "one photon two electron sensitizer" or "deprotonating electron-donating sensitizer" such as those described in JP-A-9-211769 (compounds PMT-1 to S-37 are described in Tables E and F on pages 28–32), JP-A-9-211774, JP-A-11-95355 (compounds INV 1–36), JP-T-2001-500996 (the term "JP-T" as used herein means a published Japanese translation of a PCT patent application) (compounds 1–74, 80–87, and 92–122), U.S. Pat. No. 5,747,235 and U.S. Pat. No. 5,747,236, EP No. 786692A1 (compounds INV 1–35), EP-A-893732A1, and U.S. Pat. No. 6,054,260 and U.S. Pat. No. 5,994,051.

The compound of types 1 through 5 may be used at any timing during emulsion preparation and in the photosensitive material manufacturing step. Examples of timing include during grain formation, during the desalting step, at the time of chemical sensitization, and before coating. The compound may also be added separately in a plurality of portions during the steps. Preferable addition timing is from the completion of grain formation to before a desalting step, at the time of chemical sensitization (immediately before the initiation of chemical sensitization to immediately after the completion thereof), or before coating. More preferable addition timing is at chemical sensitization or before mixing with a non-photosensitive organic silver salt.

A compound of types 1 through 5 is preferably added as a solution in water or a water-soluble solvent such as methanol, ethanol, or a mixture of these solvents. When the compound is dissolved in water, with regard to a compound whose solubility increases as pH is raised or lowered, the solution may be added with its PH raised or lowered.

The compound of types 1 through 5 is preferably used in an emulsion layer containing a photosensitive silver halide and non-photosensitive organic silver salt; however, the compound may be added in a protective layer or an interlayer together with the emulsion layer containing a photosensitive silver halide and non-photosensitive organic silver salt, thereby making the compound diffuse during coating. The addition timing of the compound of the embodiment can be before or after the addition time of a sensitizing dye. Each of the compounds is preferably contained in a silver halide emulsion layer in an amount of $1 \times 10^{-9}$ to $5 \times 10^{-1}$ mol per mol of silver halide, more preferably $1 \times 10^{-8}$ to $5 \times 10^{-2}$ mol.

10) Adsorptive Redox Compound Having an Adsorptive Group and a Reducing Group.

In the embodiment, there is preferably incorporated an adsorptive redox compound having an adsorptive group, and a reducing group which acts on a silver halide in a molecule. Preferably, the adsorptive compound is one which can be represented by the following formula (I).

$$A-(W)n-B \qquad \text{Formula (I):}$$

[In formula (I), A represents a group which is adsorptive on silver halide (hereinafter referred to as adsorptive group), W represents a divalent linking group, "n" is 0 or 1, and B represents a reducing group.]

The adsorptive group represented by A in formula (I) means a group which is directly adsorbed onto silver halide or a group promoting the adsorption onto silver halide. Specific examples of the adsorptive group include a mercapto group (or salts thereof); a thione group (—C(=S)—); a heterocyclic group containing at least one atom selected from a nitrogen atom, a sulfur atom, a selenium atom, and a tellurium atom; a sulfide group; a disulfide group; a cationic group; and an ethynyl group.

The term "mercapto group (or a salt thereof)" serving as the adsorptive group means not only a mercapto group (or a salt thereof) per se but also, preferably, a heterocyclic, aryl, or alkyl group substituted with at least one mercapto group (or salt thereof). Herein, the heterocyclic group refers to a 5- to 7-membered, monocyclic or condensed-ring, aromatic, or nonaromatic heterocycle. Examples of the heterocyclic group include an imidazole ring group, a thiazole ring group, an oxazole ring group, a benzimidazole ring group, a benzothiazole ring group, a benzoxazole ring group, a triazole ring group, a thiadiazole ring group, an oxadiazole ring group, a tetrazole ring group, a purine ring group, a pyridine ring group, a quinoline ring group, an isoquinoline ring group, a pyrimidine ring group, and a triazine ring group. The heterocyclic group may be one containing a quaternary nitrogen atom, which may become a mesoion as a result of dissociation of a substituted mercapto group. When the mercapto group forms a salt, examples of the counter ion thereof include a cation of alkali metal, alkaline earth metal, or heavy metal (e.g., $Li^+$, $Na^+$, $K^+$, $Mg^{2+}$, $Ag^+$, or $Zn^{2+}$); an ammonium ion; a heterocyclic group containing a quaternary nitrogen atom; and a phosphonium ion.

The mercapto group serving as the adsorptive group may further be tautomerized into a thione group.

Examples of the thione group serving as the adsorptive group also include a linear or cyclic thioamido group, a thioureido group, a thiourethane group, and a dithiocarbamic acid ester group.

The heterocyclic group containing at least one atom selected from a nitrogen atom, a sulfur atom, a selenium atom, and a tellurium atom serving as the adsorptive group is a nitrogen-containing heterocyclic group having an —NH— group capable of forming an iminosilver (>NAg) as a partial structure of the heterocycle, or a heterocyclic group having an "—S—" group, an "—Se—" group, a "—Te—" group, or an "=N—" group capable of coordinating to silver ion by coordinate bond as a partial structure of the heterocycle. The former heterocyclic group can be, for example, a benzotriazole group, a triazole group, an indazole group, a pyrazole group, a tetrazole group, a benzimidazole group, an imidazole group, or a purine group. The latter heterocyclic group can be, for example, a thiophene group, a thiazole group, an oxazole group, a benzothiazole group, a benzoxazole group, a thiadiazole group, an oxadiazole group, a triazine group, a selenoazole group, a benzoselenoazole group, a tellurazole group, or a benzotellurazole group.

Examples of the sulfide group serving as the adsorptive group include all the groups containing a partial structure of "—S—" or "—S—S—".

The cationic group serving as the adsorptive group refers to a group containing a quaternary nitrogen atom; specifically, a group containing an ammonio group, or a nitrogen-containing heterocyclic group containing a quaternary nitrogen atom. The nitrogen-containing heterocyclic group containing a quaternary nitrogen atom can be, for example, any of a pyridinio group, a quinolinio group, an isoquinolinio group, and an imidazolio group.

The ethynyl group serving as the adsorptive group means a —C≡CH group, whose hydrogen atom may be substituted.

The above adsorptive groups may have an arbitrary substituent.

Furthermore, specific examples of the adsorptive group include those listed on pages 4 to 7 of JP-A-11-95355.

The adsorptive group denoted by A in formula (I) is preferably a nitrogen-containing heterocyclic group substituted with mercapto (e.g., a 2-mercaptothiadiazole group, a 3-mercapto-1,2,4-triazole group, a 5-mercaptotetrazole group, a 2-mercapto-1,3,4-oxadiazole group, a 2-mercaptobenzoxazole group, a 2-mercaptobenzothiazole group, a 1,5-dimethyl-1,2,4-triazorium-3-thiolate group, a 2,4-dimercaptomercaptopyrimidine group, a 2,4-triazole group, a 3,5-dimethylmercapto-1,2,4-triazole group, or a 2,5-dimercapto-1,3-thiazole group), or a nitrogen-containing heterocyclic group having an —NH— group capable of forming an iminosilver (>NAg) as a partial structure of the heterocycle (e.g., a benzotriazole group, a benzimidazole group, or an indazole group), more preferably a 2-mercaptobenzimidazole group, or a 3,5-dimercapto-1,2,4-triazole group.

In formula (I), W represents a divalent linking group. Any divalent linking group can be used, as long as it does not have an adverse effect on photographic performance. For example, a divalent linking group comprising carbon atoms, hydrogen atoms, oxygen atoms, nitrogen atoms, and sulfur atoms can be used. Specific examples of the divalent liking group include an alkylene group having 1 to 20 carbon atoms (e.g., methylene, ethylene, trimethylene, tetramethylene, or hexamethylene), an alkenylene group having 2 to 20 carbon atoms, an arylene group having 6 to 20 carbon atoms (e.g., phenylene or naphthylene) , —CO—, —SO$_2$—, —O—, —S—, —NR$_1$—, and a combination of these divalent linking groups. R$_1$ referred to here represents a hydrogen atom, an alkyl group, a hetrocyclic group, or an aryl group. The divalent linking group represented as W may have an arbitrary substituent.

In formula (I) , the reducing group denoted by B represents a group capable of reducing silver ion. Specific examples of B include a formyl group, an amino group, a triple-bonding group including an acetylene group or a propargyl group, or a residue resulting from removal of a hydrogen atom from: a mercapto group, hydroxylamines, hydroxamic acids, hydroxyureas, hydroxysemicarbazidos, reductones (including reductone derivatives), anilines, phenols (including chroman-6-ols, 2,3-dihydroxybenzofruan-5-ols, aminophenols, sulfonamidophenols, and polyphenols such as hydroquinones, catechols, resorcinols, benezentriols, and bisphenols), acylhydrazines, carbamoylhydrazines, 3-pyrazolidones, or the like. As a matter of course, these groups may have an arbitrary substituent.

An oxidation potential of each of the reducing compounds represented by B in formula (I) can be measured by use of measuring methods described in "DENKIKAGAKU SOKUTEIHOU," pp. 150–208, GIHODO SHUPPAN Co. Ltd., and "JIKKEN KAGAKU KOUZA Experimental chemical Course," 4th Edition, edited and written by Chemical Society of Japan, Vol. 9, pp. 282–344, Maruzen Co., Ltd. For example, a rotary disc voltammetry method can be used. Specifically, a sample is dissolved in a solution of methanol and Britton-Robinson buffer (pH 6.5) in the proportion of 10% to 90% (volume %) and passed through a nitrogen gas for 10 minutes. Then, by use of the following electrodes: a rotary disc electrode (RDE) made of glassy carbon serving as a working electrode; a platinum wire as serving a counter electrode; and a saturated calomel electrode serving as a reference electrode, the oxidation potential of the sample is measured at 25° C., a sweep speed of 1000 revolutions per minute, and 20 mV/s. A half-wave potential (E1/2) can be determined from the obtained voltammogram.

When measured by the above method, the oxidation potential of the reducing compound represented by B in the embodiment is preferably about –0.3 to 1.0 V, more preferably about –0.1 to 0.8 V, and particularly preferably about 0 to 0.7 V.

In formula (I), the reducing group denoted by B is preferably a residue resulting from removal of a hydrogen atom from a hydroxylamine, a hydroxamic acid, a hydroxyurea, a hydroxysemicarbazido, a reductone, a phenol, an acylhydrazine, a carbamoylhydrazine, a 3-pyrazolidone, or the like.

Detailed examples of a reducing group denoted by B are set forth below; however, the embodiment is not limited to these. Here, the symbol "*" indicates a position where the reducing group is bonded with A or W in formula (I).

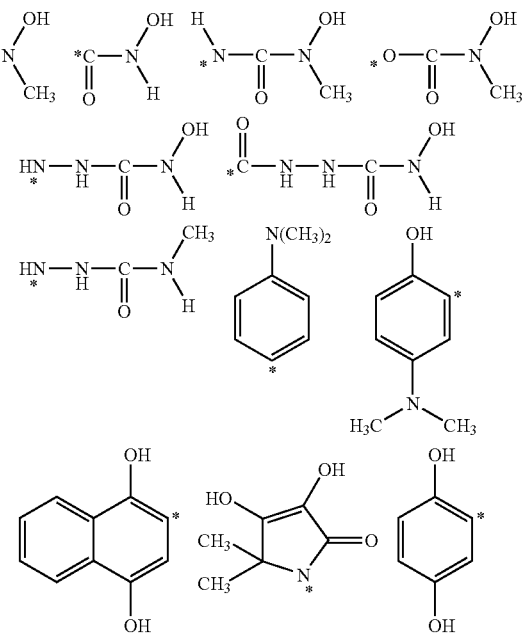

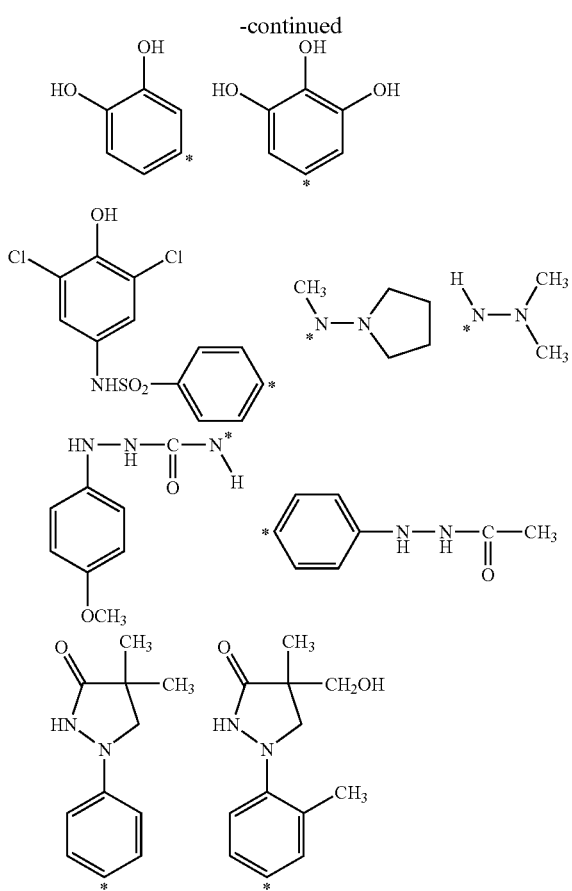

The compounds represented by formula (I) of the embodiment may incorporate a ballast group or a polymer group that is commonly used as an immobile photographic additive such as a coupler. Examples of the polymers include those described in, e.g., JP-A-1-100530.

The compounds represented by formula (I) of the embodiment may be a compound in a bis-form or tris-form. The molecular weights of compounds represented by formula (I) of the embodiment preferably fall within the range of 100 to 10,000, more preferably 120 to 1,000, still more preferably 150 to 500.

In the embodiment, the adsorptive redox compound having an adsorptive group and a reducing group acting on silver halide is identical with that described in detail in Japanese Patent Application No. 2002-328531 and Japanese Patent Application No. 2002-379884. The specific compounds described in these patent applications are also examples of the compounds of the adsorptive redox compound having an adsorptive group and a reducing group acting on silver halide.

The compounds of the embodiment can be easily synthesized by using examples from known methods.

The compounds represented by formula (I) may be used singly; however, they are preferably used in combination of two or more. When two or more compounds are used in combination, they may be added to a single layer or to different layers. Furthermore, they may be added to each compound by different addition methods.

The compound represented by formula (I) of the embodiment is preferably added to a silver halide emulsion layer, preferably during the preparation of silver halide emulsion.

When added during emulsion preparation, the compound may be added at any step in the process; for example, during grain formation, before a desalting step, during a desalting step, before a chemical ripening step, during the chemical ripening step, or during a process before adjustment of completed emulsion. The compound may be added separately a plurality of times during the steps. The compound is preferably used in an emulsion layer, but the compound may be added in a protective layer or interlayer together with the emulsion layer, thereby making the compound diffuse during coating.

A preferable amount of addition highly depends on an addition method or the kind of added compound described above. In general, the amount of addition is $1\times10^{-6}$ to 1 mol per mol of silver halide, preferably $1\times10^{-5}$ to $5\times10^{-1}$ mol, more preferably $1\times10^{-4}$ to $1\times10^{-1}$ mol.

The compound represented by formula (I) may be added by dissolution in water or a water-soluble solvent such as methanol, ethanol, or a mixture of these solvents. When dissolved in water or a water solvent, its pH may be adjusted with acids or base, as appropriate. A surfactant may also be present. Furthermore, the compound can be added by being dissolved in a high-boiling-point solvent serving as a emulsified dispersion. It can also be added as a solid dispersion.

11) Sensitizing Dye

A sensitizing dye that can be used in the embodiment may be advantageously selected from among those which can spectrally sensitize silver halide grains in a desired wavelength region upon absorption to silver halide grains and whose spectral sensitivities are appropriate for spectral characteristics of an exposure light source. The photothermographic material of the embodiment is preferably sensitized so as to have a spectral sensitivity peak of 600 nm to 900 nm, or 300 nm to 500 nm. Descriptions in relation to sensitizing dyes and their addition methods can be found in compounds represented by general formula (II) of paragraph Nos. 0103 to 0109 of JP-A-10-186572, dyes represented by general formula (I) of JP-A-11-119374 and paragraph No. 0106 of JP-A-11-119374, U.S. Pat. No. 5,510,236, embodiment 5 of U.S. Pat. No. 3,871,887, dyes disclosed in JP-A-2-96131 and JP-A-59-48753, EP No. 0803764A1 (line 38, page 19 to line 35, page 20), Japanese Patent Application No. 2000-86865, Japanese Patent Application No. 2000-102560, Japanese Patent Application No. 2000-205399, or the like. These sensitizing dyes may be used either singly or in combination of two or more.

The amount of sensitizing dye may be determined in accordance with requirements, such as sensitivity or fogging performance; however, it is preferably from $10^{-6}$ to 1 mol per mol of silver halide in the image formation layer (the photosensitive layer), more preferably from $10^{-4}$ to $10^{-1}$ mol.

In the embodiment, a supersensitizer may be used in order to elevate spectral sensitization efficiency. Examples of supersensitizers that can be used in the embodiment include compounds described in EP No. 587,338, U.S. Pat. Nos. 3,877,943, 4,873,184, JP-A-5-341432, JP-A-11-109547, and JP-A-10-111543.

12) Combined Use of Silver Halide

In the photosensitive material for use in the embodiment, it may be the case that only one kind of photosensitive silver halide emulsion is used, or two or more kinds of emulsions (for example, emulsions that differ in average grain size, halogen composition, crystal habit, or chemical sensitization conditions) may be used in combination. In the case where a plurality of photosensitive silver halides of different sensitivities are used, gradation can be controlled. The relevant techniques may include those described, for example, in JP-A-57-119341, JP-A-53-106125, JP-A-47-3929, JP-A-48-55730, JP-A-46-5187, JP-A-50-73627, and JP-A-57-150841. Preferably, the emulsions exhibit a sensitivity difference of 0.2 log E or more.

13) Mixing of Silver Halide and Organic Silver Salt

Grains of photosensitive silver halide are formed and subjected to chemical sensitization, particularly preferably in the absence of the non-photosensitive organic silver salt. This is because the method of forming the silver halide by adding a halogenating agent to the organic silver salt sometimes fails to yield sufficient sensitivity.

Examples of methods to mix the silver halide and the organic silver salt include mixing of a separately prepared photosensitive silver halide and an organic silver salt by means of a high speed stirrer, ball mill, sand mill, colloid mill, vibration mill, or homogenizer, and mixing a photosensitive silver halide whose preparation is completed and an organic silver salt which is under preparation and to prepare an organic silver salt. The effect of the embodiment can be obtained by any of the methods described above.

14) Mixing of Silver Halide into Coating Liquid

In the embodiment, preferred timing of adding the silver halide to a coating solution of an image-forming layer is from 180 minutes before the coating to immediately before the coating, preferably 60 minutes to 10 seconds before the coating. No particular limitations are imposed on the mixing method and the mixing conditions, in so far as the effect of the embodiment can be satisfactorily attained. Specific examples of mixing methods include mixing in a tank wherein the average residence time calculated from a flow rate of addition and a feed rate to the coater is controlled to yield a desired time, and mixing by use of a static mixer as described in Chapter 8 of N. Harnby, M. F. Edwards, A. W. Nienow (translated by Koji Takahashi) "Liquid Mixing Technology" (Nikkan Kogyo Shinbun, 1989), and the like.

(Descriptions of Organic Silver Salts)

The non-photosensitive organic silver salt used in the embodiment is a silver salt which is relatively stable under exposure to light but can form a silver image when heated to 80° C. or higher in the presence of a light-exposed photosensitive silver halide and a reducing agent. The organic silver salt may be any organic material containing a source capable of reducing silver ions. Such a non-photosensitive organic silver salt is described in paragraphs 0048 to 0049 of JP-A-10-62899, in EP No. 0803764A1 (page 18, line 24 to page 19, line 37), EP No. 0962812A1, JP-A-11-349591, JP-A-2000-7683, and JP-A-2000-78711. The organic silver salt is preferably a silver salt of an organic acid, more preferably a silver salt of a long chain aliphatic carboxylic acid (having 10 to 30 carbon atoms, particularly preferably 15 to 28 carbon atoms). Preferred organic silver salts include silver behenate, silver arachidate, silver stearate, silver oleate, silver laurate, silver caproate, silver myristate, silver palmitate, and mixtures thereof. Of these organic acid salts, a silver salt of an organic acid whose silver behenate content is 50 to 100 mol % is preferably used in the embodiment. Particularly preferably, the silver behenate content is 75 to 98 mol %.

No particular limitations are imposed on the form of the organic silver salt that can be used in the embodiment, and the form may be needle, bar, tabular, or scaly.

In the embodiment, organic silver salts in the scaly form are preferred. In the embodiment, a scaly organic silver salt is defined as follows. When an organic silver salt is observed under an electron microscope, the shape of an organic silver salt grain is approximated as a rectangular parallelepiped, and the sides thereof are designated as follows: the shortest side is "a"; the side of intermediate length is "b"; and the longest side is "c" ("c" may be equal to "b"). "x" is determined from a calculation using the shorter values of "a" and "b", as follows:

$$x = b/a$$

In such a manner, "x" is calculated for about 200 grains, and the average "x" is designated as "x (average)." When "x (average)" satisfies a relationship that "x (average)" is equal to or larger than 1.5, the grain is defined as a scaly grain. "x (average)" is preferably 1.5 to 30, more preferably 1.5 to 15. Incidentally, when "x (average)" is 1 or more and less than 1.5, the grain has a needle form.

In a scaly grain, the value "a" can be regarded the thickness of a tabular grain with a principal plane having "b" and "c" as its sides. The average of "a" is preferably 0.01 to 0.3 μm, more preferably 0.1 to 0.23 μm. The average of c/b preferably falls within the range of 1 to 6, more preferably 1 to 4, still more preferably 1 to 3, and particularly preferably 1 to 2.

The grain size distribution of the organic silver salt is preferably monodisperse. The term "monodisperse" referred to here means that the value (percent) obtained by dividing the standard deviation of the length of the short axis by the length of the short axis, or the value (percent) obtained by dividing the standard deviation of the length of the long axis by the length of the long axis, is preferably 100% or less, more preferably 80% or less, and still more preferably 50% or less. A shape of an organic silver salt can be determined from an image of the organic silver salt dispersion under a transmission type electron microscope. Another method for determining the monodispersibility is a method of determining the standard deviation of a volume weighted average diameter of the organic silver salt. The percentage (coefficient of variation) of the value obtained by dividing the standard deviation of the volume-weighted average diameter by the volume-weighted average diameter is preferably 100% or less, more preferably 80% or less, still more preferably 50% or less. The measurement procedure includes radiating a laser beam on the organic silver salt dispersed in a solution to determine an autocorrelation function with respect to time-dependent fluctuation in the scattered light, to thereby obtain the grain size (volume-weighted average diameter).

Known processes can be applied to the preparation of the organic silver salt usable in the embodiment and dispersion thereof. For reference see, for example, JP-A-10-62899, EP No. 0803763A1, EP No. 0962812A1, JP-A-11-349591, JP-A-2000-7683, JP-A-2000-72711, JP-A-2001-163827, JP-A-2001-163889, JP-A-2001-163890, JP-A-11-203413, JP-A-2001-188313, JP-A-2001-83652, JP-A-2002-6442, JP-A-2002-31870, and JP-A-2001-107868.

In the embodiment, a photosensitive material can be prepared by mixing an organic silver salt water dispersion and a photosensitive silver salt water dispersion. A method of mixing two or more organic silver salt water dispersions and two or more photosensitive silver salt water dispersions is preferably employed for controlling photographic properties.

In the embodiment, a desired amount of silver salt can be used; however, the amount in terms of silver content is preferably 0.1 to 5 g/m$^2$, more preferably 1 to 3 g/m$^2$, particularly preferably 1.2 to 2.5 g/m$^2$.

(Nucleating Agent)

The photothermographic material of the invention preferably contains a nucleating agent.

A "nucleating agent" according to the invention means a compound which can generate compounds capable of inducing additional development by means of reacting with products—which have been obtained during the development—as a result of the initial development. Utilizing a nucleating agent in an ultra-high-contrast photosensitive material—which is suitable for use in a printing plate—is conventionally known. An ultra-high-contrast photosensitive material, whose average gradation is 10 or higher, is unsuitable as a photosensitive material for ordinary photographs, and particularly unsuitable for medical use where a high diagnostic capability is required. Furthermore, because of its low granularity and lack of sharpness, an ultra-high-contrast photosensitive material has been completely inapt for medical use. The nucleating agent according to the invention exerts effects completely different from those of related-art ultra-high-contrast photosensitive. materials. The nucleating agent according to the invention does not increase the contrast. The nucleating agent according to the invention is a compound capable of causing sufficient development even when the number of photosensitive silver halide grains is considerably small in relation to the amount of a non-photosensitive silver halide. The mechanism for this has not yet been elucidated; however, it has been elucidated that when thermal development is performed by use of the nucleating agent according to the invention, the number of developed silver grains is greater than that of the photosensitive silver halide grains in a maximum density region. Accordingly, it can be surmised that the nucleating agent according to the invention establishes additional development points (i.e., development centers) at points where no silver halide grains are present.

The nucleating agents employed in the invention are the same compounds as those described in detail in Japanese Patent Application No. 2004-136053. Specific examples of compounds described in this patent application can also be referred to as specific examples of a nucleating agent of the embodiment.

Specific examples of the compound among the above-mentioned nucleating agents are set forth below, but the nucleating agents are not limited thereto.

SH-1

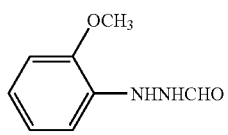

SH-2

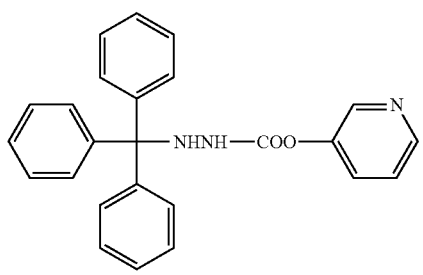

SH-3

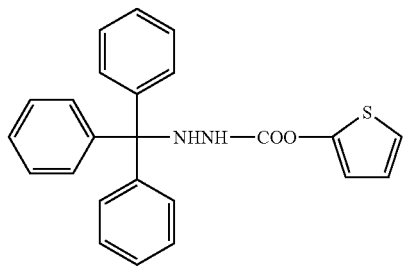

SH-4

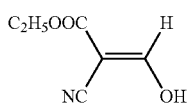

SHO-5

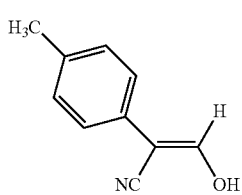

SH-6

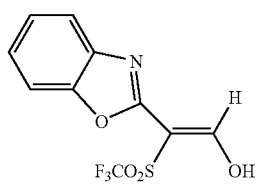

SH-7

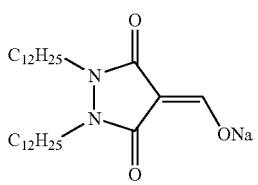

SH-8

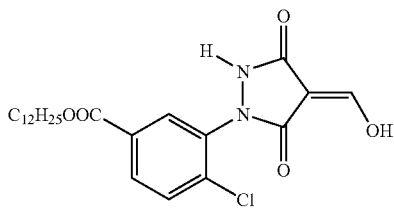

-continued

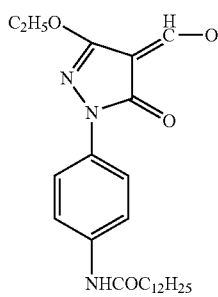
SH-9

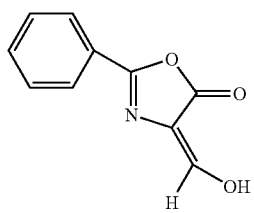
SH-10

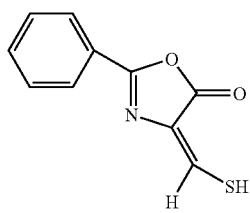
SH-11

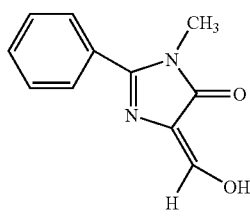
SH-12

With regard to addition method, the nucleating agent may be incorporated in a coating solution, thereby into a photosensitive material, in an arbitrary form, such as a solution, an emulsified dispersion, or a solid fine particle dispersion.

Examples of a well-known emulsification dispersion method include a method of dissolving the nucleating agent in an oil such as dibutyl phthalate, tricresyl phosphate, dioctyl sebacate, tri(2-etylhexel)phosphate, or an auxiliary solvent such as ethyl acetate or cyclohexanone; and subsequently mechanically forming an emulsified dispersion by adding a surfactant such as sodium dodecylbenzenesulfonate, sodium oleoyl-N-methyltaurinate, or sodium di(2-etylhexyl)sulfosuccinate. At this time, addition of a polymer such as α-methyl styrene oligomer or poly(t-butyl acrylamide) for the purpose of adjusting viscosity of oil-drop of refractive index is preferred.

Examples of the solid fine particle dispersion method include a method of dispersing the nucleating agent in powder form in an appropriate solvent such as water, by use of a ball mill, a colloid mill, a vibrating ball mill, a sand mill, a jet mill, a roller mill, or by means of ultrasonic waves, thereby preparing a solid dispersion. At this time, there may be employed a protective colloid (e.g., polyvinyl alcohol) or a surfactant (e.g, an anionic surfactant such as sodium triisopropylnaphthalenesulfonate (a mixture of three substances which differ in the substitution position of an iso-propyl group)). In use of the above-described mills, common practice is to use beads such as zirconia as a dispersion medium. There is a case where Zr or the like eluted from these beads is mixed in the dispersion. The eluted component is usually mixed in an amount of 1 to 1,000 ppm, depending on the dispersing conditions. For practical use, Zr content of the photosensitive material must be not greater than 0.5 mg per gram of silver.

An antiseptic (e.g., benzoisothiazolinone sodium salt) is preferably added to the aqueous dispersion.

For dispersing the nucleating agent, the solid fine particle dispersion method is particularly preferred, wherein the nucleating agent is added in the form of fine particles whose average particle size falls within the range of 0.01 to 10 μm, preferably 0.05 to 5 μm, more preferably 0.1 to 2 μm. In the invention, other solid dispersions are preferably used while their particle sizes fall within the above ranges.

The nucleating agent of the invention can be added to an image-forming layer or a layer adjacent thereto; however, the nucleating agent is preferably added to the image-forming layer. The addition amount of the nucleating agent falls within the range of $10^{-5}$ to 1 mol, preferably $10^{-4}$ to $5 \times 10^{-1}$ mol, per mol of silver. The nucleating agent may be used singly or in combination of two or more.

The photothermographic material of the present invention may include two or more image-forming layers containing photosensitive silver halide. In the case where two or more image-forming layers are included, the nucleating agent may be contained in an arbitrary image-forming layer. Preferably, at least two image-forming layers are included; an image-forming layer which contains the nucleating agent, and another image-forming layer which does not contain the nucleating agent.

(Reducing Agent)

1) Infectious Developing Reducing Agent

The photothermographic material of the invention preferably contains an infectious-developing reducing agent.

The infectious-developing reducing agent may be any reducing agent, so long as it is capable of performing infectious development.

An infectious-developing reducing agent which is preferably used in the invention is a compound represented by the following general formula (R1).

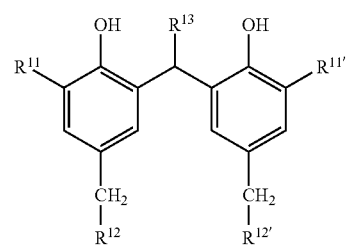
General Formula (R1)

In the general formula (R1), each of $R^{11}$ and $R^{11'}$ independently represents a secondary or tertiary alkyl group having 3 to 20 carbon atoms. Each of $R^{12}$ and $R^{12'}$ independently represents a group linked by way of a hydrogen atom, a nitrogen atom, an oxygen atom, a phosphorus atom, or a sulfur atom. $R^{13}$ represents a hydrogen atom or an alkyl group having 1 to 20 carbon atoms.

The infectious-developing reducing agents employed in the invention are the same compounds as those described in detail in Japanese Patent Application No. 2004-136052.

Specific examples of the compound described in the patent application can also be referred to as specific examples of a nucleating agent of the embodiment.
Specific examples of the compounds represented by general formula (R1) of the invention are shown below; however, the invention is not limited thereto.
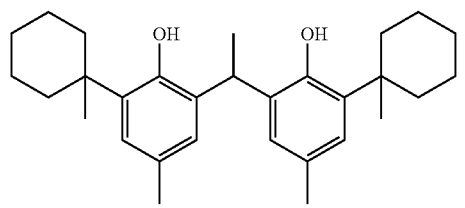
R1-9
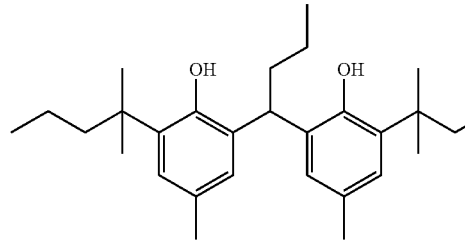
R1-10
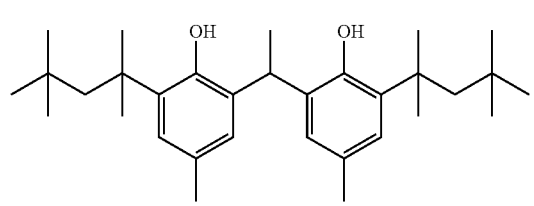
R1-11
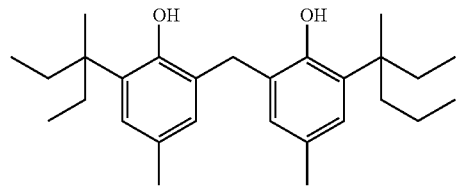
R1-12
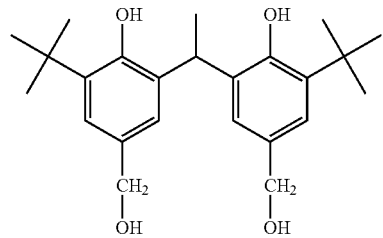
R1-13
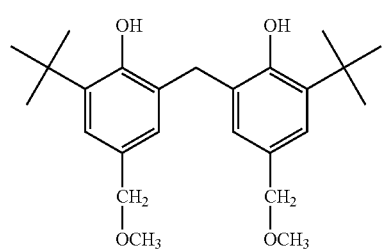
R1-14
-continued
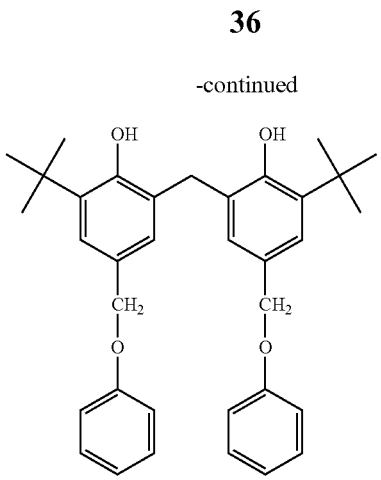
R1-15
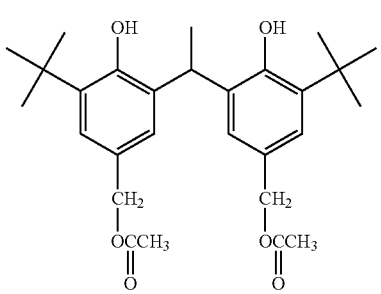
R1-16
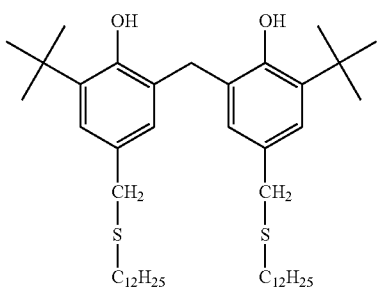
R1-17
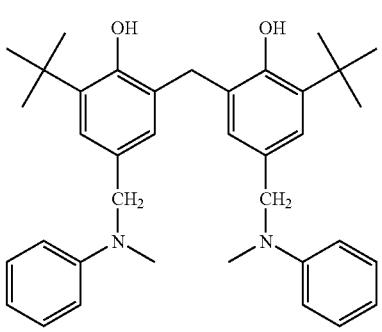
R1-18
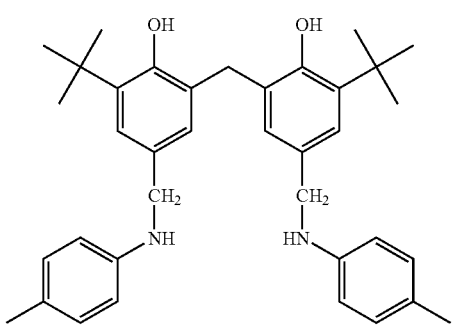
R1-19

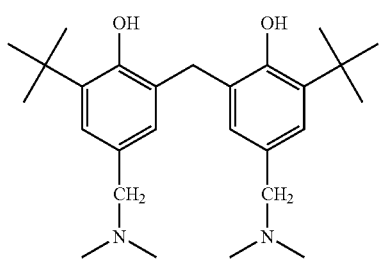
R1-20
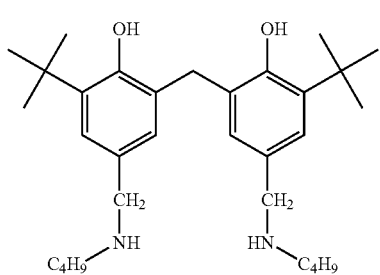
R1-21
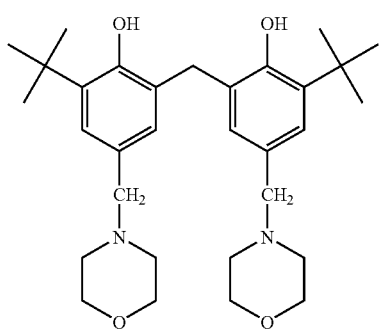
R1-22
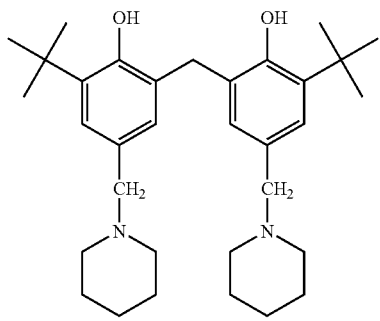
R1-23
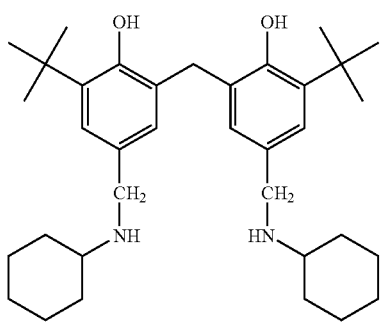
R1-24
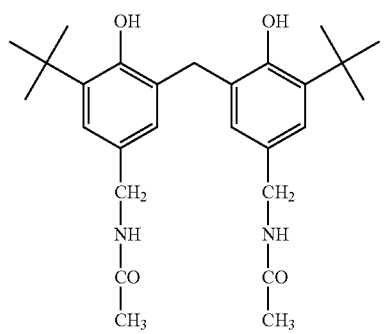
R1-25
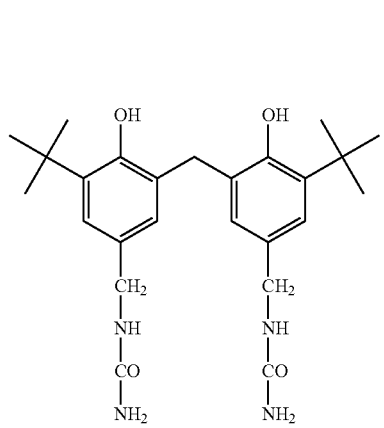
R1-26
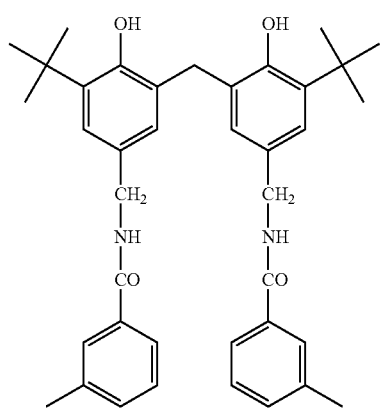
R1-27
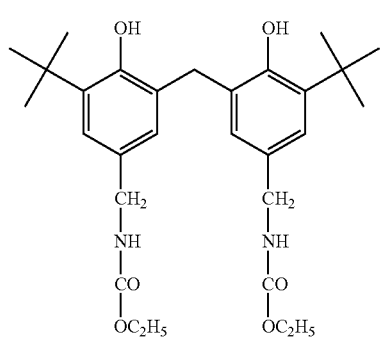
R1-28

-continued
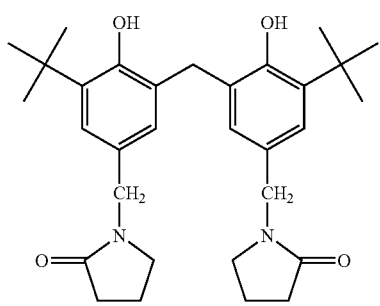
R1-29
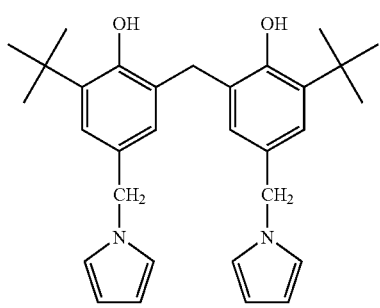
R1-30
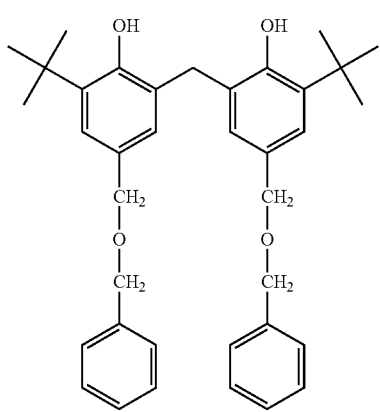
R1-31
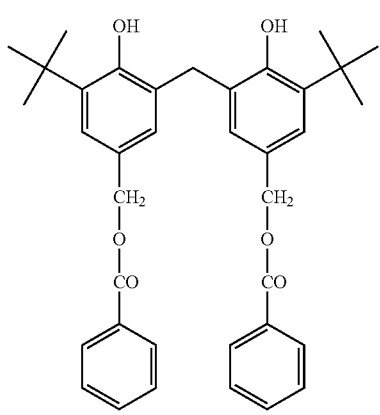
R1-32
-continued
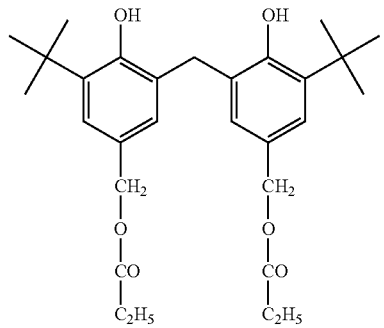
R1-33
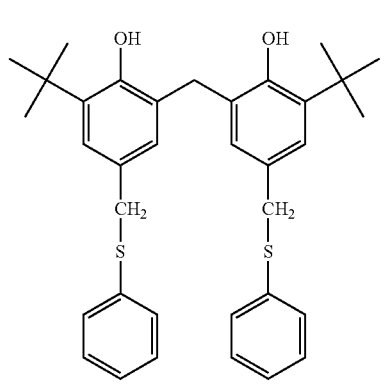
R1-34
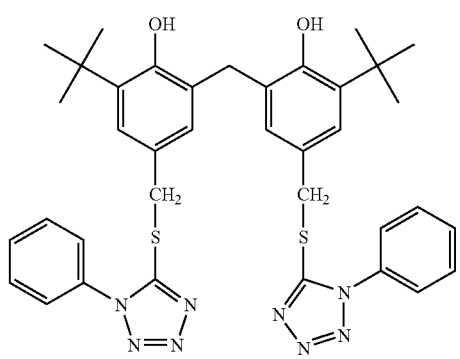
R1-35
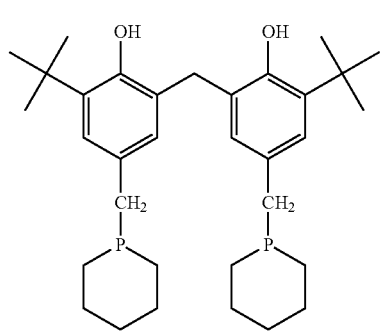
R1-36
The addition amount of the reducing agent represented by general formula (R1) is preferably 0.01 to 5.0 g/m$^2$, more preferably 0.1 to 3.0 g/m². The reducing agent is preferably contained in an amount of 5 to 50 mol %, more preferably 10 to 40 mol %, per mol of silver on the side where an image-forming layer is provided.

The reducing agent represented by general formula (R1) is preferably contained in the image-forming layer.

In particular, the reducing agent represented by general formula (R1) is preferably contained in the image-forming layer which contains silver halide emulsion of low photo-sensitivity.

2) Reducing Agent

In the invention, other reducing agents may be used in combination with the reducing agent represented by general formula (R1). Reducing agents that can be used in combination with the reducing agent represented by general formula (R1) include any substance (preferably, an organic substance) capable of reducing silver ions into elemental silver. Examples of the reducing agent are described in paragraph Nos. 0043 to 0045 of JP-A-11-65021 and EP-A No. 0803764 (p. 7, line 34 to p. 18, line 12).

In the embodiment, the reducing agent is preferably a so-called hindered phenolic reducing agent or a bisphenol agent having a substituent at the ortho-position of the phenolic hydroxyl group. A compound represented by the following general formula (R) is particularly preferred.

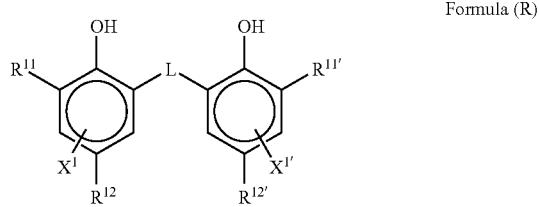

Formula (R)

In the general formula (R), $R^{11}$ and $R^{11'}$ each independently represents an alkyl group having 1 to 20 carbon atoms. $R^{12}$ and $R^{12'}$ each independently represents a substituent group capable of substituting for a hydrogen atom or a benzene ring. L represents an —S— group or a —$CHR^{13}$— group. $R^{13}$ represents a hydrogen atom or an alkyl group having 1 to 20 carbon atoms. $X^1$ and $X^{1'}$ each independently represents a group capable of substituting for a hydrogen atom or a benzene ring.

Each substituent will be described in detail hereinbelow.

1) $R^{11}$ and $R^{11'}$ $R^{11}$ and $R^{11'}$ each independently represents an alkyl group, which may be substituted, having 1 to 20 carbon atoms. No particular limitation is imposed on the substituent for the alkyl group; however, preferred examples include an aryl group, a hydroxy group, an alkoxy group, an aryloxy group, an alkylthio group, an arylthio group, an acylamino group, a sulfoneamide group, a sulfonyl group, a phosphoryl group, an acyl group, a carbamoyl group, an ester group, and a halogen atom.

2) $R^{12}$ and $R^{12'}$, $X^1$ and $X^{1'}$ $R^{12}$ and $R^{12'}$ each independently represents a group capable of substituting for a hydrogen atom or a benzene ring.

$X^1$ and $X^{1'}$ each independently represents a group capable of substituting for a hydrogen atom or a benzene ring. Preferred examples of each group capable of substituting for a benzene ring include an alkyl group, an aryl group, a halogen atom, an alkoxy group, and an acylamino group.

3) L

L represents an —S— group or a —$CHR^{13}$— group. $R^{13}$ represents a hydrogen atom or an alkyl group having 1 to 20 carbon atoms, wherein the alkyl group may have a substituent.

Specific examples of the non-substituted alkyl group of $R^{13}$ include a methyl group, an ethyl group, a propyl group, a butyl group, a heptyl group, an undecyl group, an isopropyl group, a 1-ethylpentyl group, and a 2,4,4-trimethylpentyl group.

As is the case with the substituent for $R^{11}$, examples of the substituent for the alkyl group include a halogen atom, an alkoxy group, an alkylthio group, an aryloxy group, an arylthio group, an acylamino group, a sulfoneamide group, a sulfonyl group, a phosphoryl group, an oxycarbonyl group, a carbamoyl group, and a sulfamoyl group.

4) Preferred Substituents

Preferably, $R^{11}$ and $R^{11'}$ are each a secondary or tertiary alkyl group having 3 to 15 carbon atoms. Specific examples include an isopropyl group, an isobutyl group, a t-butyl group, a t-amyl group, a t-octyl group, a cyclohexyl group, a cyclopentyl group, a 1-methylcyclohexyl group, and a 1-methylcyclopropyl group. More preferably, $R^{11}$ and $R^{11'}$ are each a tertiary alkyl group having 4 to 12 carbon atoms, with a t-butyl group, a t-amyl group, or a 1-methylcyclohexyl group being particularly preferred, and a t-butyl group being most preferred.

Preferably, $R^{12}$ and $R^{12'}$ are each an alkyl group having 1 to 20 carbon atoms. Specific examples thereof include a methyl group, an ethyl group, a propyl group, a butyl group, an isopropyl. group, a t-butyl group, a t-amyl group, a cyclohexyl group, a 1-methylcyclohexyl group, a benzyl group, a methoxymethyl group, and a methoxyethyl group. Of these, more preferred examples are a methyl group, an ethyl group, a propyl group, an isopropyl group, and a t-butyl group.

Preferably, $X^1$ and $X^{1'}$ are each a hydrogen atom, a halogen atom, or an alkyl group, with a hydrogen atom being more preferred.

L is preferably a —$CHR^{13}$— group.

$R^{13}$ is preferably a hydrogen atom or an alkyl group having 1 to 15 carbon atoms. Preferred examples of the alkyl group include a methyl group, an ethyl group, a propyl group, an isopropyl group, and a 2,4,4-trimethylpentyl group. Particularly preferably, $R^{13}$ is a hydrogen atom, a methyl group, a propyl group, or an isopropyl group.

When $R^{13}$ is a hydrogen atom, $R^{12}$ and $R^{12'}$ are each preferably an alkyl group having 2 to 5 carbon atoms, more preferably an ethyl group or a propyl group, and most preferably an ethyl group.

When $R^{13}$ is a primary or secondary alkyl group having 1 to 8 carbon atoms, $R^{12}$ and $R^{12'}$ are each preferably a methyl group. $R^{13}$, being the primary or secondary alkyl group having 1 to 8 carbon atoms, is more preferably a methyl group, an ethyl group, a propyl group, or an isopropyl group, still more preferably a methyl group, an ethyl group, or a propyl group.

In a case where each of $R^{11}$, $R^{11'}$ and $R^{12}$, $R^{12'}$ is a methyl group, $R^{13}$ is preferably a secondary alkyl group. In this case, $R^{13}$, being the secondary alkyl group, is preferably an isopropyl group, an isobutyl group, or a 1-ethylpentyl group, with an isopropyl group being more preferred.

The reducing agent described above exhibits various different thermo-developing performances, depending on the combination of $R^{11}$, $R^{11'}$ and $R^{12}$, $R^{12'}$, as well as $R^{13}$. The thermo-developing performances can be controlled by using two or more kinds of reducing agents at various mixing ratios. Therefore, preferably, two or more kinds of reducing agents are used in combination, depending on the purpose.
Specific examples of the compounds represented by the general formula (R) of the embodiment are set forth below, but the compounds of the embodiment are not limited thereto.
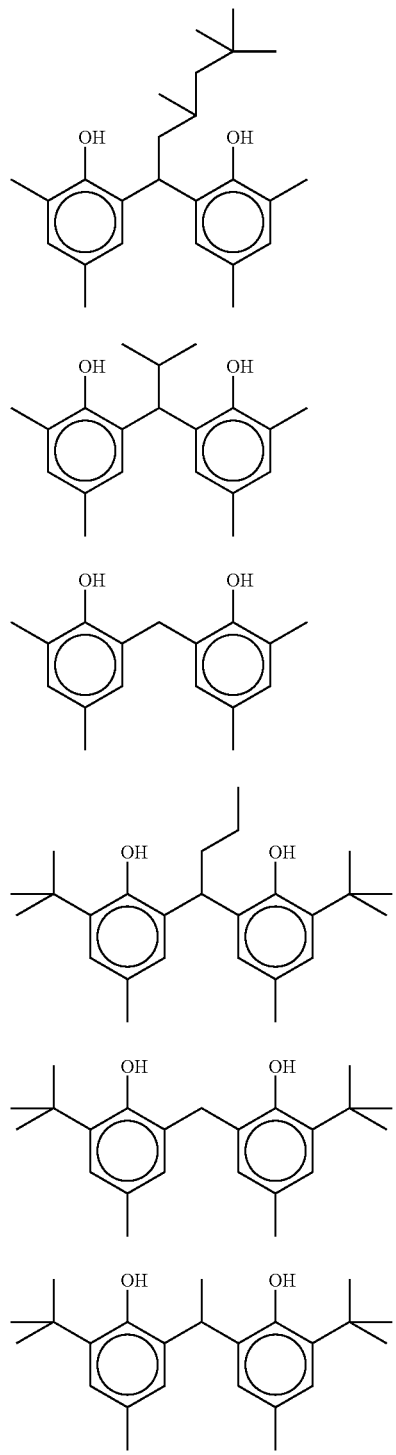
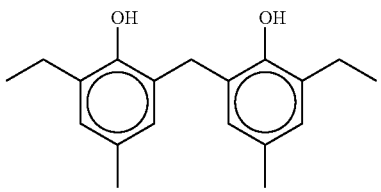
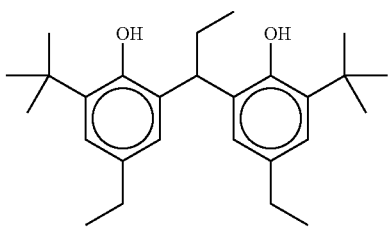
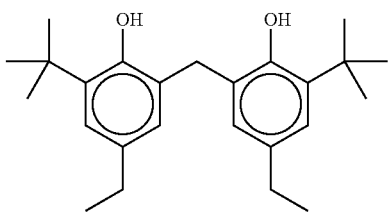
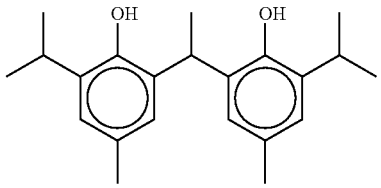
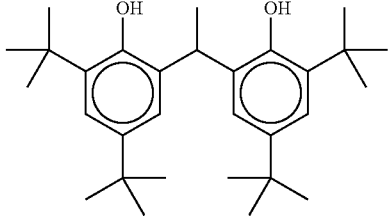
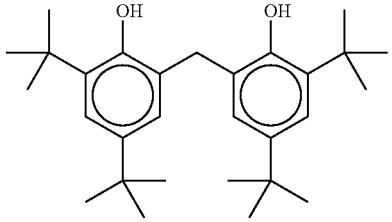
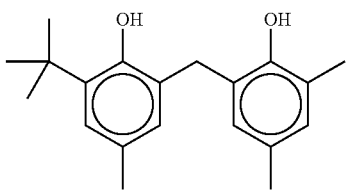

-continued
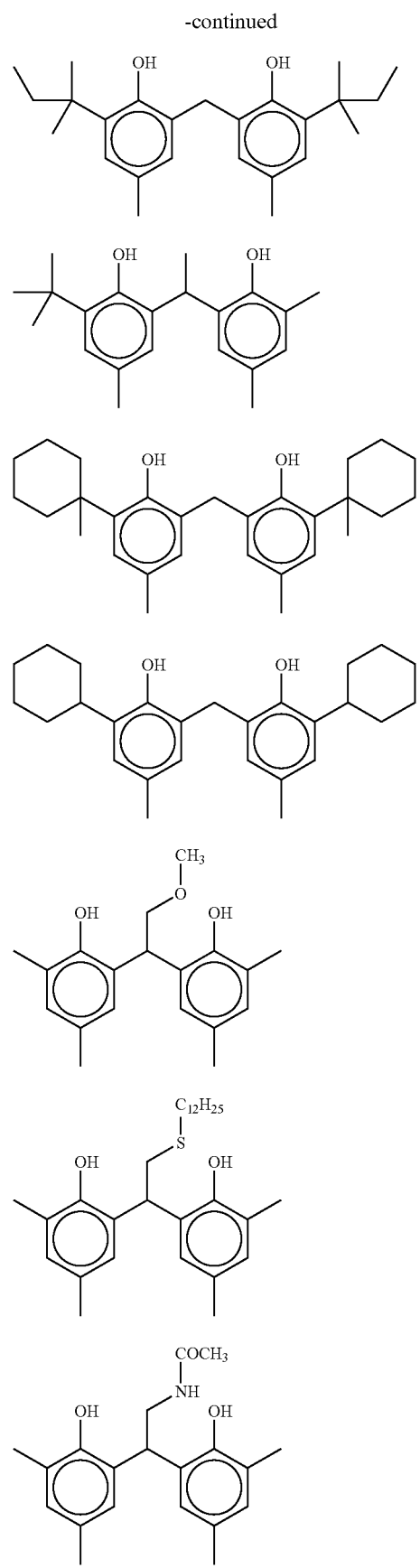
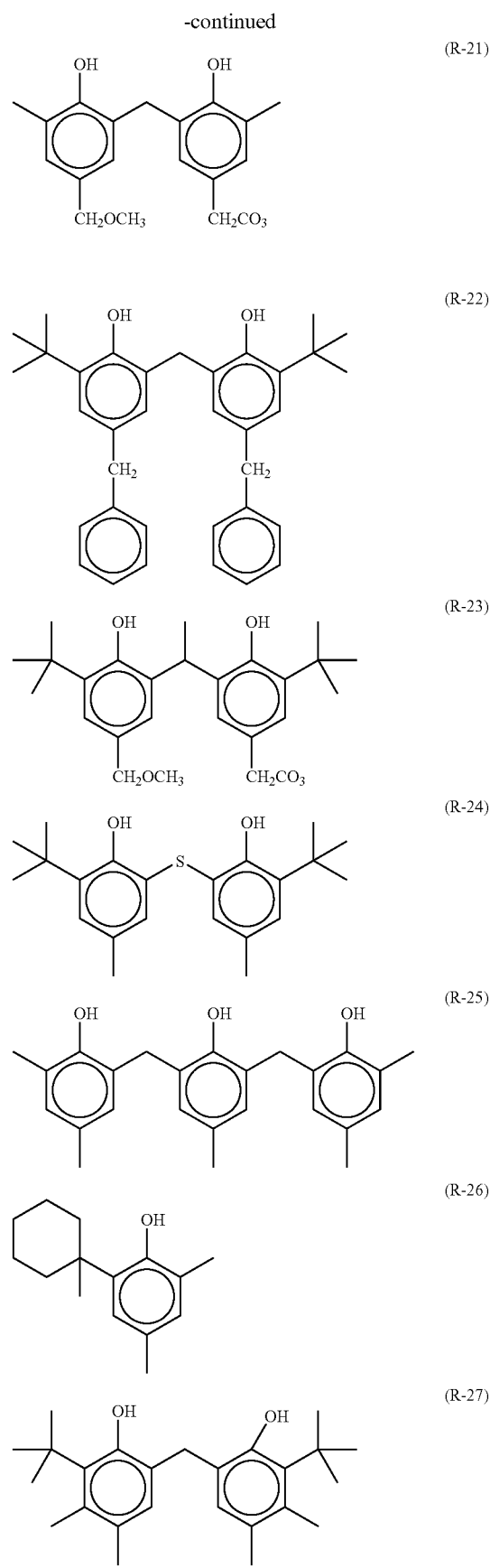

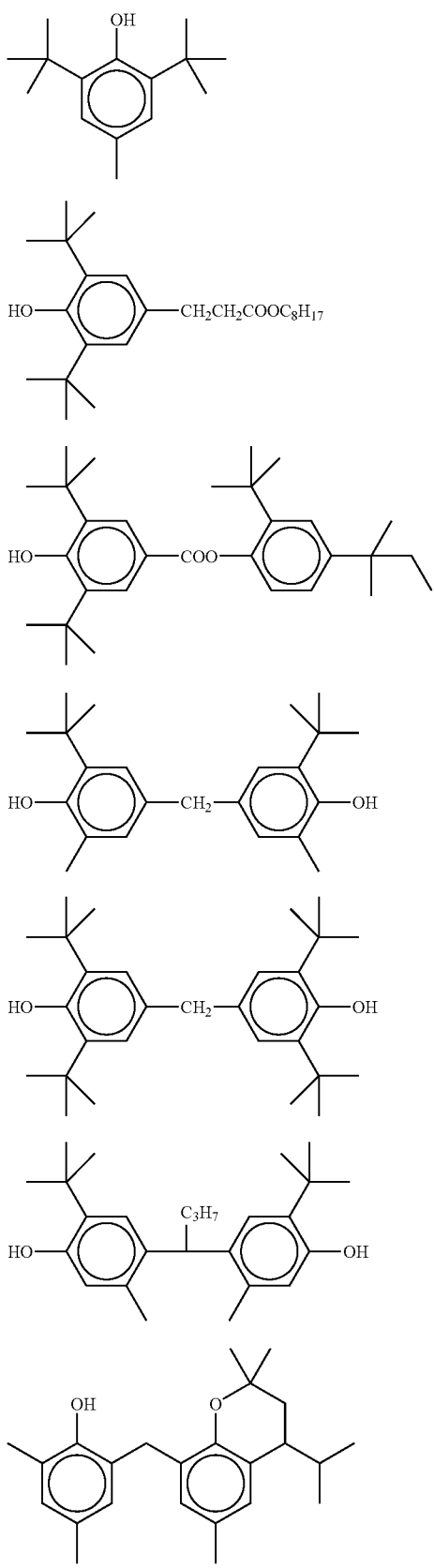

Particularly preferred examples are the compounds represented by (R-1) through (R-20).

The amount of reducing agent in the embodiment is preferably 0.01 to 5.0 g/m², more preferably 0.1 to 3.0 g/m². In case of the side where an image-forming layer is provided, the reducing agent is preferably contained in an amount of 5 to 50 mol % per mol of silver present thereon, more preferably 10 to 40 mol %.

In the embodiment, the reducing agent can be added in an image-forming layer containing an organic silver salt or photosensitive silver halide, or in a layer adjacent thereto; however, the reducing agent is preferably incorporated in an image-forming layer.

In the embodiment, the reducing agent may be incorporated in the coating solution in any form. For example, it may be incorporated in the form of a solution, an emulsified dispersion, or a solid fine grain dispersion so that the resulting coating solution is incorporated in the photosensitive material.

Examples of well-known emulsification dispersion methods include a method for effecting dissolution through use of an oil such as dibutyl phthalate, tricresyl phosphate, glyceryl triacetate, or diethyl phthalate, or an auxiliary solvent, such as ethyl acetate or cyclohexanone, and mechanically forming an emulsified dispersion.

Examples of the solid fine grain dispersion method include a method of dispersing the reducing agent in an appropriate solvent such as water by use of a ball mill, a colloid mill, a vibrating ball mill, a sand mill, a jet mill, a roller mill, or ultrasonic waves, thereby preparing a solid dispersion. A preferred method is a dispersion method using a sand mill. Upon dispersion, there may be employed a protective colloid (e.g., polyvinyl alcohol) or a surfactant (e.g., an anionic surfactant such as sodium triisopropylnaphthalenesulfonate (i.e., a mixture of three substances that differ from each other in the substitution position of an isopropyl group)). Preferably, an antiseptic (e.g., benzoisothiazolinone sodium salt) is added to the aqueous dispersion.

Particularly preferred is the solid grain dispersion method of a reducing agent, wherein the reducing agent is added in the form of fine grains having average grain size of 0.01 μm to 10 μm; preferably 0.05 μm to 5 μm; and more preferably 0.1 μm to 1 μm. In the present patent application, other solid dispersions are also preferably dispersed in a grain size falling within the above described ranges.

(Description of Development Accelerator)

In the photothermographic material of the embodiment, the following is preferably employed as a development accelerator: sulfonamide phenol compounds represented by general formula (A) in JP-A-2000-267222 or JP-A-2000-330234; hindered phenol compounds represented by general formula (II) in JP-A-2001-92075; hydrazine compounds represented by general formula (I) in JP-A-10-62895 or JP-A-11-15116 or by general formula (1) in Japanese Patent Application No. 2001-074278; or phenol or naphthol compounds represented by general formula (2) in Japanese Patent Application No. 2000-76240. These development accelerators are used in an amount of 0.1 to 20 mol % relative to the reducing agent, preferably 0.5 to 10 mol %, more preferably 1 to 5 mol %. A method similar to that employed for the reducing agent can be applied to the introduction of a development accelerator to the photosensitive material; however, particularly preferred is a method where the development accelerator is added in the form of a solid dispersion or an emulsified dispersion. In the case where the development accelerator is added in the form of an emulsified dispersion, a preferred method is: a method where the development accelerator is added in the form of an emulsified dispersion dispersed in a mixture by use of an auxiliary solvent having a high-boiling-point solvent which is solid at room temperature and has a low boiling point; or a method where the development accelerator is added in the form of a so-called oilless emulsified dispersion which does not require a high-boiling-point solvent.

In the embodiment, more preferably, among the development accelerators described above, there is used a hydrazine compound represented by general formula (1) in Japanese Patent Application No. 2001-074278, or a phenol or naphthol compound represented by general formula (2) in Japanese Patent Application No. 2000-76240.

Preferred examples of the development accelerator of the embodiment are set forth below; however, the embodiment is not limited thereto.

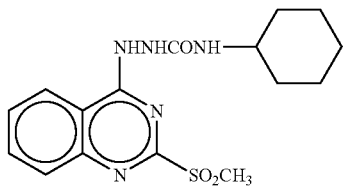

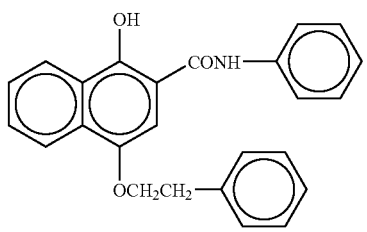

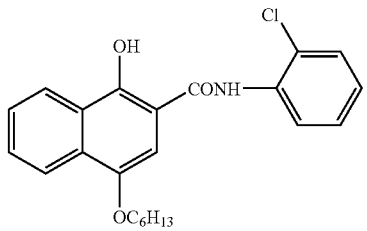

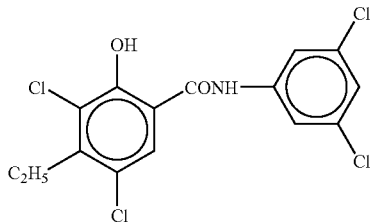

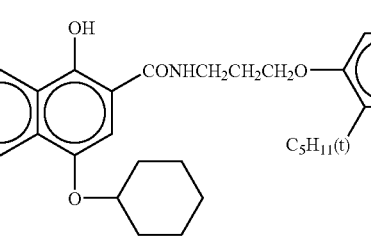

(Descriptions of Hydrogen Bonding Compounds)

In the embodiment, there is preferably used a non-reducing compound having a group capable of forming a hydrogen bond with an aromatic hydroxyl group (—OH) of the reducing agent, or in case where an amino group is present, with an amino group of the reducing agent.

Examples of the group capable of forming a hydrogen bond include a phosphoryl group, a sulfoxide group, a sulfonyl group, a carbonyl group, an amide group, an ester group, a urethane group, a ureido group, a tertiary amino group, and a nitrogen-containing aromatic group. Of these, preferred are the compounds having a phosphoryl group, a sulfoxide group, an amide group (provided that it does not have an >N—H group but has been blocked in the manner of >N—Ra (wherein Ra is a substituent excluding H)), a urethane group (provided that it does not have an >N—H group but has been blocked in the manner of >N—Ra (wherein Ra is a substituent other than H)) or a ureido group (provided that it does not have an >N—H group but has been blocked in the manner of >N—Ra (wherein Ra is a substituent other than H)).

Particularly preferred hydrogen-bonding compounds in the embodiment are those represented by general formula (D) below.

General Formula (D)

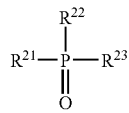

In general formula (D), $R^{21}$ to $R^{23}$ each independently represents an alkyl group, an aryl group, an alkoxy group, an aryloxy group, an amino group, or a heterocyclic group, which may be substituted.

When $R^{21}$ to $R^{23}$ each have a substituent, examples of the substituents include a halogen atom, an alkyl group, an aryl group, an alkoxy group, an amino group, an acyl group, an acylamino group, an alkylthio group, an arylthio group, a sulfonamido group, an acyloxy group, an oxycarbonyl group, a carbamoyl group, a sulfamoyl group, a sulfonyl group, a phosphoryl group, and the like. Of these, preferred substituents are an alkyl group and an aryl group; e.g., a methyl group, an ethyl group, an isopropyl group, a t-butyl group, a t-octyl group, a phenyl group, a 4-alkoxyphenyl group, a 4-acyloxyphenyl group, or the like.

Specific examples of the alkyl group represented by $R^{21}$ to $R^{23}$ each include a methyl group, an ethyl group, a butyl group, an octyl group, a dodecyl group, an isopropyl group, a t-butyl group, a t-amyl group, a t-octyl group, a cyclohexyl group, a 1-methylcyclohexyl group, a benzyl group, a phenethyl group, and a 2-phenoxypropyl group.

Examples of the aryl group include a phenyl group, a cresyl group, a xylyl group, a naphthyl group, a 4-t-butylphenyl group, a 4-t-octylphenyl group, a 4-anisidyl group, and a 3,5-dichlorophenyl group.

Examples of the alkoxy group include a methoxy group, an ethoxy group, a butoxy group, an octyloxy group, a 2-ethylhexyloxy group, a 3,5,5-trimethylhexyloxy group, a dodecyloxy group, a cyclohexyloxy group, a 4-methylcyclohexyloxy group, and a benzyloxy group.

Examples of the aryloxy group include a phenoxy group, a cresyloxy group, an isopropylphenoxy group, a 4-t-butylphenoxy group, a naphthoxy group, and a biphenyloxy group.

Examples of the amino group include a dimethylamino group, a diethylamino group, a dibutylamino group, a dioctylamino group, an N-methyl-N-hexylamino group, a dicyclohexylamino group, a diphenylamino group, and an N-methyl-N-phenylamino group.

Preferably, $R^{21}$ to $R^{23}$ are each an alkyl group, an aryl group, an alkoxy group, or an aryloxy group. Concerning the effect of the embodiment, preferably, one or more of $R^{21}$ to $R^{23}$ is an alkyl group or an aryl group, and more preferably, two or more of them are an alkyl group or an aryl group. In view of availability at low cost, $R^{21}$ to $R^{23}$ are preferably of the same group.

Specific examples of hydrogen-bonding compounds including those represented by general formula (D) according to the embodiment are shown below; however, the embodiment is not limited thereto.

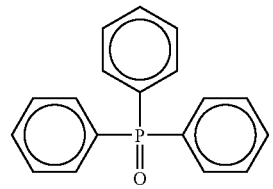
(D-1)

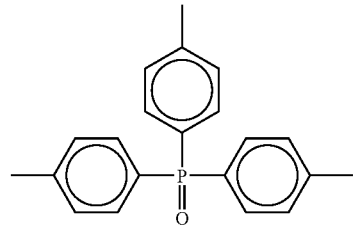
(D-2)

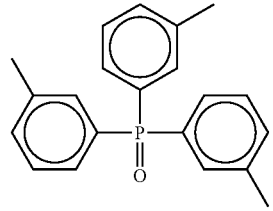
(D-3)

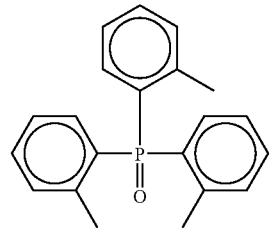
(D-4)

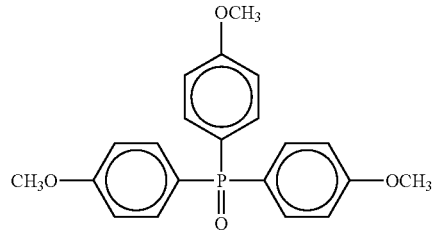
(D-5)

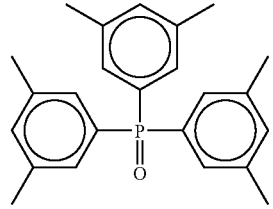
(D-6)

-continued (D-7) 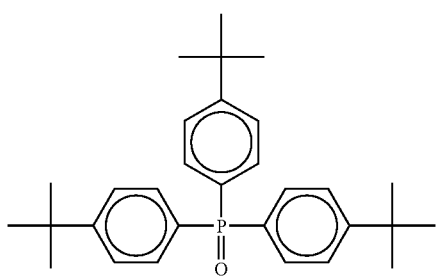

(D-8) 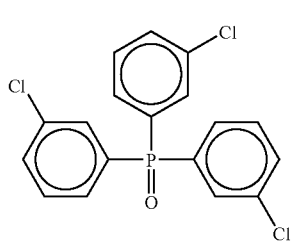

(D-9) 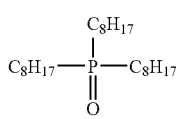

(D-10) 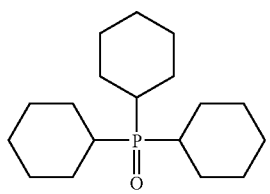

(D-11) 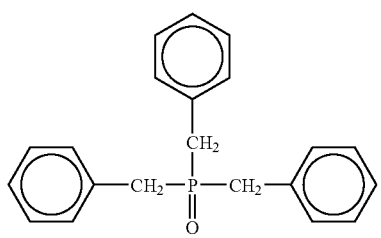

(D-12) 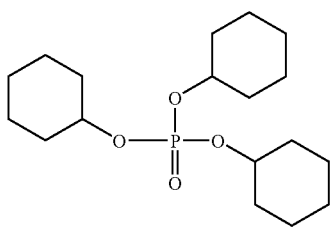

(D-13) 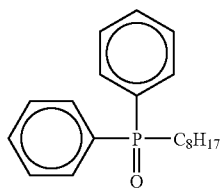

-continued (D-14) 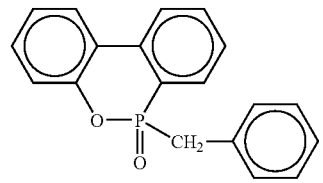

(D-15) 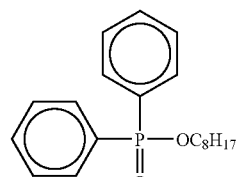

(D-16) 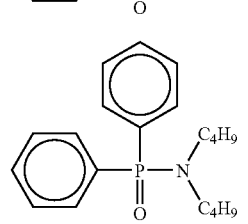

(D-17) 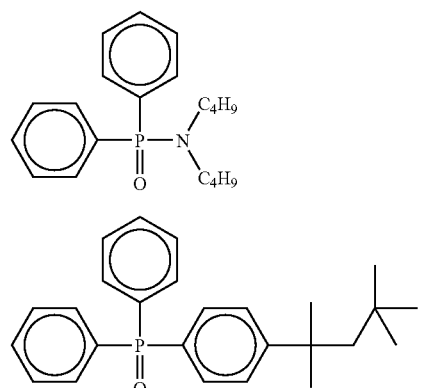

(D-18) 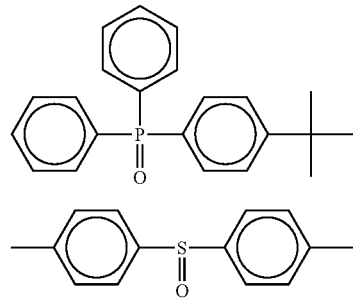

(D-19) 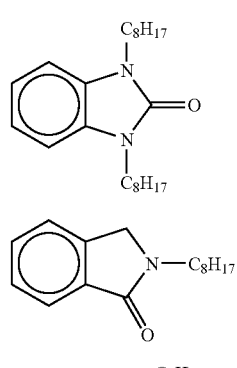

(D-20)

(D-21) 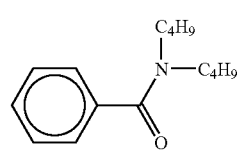

Specific examples of hydrogen-bonding compounds other than those described above include those described in Japanese Patent Application No. 2000-192191 and Japanese Patent Application No. 2000-194811.

The hydrogen-bonding compounds according to the embodiment may be, like the reducing agent, incorporated in the coating solution in the form of a solution, an emulsified dispersion, or a solid fine grain dispersion so that the resulting coating solution is incorporated in the photosensitive material. When in the state of a solution, the compound of the embodiment forms a hydrogen-bonded complex with a compound having a phenolic hydroxyl group. Some of these combinations of the reducing agent and the compound represented by formula (A) can be isolated as a complex of a crystal state.

Use of the thus-isolated crystal powder in the form of a solid fine grain dispersion is particularly preferred, in that stable performance is attained. Alternatively, there is preferably used a method of mixing the reducing agent with the hydrogen-bonding compound, each in the powder form, and dispersing the resultant mixture in a sand grinder mill by use of an appropriate dispersant, thereby forming a complex.

The compound expressed by general formula (D) is preferably used within a range of 1 to 200 mol %, more preferably 10 to 150 mol %, most preferably 30 to 100 mol %, with respect to the reducing agent.

(Description of Binders)

A binder for an organic-silver-salt-containing layer of the embodiment may be of any polymer, and a suitable binder is transparent or translucent, and generally colorless. Examples thereof include: natural resins; polymers and copolymers; synthetic resins, polymers and copolymers; and film-forming media; e.g., gelatins, rubbers, poly(vinyl alcohols), hydroxyethyl celluloses, cellulose acetates, cellulose acetate butyrates, poly(vinylpyrrolidones), casein, starch, poly(acrylic acids), poly(methyl methacrylates), poly(vinyl chlorides), poly(methacrylic acids), styrene-maleic anhydride copolymers, styrene-acrylonitrile copolymers, styrene-butadiene copolymers, poly(vinyl acetals) (e.g., poly (vinyl formal), poly(vinylbutyral)), poly(esters), poly (urethanes), phenoxy resin, poly(vinylidene chlorides), poly (epoxides), poly(carbonates), poly(vinyl acetates), poly (olefins), cellulose esters, and poly(amides). The binders may also be formed from water, an organic substance, or an emulsion by means of coating.

In the embodiment, the binder used in the organic-silver-salt-containing layer preferably has a glass transition temperature (Tg) of 10 to 80° C., particularly preferably 20 to 70° C., and still more preferably 23 to 65° C.

In the specification, Tg is calculated by the following equation:

$$1/Tg = \Sigma(Xi/Tgi)$$

Wherein the polymer is obtained by copolymerization of n monomer compounds (from i=1 to i=n), Xi is the weight fraction ($\Sigma Xi=1$) of the $i^{th}$ monomer, and Tgi is the glass transition temperature (absolute temperature) of a homopolymer of the $i^{th}$ monomer; wherein $\Sigma$ indicates the summation of i=1 to i=n.

Values for the glass transition temperature (Tgi) of a homopolymer in regard to each monomer were obtained from J. Brandrup and E. H. Immergut, "Polymer Handbook" (3rd edition, Wiley-Interscience (1989)).

Polymers serving as the binder may be used singly or, as required, as blends of two or more thereof. A polymer having a glass transition temperature of 20° C. or more and another polymer having a glass transition temperature less than 20° C. may be used in combination. When two or more polymer shaving different Tgs are blended, the weight average Tg thereof preferably falls within the above-described range.

In the embodiment, performance will be enhanced in the case where the organic-silver-salt-containing layer is formed by coating and drying by means of a coating solution whose solvent contains water in an amount of 30 wt % or more; further, where the binder of the organic-silver-salt-containing layer is soluble or dispersible in an aqueous solvent (water solvent); and particularly where the binder is composed of a polymer latex whose equilibrium moisture content at 25° C. and 60% RH is 2% by mass or less.

In a most preferred embodiment, the organic-silver-salt-containing layer is prepared so as to exhibit an ion conductivity of 2.5 mS/cm or lower. Examples of such a preparation method include a refining treatment using a separation function membrane after the polymer is synthesized.

The term "an aqueous solvent in which the polymer is soluble or dispersible" referred to here means water, or a mixture of water and 70% by mass or less of a water-miscible organic.

Examples of the water-miscible organic solvent include alcohol solvents such as methyl alcohol, ethyl alcohol, and propyl alcohol; cellosolve solvents such as methyl cellosolve, ethyl cellosolve and butyl cellosolve; ethyl acetate; and dimethylformamide.

The term "equilibrium moisture content at 25° C. and 60% RH" can be expressed as follows in terms of the weight W1 of a polymer in humidity equilibration in an atmosphere of 25° C. and 60% RH and the weight W0 of a polymer in an oven-dry state at 25° C.:

Equilibrium moisture content at 25° C. and 60%
$$RH = [(W1-W0)/W0] \times 100 \text{ (% by mass)}$$

With regard to the definition and the measuring method of moisture content, reference can be made to, for example, "Kobunshi Kogaku Koza 14, Kobunshi Zairyo Shiken Hou," (edited by Kobunshi Gakkai, Chijin Shokan).

In the embodiment, the equilibrium moisture content of the binder polymer at 25° C. and 60% RH is preferably 2% by mass or less, more preferably 0.01 to 1.5% by mass, still more preferably 0.02 to 1% by mass.

In the embodiment, the binder is particularly preferably a polymer that can be dispersed in an aqueous solvent. Examples of the dispersed state include a state where fine grains of a water-insoluble hydrophobic polymer are dispersed in the form of latex, and a state where polymer molecules are dispersed in the molecular state or by forming micelles; either of these states is preferred.

The dispersed particles preferably have an average particle size of about 1 to 50,000 nm, more preferably about 5 to 1,000 nm. No particular limitation is imposed on the particle size distribution of the dispersed particles, which may be a broad particle size distribution or a monodisperse particle size distribution.

In the embodiment, preferred embodiments of the polymers dispersible in aqueous solvent include hydrophobic polymers such as an acrylic polymer, poly(ester)s, rubbers (e.g., SBR resin), poly(urethane)s, poly(vinyl chloride)s, poly(vinyl acetate)s, poly(vinylidene chloride)s, and poly (olefin)s. These polymers may be linear polymers, branched polymers, or crosslinked polymers. They may also be so-called homocopolymers in which single monomers are polymerized, or copolymers in which two or more kinds of monomers are polymerized. The copolymer may be a random copolymer or a block copolymer.

The number average molecular weight of these polymers ranges from 5,000 to 1,000,000, preferably 10,000 to 200,000. Polymers having too small molecular weight provide insufficient dynamic strength of the emulsion layer, whereas polymers having too large a molecular weight provide poor depositing property and hence are not preferred.

Preferred examples of the polymer latex include the following, wherein the latexes are represented with starting monomers, % by mass is represented by numerical values in parentheses, and number average molecular weight is represented as molecular weight. In the case where polyfunctional monomers are used, a cross-linking structure is formed; therefore, the concept of molecular weight cannot be applied thereto. Such a latex is denoted as "crosslinking," and the molecular weight thereof is omitted. Tg represents a glass transition temperature.

P-1: -MMA (70)-EA(27)-MAA(3)-latex (molecular weight 37,000; Tg 61° C.)

P-2: -MMA (70)-2EHA(20)-St(5)-AA(5)-latex (molecular weight 40,000; Tg 59° C.)

P-3: -St(50)-Bu(47)-MAA(3)-latex (crosslinking; Tg -17° C.)

P-4: -St(68)-Bu(29)-AA(3)-latex (crosslinking; Tg 17° C.)

P-5: -St(71)-Bu(26)-AA(3)-latex (crosslinking; Tg 24° C.)

P-6: -St(70)-Bu(27)-IA(3)-latex (crosslinking)

P-7: -St(75)-Bu(24)-AA(1)-latex (crosslinking; Tg 29° C.)

P-8: -St(60)-Bu (35)-DVB-(3)-MAA(2)-latex (crosslinking)

P-9: -St(70)-Bu(25)-DVB-(2)-AA (3)-latex (crosslinking)

P-10: -VC(50)-MMA(20)-EA(20)-AN(5)-AA(5)-latex (molecular weight 80,000)

P-11: -VDC(85)-MMA(5)-EA(5)-MAA(5)-latex (molecular weight 67,000)

P-12: -Et(90)-MAA(10)-latex (molecular weight 12,000)

P-13: -St(70)-2EHA(27)-AA(3)-latex (molecular weight 130,000; Tg 43° C.)

P-14: -MMA(63)-EA(35)-AA(2)-latex (molecular weight 33,000; Tg 47° C.)

P-15: -St(70.5)-Bu(26.5)-AA(3)-latex (crosslinking; Tg 23° C.)

P-16: -St(69.5)-Bu(27.5)-AA (3) latex (crosslinking; Tg20.5° C.)

P-17; -St(61.3)-isoprene(35.5)-AA(3)-latex (crosslinking; Tg 17° C.)

P-18; -St(67)-isoprene(28)-Bu(2)-AA(3)-latex (crosslinking; Tg 27° C.)

Abbreviations used in the above structures denote the following monomers: MMA; methyl methacrylate, EA; ethyl acrylate, MAA; methacrylic acid, 2EHA; 2-ethylhexyl acrylate, St; styrene, Bu; butadiene, AA; acrylic acid, DVB; divinylbenzene, VC; vinyl chloride, AN; acrylonitrile, VDC; vinylidene chloride, Et; ethylene, and IA; itaconic acid.

The above polymer latexes are also commercially available, and of them, the below polymers may be utilized. Examples of the acrylic polymer include CEBIAN A-4635, 4718, and 4601 (all manufactured by Dicel Chemical Industry Co. Ltd.), and Nipol Lx 811, 814, 821, 820 and 857 (all manufactured by Nippon Zeon Co.). Examples of the poly (ester) polymer include FINETEX ES 650, 611, 675, and 850 (all manufactured by Dainippon Ink Chemical Co.), and WD-size and WMS (both manufactured by Eastman Chemical Co.). Examples of poly(urethane) include HYDRAN AP 10, 20, 30, and 40 (all manufactured by Dai Nippon Ink Chemical Co.). Examples of rubbers include LACSTAR 7310K, 3307B, 4700H, and 7132C (all manufactured by Dainippon Ink Chemical Co.), and Nipol Lx416, 410, 438C, and 2507 (all manufactured by Nippon Zeon Co.). Examples of poly(vinyl chloride) include G 351 and G576 (both manufactured by Nippon Zeon Co.). Examples of poly (vinylidene chloride) include L 502 and L513 (both manufactured by Asahi Kasei Industry Co.). Examples of poly (olefin) include CHEMIPAL S120, and SA100 (both manufactured by Mitsui Petrochemical Co.).

These polymer latexes may be used singly or, as required, as blends of two or more thereof.

The polymer latex for use in the embodiment is particularly preferably a latex of styrene-butadiene copolymer or styrene-isoprene copolymer. In the styrene-butadiene copolymer, a weight ratio of the styrene monomer unit to the butadiene monomer unit preferably falls within the range of 40:60 to 95:5. Furthermore, the styrene monomer unit and the butadiene monomer unit preferably constitute 60 to 99% by mass of the copolymer. The preferred range of the molecular weight is the same as that described above.

The polymer latex for use in the invention preferably contains acrylic acid or methacrylic acid in an amount of 1 to 6% by mass, more preferably 2 to 5% by mass, with respect to the sum of styrene and butadiene.

The polymer latex for use in the invention preferably contains acrylic acid. The preferred range of a monomer content is the same as that described above. The copolymer ratio and the like in the styrene-isoprene copolymer are the same as those in the case of the styrene-butadiene copolymer.

Examples of the styrene-butadiene copolymer latex which is preferably used in the embodiment include the above-described P-3 to P-9, and P-15 and commercially available ones such as LACSTAR-3307B, 7132C, and Nipol Lx416. Examples of the styrene-isoprene copolymer include the aforementioned P-17 and P-18.

The organic-silver-salt-containing layer of the photothermographic material of the embodiment may contain, as required, hydrophilic polymers such as gelatin, polyvinyl alcohol, methyl cellulose, hydroxypropyl cellulose, and carboxymethyl cellulose.

The addition amount of these hydrophilic polymers is preferably 30% by mass or less of the total amount of the binder incorporated in the organic-silver-salt-containing layer, more preferably 20% by mass or less.

The organic-silver-salt-containing layer (i.e., the image-forming layer) of the embodiment is preferably formed by use of the polymer latex as a binder. The weight ratio of the total amount of binder of the layer to the organic silver salt is preferably 1/10 to 10/1, more preferably 1/5 to 4/1.

The organic-silver-salt-containing layer usually doubles as a photosensitive layer (emulsion layer) containing a photosensitive silver halide. In such a case, the weight ratio of the total amount of binder of the layer to the silver halide preferably falls within the range of 400 to 5, more preferably 200 to 10.

The total amount of binder in the image-forming layer in the embodiment is 0.2 to 30 $g/m^2$, preferably 1 to 15 $g/m^2$. A crosslinking agent for crosslinking, a surfactant for improving coating properties, or the like may be added in the image-forming layer of the embodiment.

In the embodiment, the solvent (for the sake of simplicity, "solvent" referred to here is inclusive of a dispersion medium) of the coating solution for the organic silver salt layer is preferably an aqueous solvent containing water in a proportion of at least 30% by weight. Solvents other than water may be arbitrarily selected from water-miscible organic solvents such as methyl alcohol, ethyl alcohol, isopropyl alcohol, methyl cellosolve, ethyl cellosolve, dimethylformamide, and ethyl acetate. The water content of the solvent is preferably 50% by mass or more, more preferably 70% by mass or more.

Preferred solvent compositions (given ratios are ratios by weight) include water 100, water/methyl alcohol=90/10, water/methyl alcohol=70/30, water/methyl alcohol/dimethylformamide=80/15/5, water/methyl alcohol/ethyl cellosolve=85/10/5, and water/methyl alcohol/isopropyl alcohol=85/10/5.

(Description of Antifoggant)

In the embodiment, a compound represented by the general formula (H) below is preferably included as an antifoggant.

$$Q—(Y)n\text{-}C(Y)n\text{-}C(Z_1)(Z_2)X \quad \text{General Formula (H):}$$

In general formula (H), Q represents an alkyl group, an aryl group, or a heterocyclic group; Y represents a divalent linking group; n is 0 or 1; $Z_1$ and $Z_2$ each represents a halogen atom; and X represents a hydrogen atom or an electron-accepting group.

Q represents a phenyl group substituted by an electron-accepting group preferably having a Hammett substituent constant σp of a positive value. The Hammett substituent constant is described, for example, in Journal of Medicinal Chemistry, 1207–1216, Vol. 16, No. 11, (1973).

Examples of such an electron-accepting group include halogen atoms (fluorine (σp: 0.06), chlorine (σp: 0.23), bromine (σp: 0.23), iodine (σp: 0.18)), trihalomethyl groups (tribromomethyl ((σp: 0.29), trichloromethyl ((σp: 0.33), trifluoromethyl ((σp: 0.54)), a cyano group ((σp: 0.66), a nitro group ((σp: 0.78), an aliphatic-aryl or heterocyclic sulfonyl group (e.g., methanesulfonyl ((σp: 0.72)), an aliphatic-aryl or heterocyclic acyl group (e.g., acetyl ((σp: 0.50), benzoyl ((σp: 0.43)), an alkynyl group (e.g., C≡CH (σp: 0.23)), an aliphatic-aryl or heterocyclic oxycarbonyl group (e.g., methoxycarbonyl (σp: 0.45), phenoxycarbonyl (σp: 0.44)), a carbamoyl group (σp: 0.36), a sulfamoyl group (σp: 0.57), a sulfoxide group, a heterocyclic group, and a phosphoryl group.

The σp value preferably falls within the range of 0.2 to 2.0, more preferably the range of 0.4 to 1.

Preferred examples of the electron-accepting group include a carbamoyl group, an alkoxycarbonyl group, an alkylsulfonyl group, an alkylphosphoryl group, a carboxyl group, an alkyl or arylcarbonyl group, and an alkylphosphoryl group. Of these, a carbamoyl group, an alkoxycarbonyl group, an alkylsulfonyl group, and an alkylphosphoryl group are particularly preferred, and a carbamoyl group is most preferred.

X is preferably an electron-accepting group, more preferably a halogen atom, an aliphatic-aryl or heterocyclic sulfonyl group, an aliphatic-aryl or heterocyclic acyl group, an aliphatic-aryl or heterocyclic oxycarbonyl group, a carbamoyl group, or a sulfamoyl group, and particularly preferably a halogen atom.

Of halogen atoms, chlorine, bromine, and iodine are preferred, of which chlorine and bromine are more preferred, and bromine is particularly preferred.

Y preferably represents —C(=O)—, —SO—, or —SO$_2$—, more preferably —C(=O)— or —SO$_2$—, and particularly preferably —SO$_2$—. "n" is 0 or 1, preferably 1.

Specific examples of the compounds represented by the general formula (H) of the embodiment are set forth below, but the embodiment is not limited thereto.

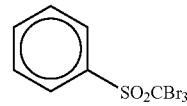
(H-1)

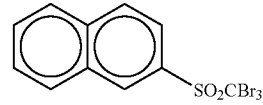
(H-2)

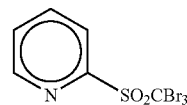
(H-3)

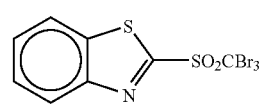
(H-5)

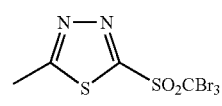
(H-6)

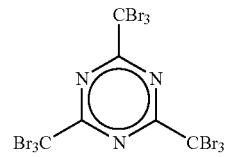
(H-7)

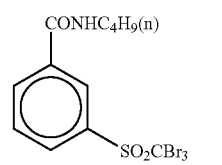
(H-8)

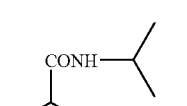
(H-9)

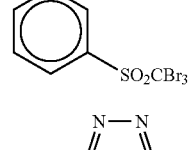
(H-10)

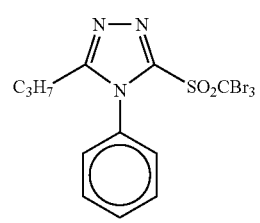
(H-11)

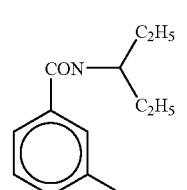

-continued

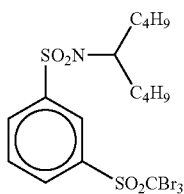 (H-12)

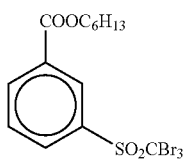 (H-13)

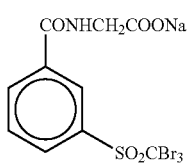 (H-14)

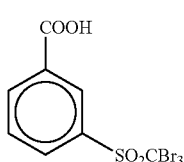 (H-15)

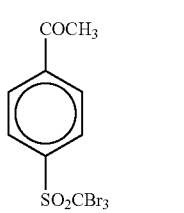 (H-16)

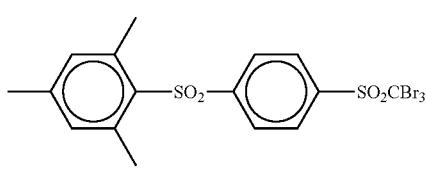 (H-17)

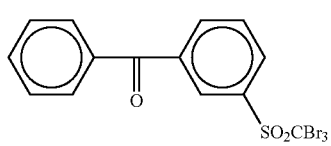 (H-18)

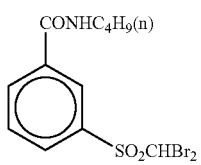 (H-19)

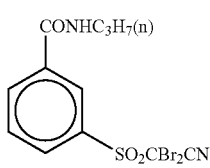 (H-20)

-continued

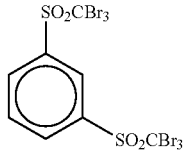 (H-21)

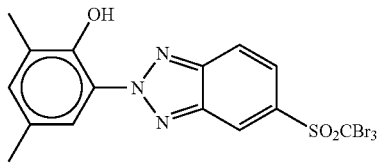 (H-22)

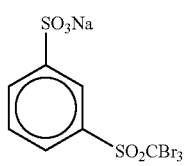 (H-23)

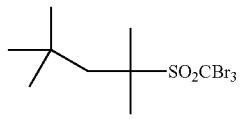 (H-24)

A compound represented by general formula (H) is preferably used in an amount of $10^{-4}$ to 0.8 mol, more preferably $10^{-3}$ to 0.1 mol, still more preferably $5\times10^{-3}$ to 0.05 mol, per mol of the non-photosensitive organic silver salt in the image-forming layer.

Particularly when a silver halide emulsion according to the embodiment containing silver iodide at high content is used, the addition amount of the compound represented by the general formula (H) is an important factor for obtaining a satisfactory antifogging effect. Accordingly, using the compound within the range of $5\times10^{-3}$ to 0.03 mol is most preferred.

In the embodiment, specific examples of a method of incorporating the compound represented by general formula (H) into the photosensitive material can be found in the method described hitherto in connection with incorporating the reducing agent.

A melting point of the compound represented by general formula (H) is preferably 200° C. or less, more preferably 170° C. or less.

Other examples of organic polyhalides used in the embodiment include those disclosed in paragraph Nos. 0111 and 0112 of JP-A-11-65021. Particularly preferred are organic halogen compounds represented by formula (P) in JP-A-11-87297, organic polyhalogen compounds represented by general formula (II) in JP-A-10-339934, and organic polyhalogen compounds described in Japanese Patent Application No. 11-205330.

(Other Antifoggants)

Other examples of the antifoggant include mercury(II) salts described in paragraph No. 0113 of JP-A-11-65021, benzoic acids described in paragraph No. 0114 of JP-A-11-65021, salicylic acid derivatives described in JP-A-2000-206642, formalin scavenger compounds represented by formula (S) of JP-A-2000-221634, triazine compounds according to claim 9 of JP-A-11-352624, compounds represented by general formula (III) of JP-A-6-11791, and 4-hydroxy-6-methyl-1,3,3a,7-tetrazaindene.

Examples of the antifoggant, stabilizer, and stabilizer precursor usable in the embodiment include those described in paragraph No. 0070 of JP-A-10-62899 and EP No. 0803764A1 (page 20, line 57 to page 21, line 7), and compounds described in JP-A-9-281637 and JP-A-9-329864.

For the purpose of preventing fogging, the photothermographic material of the embodiment may contain an azolium salt. Examples of the azolium salt include the compounds represented by formula (XI) of JP-A-59-193447, the compounds described in JP-A-55-12581, and the compounds represented by formula (II) of JP-A-60-153039. The azolium salt may be added to any portion of the photosensitive material. However, it is preferably added to a layer on the surface having a photosensitive layer, more preferably to the organic-silver-salt-containing layer.

The azolium salt may be added at any stage during the preparation of the coating solution. In the case of addition to the organic silver salt-containing layer, the azolium may be added at any stage from preparation of the organic silver salt to preparation of the coating solution. Among them, addition following preparation of the organic silver salt and immediately before coating is preferable. The azolium salt may be added in any form, including powder, solution, and fine grain dispersion. The azolium salt may also be added in the form of a mixed solution containing other additives such as a sensitizing dye, a reducing agent, or color toner.

In the embodiment, the azolium salt may be added in any amount; however, preferably it is added in an amount of $1 \times 10^{-6}$ to 2 mol per mol of silver, more preferably $1 \times 10^{-3}$ to 0.5 mol.

(Other Additives)

1) Mercapto, Disulfide, and Thione Compounds

In the embodiment, mercapto compounds, disulfide compounds, and thione compounds may be added in order to control development by suppressing or enhancing development, to improve spectral sensitization efficiency, or to improve storage properties before and after development. Examples of these compounds include those described in paragraph Nos. 0067 to 0069 of JP-A-10-62899, the compounds represented by the general formula (I) of JP-A-10-186572 and in paragraph Nos. 0033 to 0052 of JP-A-10-186572 as specific examples thereof, in EP No.0803764A1 (lines 36 to 56, page 20), and in Japanese Patent Application No. 11-273670. Of these, mercapto-substituted heteroaromatic compounds are most preferred.

2) Color Toner

In the photothermographic material of the embodiment, addition of a toner is preferred. Examples of the color toner include those described in paragraph Nos. 0054 to 0055 of JP-A-10-62899, EP No. 0803764A1 (page 21, lines 23 to 48), JP-A-2000-356317, and Japanese Patent Application No. 2000-187298. Particularly preferred are phthalazinones (phthalazinone, phthalazinone derivatives, and metal salts thereof; e.g., 4-(1-naphthyl)phthalazinone, 6-chlorophthalazinone, 5,7-dimethoxyphthalazinone, and 2,3-dihydro-1,4-phthalazinedione); combinations of a phthalazinone and a phthalic acid (e.g., phthalic acid, 4-methylphthalic acid, 4-nitrophthalic acid, diammonium phthalate, sodium phthalate, potassium phthalate, and tetrachlorophthalic anhydride); phthalazines (phthalazine, phthalazine derivatives, and metal salts thereof; e.g., 4-(1-naphthyl)phthalazine, 6-isopropylphthalazine, 6-t-butylphthalazine, 6-chlorophthalazine, 5,7-dimethoxyphthalazine, and 2,3-dihydrophthalazine). When being used in combination with a silver-iodide-rich silver halide, a combination of phthalazines and phthalic acids is particularly preferred.

The amount of phthalazines is 0.01 to 0.3 mol per mol of an organic silver salt, preferably 0.02 to 0.2 mol, particularly preferably 0.02 to 0.1 mol. The addition amount described above is an important factor for development acceleration, which is a problem associated with a silver-iodide-rich silver halide. Therefore, when an appropriate amount is chosen, both satisfactory development performance and low fogging can be achieved.

3) Plasticizers and Lubricants

Plasticizers and lubricants that can be used in the photothermographic material of the embodiment are described in paragraph No. 0117 of JP-A-11-65021. Lubricants are described in paragraph Nos. 0061 to 0064 of JP-A-11-84573 and in paragraph Nos. 0049 to 0062 of JP-A-11-106881.

4) Dies, Pigments

In the embodiment, the photosensitive layer may contain various dyes or pigments (e.g., CI.Pigment Blue 60, CI.Pigment Blue 64, CI.Pigment Blue 15:6) in order to improve tones, to inhibit generation of interference fringes on laser exposure, and to prevent irradiation. Detailed descriptions thereof can be found in WO-98-36322, JP-A-10-268465 and JP-A-11-338098, and the like.

5) Ultra-High-Contrast Promoting Agent

In order to form an ultra-high contrast image suitable for use in printing plates, an ultra-high-contrast promoting agent is preferably added in the image-forming layer. Descriptions of ultra-high-contrast promoting agents, their methods of addition, and addition amount can be found in descriptions of compounds represented by formulae (H), (1) to (3), (A), and (B) in paragraph No. 0118 and paragraph Nos. 0136 to 0193 of JP-A-11-223898; and in descriptions of compounds represented by formulae (III) to (V) (specific compounds: chemical No. 21 to chemical No. 24) in JP-A-11-91652. Descriptions of the ultra-high contrast accelerator can be found in paragraph No. 0102 of JP-A-11-65021, and in paragraph Nos. 0194 to 0195 of JP-A-11-223898.

In the case where formic acid or formates are used as a strong fogging agent, the agent is preferably incorporated into the side of the film having thereon the image forming layer containing a photosensitive silver halide, in an amount of 5 mmol or less, preferably 1 mmol or less, per mol of silver.

In the case where the photothermographic material of the embodiment includes an ultra-high-contrast providing agent, the agent is preferably used in combination with an acid obtained by hydration of diphosphorus pentoxide, or a salt thereof. Examples of acids obtained by hydration of diphosphorus pentoxide, and salts thereof include a metaphosphoric acid (and. salts thereof), a pyrophosphoric acid (and salts thereof), an orthophosphoric acid (and salts thereof), a triphosphoric acid (and salts thereof), a tetraphosphoric acid (and salts thereof), and a hexametaphosphoric acid (and salts thereof). Among these, particularly preferred are an orthophosphoric acid (and salts thereof) and a hexametaphosphoric acid (and salts thereof). Specifically mentioned as the salts are sodium orthophosphate, sodium dihydrogen orthophosphate, sodium hexametaphosphate, ammonium hexametaphosphate, and the like.

A desired amount (i.e., the coating amount per $m^2$ of the photosensitive material) of the acid, which has been obtained by hydration of a diphoshorus pentaoxide or the salt thereof, may be added depending on the sensitivity and fogging; however, the amount is preferably 0.1 to 500 $mg/m^2$, more preferably 0.5 to 100 $mg/m^2$.

(Preparation and Application of Coating Solution)

In the embodiment, the temperature of coating solution preparation for the image-forming layer is preferably 30 to 65° C., more preferably 35° C. or more and less than 60° C., and particularly preferably 35 to 55° C. After addition of the polymer latex, the image-forming layer coating solution is preferably maintained at 30 to 65° C.

2. Layer Constitution and Other Components

The photothermographic material in the embodiment may have one or more non-photosensitive layers in addition to the photosensitive layer. The non-photosensitive layers can be classified depending on the layer arrangement into (a) a surface protective layer provided on the image-forming layer (on the farther side from the support), (b) an intermediate layer provided between a plurality of image-forming layers or between the image-forming layer and the protective layer, (c) an undercoat layer provided between the image-forming layer and the support, and (d) a back layer provided on the side opposite the image-forming layer.

A layer serving as an optical filter may also be provided as layer (a) or (b) above. An antihalation layer may be provided as layer (c) or (d) on the photosensitive material.

1) Surface Protective Layer

The photothermographic material of the embodiment may have a surface protective layer for preventing adhesion of the image-forming layer. The surface protective layer may be either single-layered or multilayered. Descriptions of the surface protective layer can be found in paragraph Nos. 0119 to 0120 of JP-A-11-65021, and in Japanese Patent Application No. 2000-171936.

In the embodiment, gelatin is preferably employed as a binder for the surface protective layer; however, employment of polyvinyl alcohol (PVA), solely or in combination with gelatin, is also preferred. Examples of gelatin that can be used include inert gelatin (e.g., "Nitta gelatin750") and phthalated gelatin (e.g., "Nitta gelatin 801").

Examples of PVA include those described in paragraph Nos. 0009 to 0020of JP-A-2000-171936, and preferred examples thereof include a completely saponified product "PVA-105," partially saponified products "PVA-205" and "PVA-335," and modified polyvinyl alcohol "MP-203" (product names, by Kuraray Co., Ltd.) The coating amount (per $m^2$ of the support) of polyvinyl alcohol in the protective layer (per layer) preferably ranges from 0.3 to 4.0 $g/m^2$, more preferably 0.3 to 2.0 $g/m^2$.

The coating amount (per $m^2$ of the support) of the total binder (inclusive of water-soluble polymers and latex polymers) in the surface protective layer is preferably 0.3 to 5.0 $g/m^2$, more preferably 0.3 to 2.0 $g/m^2$.

2) Antihalation Layer

The photothermographic material of the embodiment may provide an antihalation layer on the side opposite a light source with respect to the photosensitive layer. Descriptions of the antihalation layer can be found in paragraph Nos. 0123 to 0124 of JP-A-11-65021, and in JP-A-11-223898, JP-A-9-230531, JP-A-10-36695, JP-A-10-104779, JP-A-11-231457, JP-A-11-352625, JP-A-11-352626, and the like.

The antihalation layer contains an antihalation dye having absorption in the exposure wavelength. In the case where the exposure wavelength falls within the infrared region, an infrared-absorbing dye may be used, and in such a case, dyes having no absorption in the visible region are preferred.

When halation is prevented by employment of a dye having absorption in the visible region, preferably, the color of the dye does not substantially remain after image formation. For this reason, preferably, means for decolarizing by heat of thermal development is employed, and particularly preferably a thermal decolorizable dye and a base precursor are added to the non-photosensitive layer in order to impart a function as an antihalation layer. These techniques are described in JP-A-11-231457 and the like.

The amount of the decolorizable dye is determined on the basis of the purpose for applying the dye. In general, the decolorizable dye is used in such an amount that optical density (absorbance) exceeds 0.1 when measured at a desired wavelength. Preferably, optical density falls within the range of 0.2 to 2. In order to attain such an optical density, the amount of the dye is generally about 0.001 to 1 $g/m^2$.

By decolorization of a dye, the optical density achieved after thermal development can be reduced to 0.1 or less. Two or more decolorizable dyes may be used in combination for a thermo-decolorizable recording material or a photothermographic material. As well, two or more base precursors may be used in combination.

In thermal decolorizing process using such a thermal decolorable dye and a base precursor, from a viewpoint of thermal decolorizability and the like, preferably there is used a substance (for instance, diphenylsulfone, 4-chlorophenyl (phenyl)sulfone, and the like) as disclosed in JP-A-11-352626, which is capable of lowering the melting point of a base precursor by 3° C. or more when mixed with a basic precursor.

3) Back Layer

Back layers usable in the embodiment are described in paragraph Nos. 0128 to 0130 of JP-A-11-65021.

In the embodiment, a coloring agent having an absorption peak at 300 to 450 nm can be added for the purpose of improving silver tone or time-dependent changes of image. Examples of such a coloring agent include those described in JP-A-62-210458, JP-A-63-104046, JP-A-63-103235, JP-A-63-208846, JP-A-63-306436, JP-A-63-314535, JP-A-01-61745, and Japanese Patent Application No. 11-276751. Such a coloring agent is usually added in an amount of 0.1 to 1 $g/m^2$. Preferably, the coloring agent is incorporated into the back layer provided on the support opposite the photosensitive layer.

4) Matting Agent

In the embodiment, a matting agent is preferably on the surface protective layer and on the back layer, for the purpose of improving conveyance. Descriptions of the matting agent can be found in paragraphs Nos. 0126 to 0121 of JP-A-11-65021.

The amount of the matting agent is, in terms of the coated amount per $m^2$ of the photosensitive material, preferably 1 to 400 $mg/m^2$, and more preferably 5 to 300 $mg/m^2$.

The matting degree on the emulsion surface may be any value, so long as stellate failures do not occur; however, preferably, in terms of Beck smoothness, the matting degree is 30 to 2,000 seconds, more preferably 40 to 1,500 seconds. Beck smoothness can be easily determined according to Japanese Industrial Standard (JIS) P8119, "Paper and board—Determination of smoothness by Beck method" and TAPPI Standard Method T479.

In the embodiment, a matting degree of the back layer is, in terms of Beck smoothness, preferably 10 to 1,200 seconds, more preferably 20 to 800 seconds, and still more preferably 40 to 500 seconds.

In the embodiment, the matting agent is preferably incorporated into the outermost surface layer, a layer serving as the outermost surface layer, or a layer close to the outer surface layer, or preferably incorporated into a layer serving as a so-called protective layer.

5) Polymer Latex

In the embodiment, polymer latex can be added to the surface protecting layer or the back layer.

Descriptions of polymer latex can be found in "Synthetic Resin Emulsion" (edited by Taira Okuda and Hiroshi Inagaki and published by Kobunshi Kankokai, 1978); "Application of Syntehic Latex" (edited by Takaaki Sugimura, Yasuo Kataoka, Soichi Suzuki, and Keishi Kasahara and published by Kobunshi Kankokai, 1993); and "Chemistry of Synthetic Latex" (edited by Soichi Muroi and pulished by Kobunshi Kankokai, 1970). Specific examples of polymer latex include a latex copolymer of methyl methacrylate (33.5% by mass)/ethyl acrylate (50% by mass)/methacrylic acid (16.5% by mass), a latex polymer of methyl methacrylate (47.5% by mass)/butadiene (47.5% by mass)/itaconic acid (5% by mass), a latex copolymer of ethyl acrylate/methacrylic acid, a latex copolymer of methyl methacrylate (58.9% by mass)/2-ethylhexyl acrylate (25.4% by mass)/styrene (8.6% by mass)/2-hydroxyethyl methacrylate (5.1% by mass)/acrylic acid (2.0% by mass), and a latex copolymer of methyl methacrylate (64.0% by mass)/styrene (9.0% by mass)/butyl acrylate (20.0% by mass)/2-hydroxyethyl methacrylate (5.0% by mass)/acrylic acid (2.0% by mass).

The amount of the polymer latex is preferably 10 to 90% by mass of the total binder (inclusive of water-soluble polymers and latex polymers) of the surface protective layer or the back layer, and particularly preferably 20 to 80% by mass.

6) Layer-Surface pH

Before thermal development, the pH of the layer surface of the photothermographic material of the embodiment is preferably 7.0 or less, more preferably 6.6 or less. No particular restriction is imposed on the lower limit thereof, but the lower limit is approximately 3. The most preferred pH ranges from 4 to 6.2.

Preferably, a nonvolatile acid such as an organic acid (e.g., phthalic acid derivative) or sulfuric acid, or a volatile base such as ammonia, is employed for adjusting the pH on the layer surface so as to lower the pH on the layer surface. Ammonia, being volatile and be removable before the coating step or the thermal development, is particularly preferred for achieving a low pH on the layer surface. Combined use of ammonia with a nonvolatile base such as sodium hydroxide, potassium hydroxide, or lithium hydroxide is also preferred. A method of measuring the pH on the layer surface is described in paragraph No. 0123 of Japanese Patent Application No. 11-87297.

7) Hardening Agent

In the embodiment, a hardening agent may be used in each of the photosensitive layer, the protective layer, and the back layer.

Descriptions of the preferred hardening agent include: those on various methods described in "The Theory of the Photographic Process" written by T. H. James (and published by Macmillan Publishing Co., Inc, Fourth Edition, pp. 77–87, 1977). In addition to chrome alum, 2,4-dichloro-6-hydroxy-s-triazine sodium salt, N,N-ethylene-bis(vinylsulfonacetamide) or N,N-propylenebis(vinylsulfonacetamide), polyvalent metal ions described in ibid, page 78; polyisocyanates described in U.S. Pat. No. 4,281,060 and JP-A-6-208193; epoxy compounds described in U.S. Pat. No. 4,791, 042; and vinyl sulfone-base compounds described in JP-A-62-89048 are preferably used.

The hardening agent is added in the form of a solution. The timing of adding this solution to the coating solution for the protective layer is 180 minutes before coating to immediately before coating, preferably 60 minutes to 10 seconds before coating. No particular limitations are imposed on the mixing method and mixing conditions, insofar as the effect of the embodiment is satisfactorily brought out.

Specific examples of mixing methods include a method of mixing silver halide with the solution in a tank designed to give a desired average residence time which is calculated from the flow rate of addition and the feed rate to the coater, or a method using a static mixer as described in Chapter 8 of N. Harnby, F. Edwards, and A. W. Nienow (translated by Koji Takahashi), "Ekitai Kongo Gijutsu", Nikkan Kogyo Shinbun (1989).

8) Surfactant

Surfactants that can be used in the embodiment are described in paragraph No. 0132 of JP-A-11-65021.

In this embodiment, a fluorine surfactant is preferably used. Specific examples of the fluorine surfactant include compounds described in JP-A-10-197985, JP-A-2000-19680, and JP-A-2000-214554. Polymer fluorine surfactants described in JP-A-9-281636are also preferred. In the embodiment, fluorine surfactants described in JP-A-2000-206560 are particularly preferably used.

9) Antistatic Agent

In the embodiment, an anti-static layer that contains various known kinds of metal oxides or conductive polymers may be provided. The antistatic layer may serve as an undercoat layer, a back surface protective layer, or the like. It may also be provided independently. For the anti-static layer, techniques that can be applied include those described in paragraph No. 0135 of JP-A-11-65021, JP-A-56-143430, JP-A-56-143431, JP-A-58-62646, JP-A-56-120519, paragraph Nos. 0040 to 0051 of JP-A-11-84573, U.S. Pat. No. 5,575,957, and paragraph Nos. 0078 to 0084 of JP-A-11-223898.

10) Support

The transparent support is preferably polyester, particularly preferably polyethylene terephthalate, on which a thermal treatment has applied within a temperature range of 130 to 185° C. so as to relax the remaining internal distortion in the film during biaxial stretching, thereby eliminating thermal shrinkage distortion generated during thermal development.

Polyethylene naphthalate (PEN) is preferably used as a support of the photothermographic material which is used in combination with an ultraviolet-light-emitting screen, but the support is not limited thereto. A particularly preferred type of PEN is polyethylene-2,6,-naphthalate. Polyethylene-2,6-naphthalate according to the embodiment indicates those substantially composed of an ethylene-2,6-naphtalenedicarboxylate unit. That is, the polyethylene-2, 6-naphtalate in the embodiment encompasses not only non-copolymerized polyethylene-2,6-naphtalenedicarboxylate, but also other copolymers of which 5% or less is modified by other components, and mixtures and compositions with other polymers.

Polyethylene-2,6-naphtalate can be synthesized by polymerizing naphtalene-2,6-dicarboxylic acid or functional derivatives thereof, and ethylene glycol or functional derivatives thereof in the presence of catalyst under appropriate reaction conditions. However, the polyethylene-2,6-naphtalate according to the embodiment may include those to which an appropriate one or a plurality of kinds of a third constituent (modifying agent) have been added before the completion of polymerization of the polyethylene-2, 6-naphtalate so as to form a copolymer or a mixed polyester. Appropriate third constituents include compounds having a bivalent ester-forming group; e.g., oxalic acid; adipic acid; phthalic acid; terephtalic acid; naphtalene-2,7-dicarboxylic acid; succinate; dicarboxylic acids such as diphenyletherdicarboxylic acid or its lower alkylester; p-oxybenzoic acid; an oxycarboxylic acid such as p-oxyethoxybenzoic acid or its lower alkylester; or bivalent alcohol compounds such as propylene glycol or trimethyleneglycol. The polyethylene-2,6-naphtalate or its derivatized copolymer may be those whose terminal hydroxyl group and/or carboxyl group is blocked by a functional compound such as benzoic acid, benzoylbenzoic acid, benziloxybenzoic acid, or methoxypolyalkyleneglycol. Otherwise, it may be one of those modified by an extremely small amount of a trifunctional or quadrofunctional ester-forming compound such as glycelin or pentaerythritol within the range where a substantially linear copolymer can be obtained.

In the case of a photothermographic material for medical use, the transparent support may be colored with a blue dye (e.g., Dye-1 described in Example of JP-A-8-240877) or may be uncolored.

Specific examples of the support are described in paragraph No. 0134 of JP-A-11-65021.

Onto the support, an undercoating technology is preferably applied, such as water-soluble polyester described in JP-A-11-84574, a styrene-butadiene copolymer described in JP-A-10-186565, or a vinylidene chloride copolymer described in JP-A-2000-39684 and in paragraph Nos. 0063 to 0080 of JP-A-11-106881.

11) Other Additives

The photothermographic material may further contain an antioxidant, a stabilizer, a plasticizer, an ultraviolet absorber, and a coating aid. The solvent described in paragraph No. 0133 of JP-A-11-65021 may also be added. These various additives are added to either the photosensitive layer or the non-photosensitive layer. Detailed description thereof can be found in WO-98-36322, EP-A No. 803764A1, JP-A-10-186567, JP-A-10-18568, and the like.

12) Coating Method

In the embodiment, the photothermographic material may be coated by an arbitrary method. More specifically, there may be used any of various types of coating operations, including extrusion coating, slide coating, curtain coating, immersion coating, knife coating, flow coating, and extrusion coating using a hopper of the type described in U.S. Pat. No.2,681,294. The extrusion coating described in Stephen F. Kistler, and Peter M. Shweizer, "LIQUID FILM COATING", pp. 399 to 536 (Chapman & Hall, 1997) or slide coating is preferably used, and most preferably slide coating is used.

An example of the shape of a slide coater used in the slide coating is shown in FIG. 11b.1 of ibid, page 427. If desired, two or more layers may be simultaneously coated by means of a method described in ibid, pp. 399 to536, U.S. Pat. No. 2,761,791, and British Patent No. 837,095.

The coating solution for the organic-silver-salt-containing layer according to the embodiment is preferably so-called a thixotropic fluid. For this technique, reference can be made to JP-A-11-52509.

The viscosity of the coating solution for the organic-silver-salt-containing layer according to the embodiment at a shear rate of $0.1\ S^{-1}$ is preferably 400 to 100,000 mPa·s, more preferably 500 to 20,000 mPa·s.

Furthermore, the viscosity at a shear rate of $1000\ S^{-1}$ is preferably 1 to 200 mPa·s, and more preferably 5 to 80 mPa·s.

13) Packaging Material

In order to inhibit changes in photographic performance during preservation before use or to prevent the material from acquiring a tendency to curl or wind when stored in a roll state, the photothermographic material of the embodiment is preferably packed in an air-tight manner with a packaging material that exhibits low oxygen permeability and/or moisture permeability. Oxygen permeability at 25° C. is preferably 50 ml/atm/m²·day or less, more preferably 10 ml/atm/m²·day or less, and still more preferably 1.0 ml/atm/m²·day or less. Water permeability is preferably 10 g/atm/m²·day or less, more preferably 5 g/atm/m²·day or less, and still more preferably 1 g/atm/m²·day or less. Specific examples of a packaging material exhibiting low oxygen permeability and/or water permeability include those described in JP-A-8-254793 and JP-A-2000-206653.

14) Other Applicable Techniques

Examples of the technique which can be used in the photothermographic material of the embodiment include those described in EP No. 803764A1, EP No. 883022A1, WO-98-36322, JP-A-56-62648, JP-A-58-62644, JP-A-9-43766, JP-A-9-281637, JP-A-9-297367, JP-A-9-304869, JP-A-9-311405, JP-A-9-329865, JP-A-10-10669, JP-A-10-62899, JP-A-10-69023, JP-A-10-186568, JP-A-10-90823, JP-A-10-171063, JP-A-10-186565, JP-A-10-186567, JP-A-10-186569, JP-A-10-186570, JP-A-10-186571, JP-A-10-186572, JP-A-10-197974, JP-A-10-197982, JP-A-10-197983, JP-A-10-197985, JP-A-10-197986, JP-A-10-197987, JP-A-10-207001, JP-A-10-207004, JP-A-10-221807, JP-A-10-282601, JP-A-10-288823, JP-A-10-288824, JP-A-10-307365, JP-A-10-312038, JP-A-10-339934, JP-A-11-7100, JP-A-11-15105, JP-A-11-24200, JP-A-11-24201, JP-A-11-30832, JP-A-11-84574, JP-A-11-65021, JP-A-11-109547, JP-A-11-125880, JP-A-11-129629, JP-A-11-133536, JP-A-11-133537, JP-A-11-133538, JP-A-11-133539, JP-A-11-133542, JP-A-11-133543, JP-A-11-223898, JP-A-11-352627, JP-A-11-305377, JP-A-11-305378, JP-A-11-305384, JP-A-11-305380, JP-A-11-316435, JP-A-11-327076, JP-A-11-338096, JP-A-11-338098, JP-A-11-338099, JP-A-11-343420, JP-A-2000-187298, JP-A-2001-200414, JP-A-2001-234635, JP-A-2002-20699, JP-A-2001-275471, JP-A-2001-275461, JP-A-2000-313204, JP-A-2001-292844, JP-A-2000-324888, JP-A-2001-293864, and JP-A-2001-348546.

15) Color Image Formation

In the structure of a multi-color photothermographic material, a combination of two layers may be provided for each color. Alternatively, all the components may be contained in a single layer as described in U.S. Pat. No. 4,708,928.

In the case of a multi-color photothermographic material, respective emulsion layers are held separated from each other by use of a functional or nonfunctional barrier layer, as described in U.S. Pat. No. 4,460,681.

3. Image Forming Method 3-1. Exposure

The photothermographic material according to the embodiment may be of either a "single-sided type" wherein a image-forming layer is provided only on one side of the support, or a "double-sided type" wherein image-forming layers are provided on both sides of the support.

(Double-Sided Photothermographic Material)

The photothermographic material of the embodiment can be preferably used for an image-forming method making use of an X-ray intensifying screen.

The image-forming method preferably employs a photothermographic material whose sensitivity requires an exposure dosage ranging from $1\times10^{-6}$ to $1\times10^{-3}$ watt·sec/m², preferably $6\times10^{-6}$ to $6\times10^{-4}$ watt·sec/m², in order to provide a density of minimum density plus 0.5 for the image when the photothermographic material is exposed to monochromatic light having the same wavelength as that of the main light-emission peak of the radiation intensifying screen and a half width of 15±5 nm; subjected to thermal development; and the image-forming layer on the side opposite the exposure side is removed.

An image-forming process for forming an image by use of the photothermographic material comprises the following steps:
(a) a step of placing the photothermographic material between a pair of X-ray intensifying screens so as to obtain an image-forming combination;
(b) a step of placing an object between the combination and an X-ray generator;
(c) a step of radiating X-rays, whose energy level ranges from 25 to 125 kVp, onto the object;
(d) a step of extracting the photothermographic material from the combination; and
(e) a step of heating the extracted photothermographic material in the range of 90 to 180° C.

The silver halide photographic material used in a combination according to the embodiment is preferably prepared so that an image, which has been obtained from the image through stepwise-exposure to X-rays and thermal development, exhibits the following characteristic curve in relation to a characteristic curve defined in orthogonal coordinates having the optical density (D) and the exposure dose (log E) which are equal to each other in terms of unit length in the coordinate axis. Specifically, the characteristic curve is defined such that a mean gamma ($\gamma$) determined from a point of the minimum density (Dmin) plus a density of 0.1 and a point of the minimum density (Dmin) plus a density of 0.5 falls within the range of 0.5 to 0.9 and such that the mean gamma ($\gamma$) determined from a point of the minimum density (Dmin) plus a desnity of 1.2 and a point of the minimum density (Dmin) plus a density of 1.6 falls within the range of 3.2 to 4.0. When a photothermographic material having such a characteristic curve is employed for the radiographic system of the embodiment, there can be obtained a radiographic image with excellent characteristics of an extremely long leg portion and high gamma in the medium density region. The photographic characteristics are advantageous in that the depicting performance at low-density regions, such as a mediastinal section involving a low X-ray transmittance and a cardinal shadow, is enhanced. Even in the case of an image of the pulmonary area involving a high X-ray transmittance, a density of increased visibility as well as favorable contrast are achieved.

The photothermographic material having such a preferable characteristic curve can be easily manufactured by means of a method, for example, wherein each side of the image-forming layer comprises two or more silver halide emulsion layers having different sensitivities. Particularly preferably, the image-forming layer is formed by using a high-sensitivity emulsion on the upper layer, and an emulsion of low sensitivity and high contrast on the lower layer. In the case where such an image-forming layer comprising two layers is used, one layer has a sensitivity of 1.5- to 20-fold, preferably, 2- to 15-fold, that of the other layer. The ratio of the amounts of the emulsions used in each layer is determined from the differences in sensitivity and covering power of the applied emulsions. In general, the amount of the high-sensitivity emulsion to be used is reduced as the difference in sensitivity is increased. For instance, if one emulsion is twice as sensitive as the other and their covering powers are nearly the same, the ratio of the high-sensitivity emulsion to the low-sensitivity emulsion falls within a range of 1:20 to 1:5 in terms of the amount of silver.

As techniques for reducing crossover (for double-sided photosensitive material) and antihalation (for single-sided photosensitive material), the dye and mordant described in JP-A-2-68539 (page 13, line 1 of the lower left column, to page 14, line 9 of the lower left column) can be used.

Next, a fluorescent intensifying screen (radiation intensifying screen) according to the embodiment will be described in detail. The radiation intensifying screen is basically constituted of a support and a phosphor layer formed on one side thereof. The phosphor layer is a layer containing a phosphor dispersed in a binder. In addition, a transparent protective layer is generally provided on the surface of the phosphor layer (the side opposite the support) to protect the phosphor layer from chemical modification or physical impact.

Specific examples of a preferred phosphor in the embodiment include the following: tungstate-type phosphors (e.g., $CaWO_4$, $MgWO_4$, $CaWO_4$:Pb), terbium-activated rare earth metal oxysulfide-type phosphors [e.g., $Y_2O_2S$:Tb, $Gd_2O_2S$:Tb, $La_2O_2S$:Tb, (Y, Gd) $_2O_2S$:Tb, (Y,Gd) $_2O_2S$:Tb, Tm], terbium-activated rare earth element phosphate-type phosphors (e.g., $YPO_4$:Tb, $GdPo_4$:Tb, $LaPo_4$:Tb), terbium-activated rare earth element oxyhalogenide-type phosphors [e.g., LaOBr:Tb, LaOBr:Tb,Tm, LaOCl:Tb, LaOCl:Tb,Tm, LaOBr:Tb, GdOBr:Tb, GdOCl:Tb], thulium-activated rare earth element oxyhalogenide-type phosphors [e.g., LaOBr:Tm, LaOCl:Tm), barium sulfate-type phosphors [e.g., $BaSO_4$:Pb, $BaSO_4$:$Eu^{2+}$, (Ba, Sr) $SO_4$:$Eu^{2+}$], bivalent europium-activated alkaline-earth metal phosphate-type phosphors [e.g., $(Ba_2PO_4)_2$:$Eu^{2+}$, $(BaPO_4)_2$:$Eu^{2+}$)], bivalent europium-activated alkaline-earth metal halide-type phosphors [e.g., BaFCl:$Eu^{2+}$, BaFBr:$Eu^{2+}$, BaFCl:$Eu^{2+}$, Tb, BaFBr:$Eu^{2+}$, Tb, $BaF_2$.BaCl.KCl:$Eu^{2+}$, (Ba, Mg) $F_2$.BaCl.KCl:$Eu^{2+}$], iodide-type phophors (e.g., CsI:Na, CsI:Tl, NaI, KI:Tl), sulfide type phosphors [e.g., ZnS:Ag (Zn, Cd)S:Ag, (Zn, Cd)S:Cu, (Zn, Cd)S:Cu, Al], hafnium phosphate-type phosphors (e.g., $HfP_2O_7$:Cu), and Y $TaO_4$ and those to which various activating agents have been added as a luminescent center. However, the phosphors used in the embodiment are not limited thereto, and any phosphor can be used, so long as it exhibits light emission in the visible or near-ultraviolet region upon irradiation.

A radiation fluorescent intensifying screen preferably employed in the invention emits such light that 50% or more of the light has a wavelength falling within the range of 350 to 420 nm. Particularly, a phosphor contained in the radiation fluorescent intensifying screen is preferably a divalent Eu-activated phosphor, more preferably a divalent Eu-activated barium halide phosphor. A light-emission wavelength region is preferably 360 to 420 nm, more preferably 370 to 420 nm. Furthermore, a fluorescent screen more preferably emits 70% or more of light in the region, and further preferably 85% or more.

The ratio of the emitted light is calculated as follows. An emission spectrum is measured by taking a light-emission wavelength on the horizontal axis in antilogarithm at equal intervals, and emitted photon counts on the vertical axis. A value obtained by dividing an area ranging from 350 to 420 nm in the thus-obtained chart by an area of the entire emission spectrum is defined as a ratio having light emission in the wavelength region of 350 to 420 nm. When light is emitted in such wavelengths and the photothermographic material of the invention is used, high photosensitivity can be achieved.

Most of emitted light from phosphors falls within the above-mentioned wavelength region. Therefore, half bandwidth of the emitted light is preferably narrow. The half bandwidth is preferably 1 to 70 nm, more preferably 5 to 50 nm, further preferably 10 to 40 nm.

No particular limitation is imposed on the phosphor to be employed in the invention, so long as the above-mentioned light emission is obtained. However, the phosphor is preferably an Eu-activated phosphor whose light emission center is divalent Eu for attaining improvement in photosensitivity, which is one of the objects of the invention.

Specific examples of such a phosphor are set forth below, but the invention is not limited thereto:

BaFCl:Eu, BaFBr:Eu, BaFI:Eu, and halogen compositions thereof, $BaSO_4$:Eu, SrFBr:Eu, SrFCl:Eu, SrFI:Eu, (Sr, Ba)$Al_2Si_2O_8$:Eu, $SrB_4O_7F$:Eu, $SrMgP_2O_7$:Eu, $Sr_3(PO_4)_2$:Eu, $Sr_4P_2O_7$:Eu, or the like.

More preferred phosphors are divalent Eu-activated barium halide phosphors represented by a general formula of MX1X2:Eu, where Ba is a major component of M; however, a small amount of other compounds such as Mg, Ca, and Sr can be preferably contained. X1 and X2 represent halide atoms which can be arbitrarily selected from F, Cl, Br, and I. X1 is preferably fluorine. X2 can be selected form Cl, Br, and I, and a mixture of more than one of these halogen compositions can also be preferably used. Further preferably, X is Br. Eu serving as a light emission center is preferably contained in a ratio of from $10^{-7}$ to 0.1 in relation to Ba. More preferably, the content ranges from $10^{-4}$ to $0.05$. Mixing of a small amount of other compounds is also preferable. The most preferable phosphors include BaFCl:Eu, BaFBr:Eu, and BaFBrl-XIX:EU.

<Fluorescent Intensifying Screen>

A fluorescent intensifying screen is preferably constructed of a support, an undercoat layer provided on the support, a phosphor layer, and a surface protective layer.

The phosphor layer can be formed as follows: a dispersion is prepared by dispersing particles of the aforementioned phosphors in an organic solvent containing binder resin; subsequently, the dispersion is applied directly on a support (in the case where an undercoat layer such as a light-reflecting layer is provided, on the undercoat layer); and the applied dispersion is dried. The following alternative method may also be employed: a phosphor sheet is formed on a separately prepared temporary support by means of applying the above-mentioned dispersion and drying the applied dispersion; subsequently, the phosphor sheet is peeled off from the temporary support; and the phosphor sheet is provided on the support by use of adhesive.

No particular limitations are imposed on particle sizes of phosphor particles, which usually fall within the range of approximately 1 to 15 μm, preferably within the range of approximately 2 to 10 μm. A volume filling ratio of phosphor particles in the phosphor layer is preferably higher, and usually falls within the range of 60 to 85%, preferably 65 to 80%, particularly preferably 68 to 75%. (A ratio of phosphor particles in a phosphor layer is usually 80% by mass or higher, preferably 90% by mass or higher, particularly preferably 95% by mass or higher.) A variety of known references describe binder resins used for forming a phosphor layer, organic solvents, and a variety of arbitrarily employable additives. A thickness of the phosphor layer can be desirably set according to a target sensitivity; however, the thickness for a screen on the front side preferably falls within the range of 70 to 150 μm, and that for a screen on the back side preferably falls within a range of 80 to 400 μm.

Note that X-ray absorption ratio of the phosphor layer is determined by a coating amount of the phosphor particles.

The phosphor layer may be formed of a single layer, or two or more layers, and is preferably formed of one to three layers, more preferably one or two layers. For instance, layers containing phosphor particles of various particle sizes and of relatively narrow particle size distribution may be laminated. In such a case, there may be adopted an arrangement such that the closer the layer to the support, the smaller the particle sizes of the layer. Particularly preferably, the surface protective layer side is coated with large phosphor particles and the support side is coated with small phosphor particles. The small phosphor particles preferably have a size of 0.5 to 2.0 μm, and the large phosphor particles preferably have a size of 10 to 30 μm. Alternatively, the phosphor layer maybe formed by mixing phosphor particles of different particle sizes, or may be-a phosphor layer having a gradient particle size distribution with regard to phosphor particles as described in JP-A-55-33560 (page 3, line 3 of the left column, to page 4, line 39 of the left column). A variation coefficient of particle size distribution of phosphors usually falls within the range of 30 to 50%; however, monodisperse phosphor particles whose variation coefficient is 30% or lower can also be preferably employed.

An attempt has been made to obtain preferable sharpness with regard to light emission wavelengths by means of drying the phosphor layer. However, a layer is preferably designed so as to apply as little dying as possible. The absorption length of the phosphor layer is preferably 100 μm or longer, more preferably 1,000 μm or longer.

The scattering length is preferably designed so as to be 0.1 to 100 μm, more preferably 1 to 100 μm. The scattering length and the absorption length can be calculated from an expression derived from the Kubeluka-Munk theory, which will be described later.

A support to be employed can be desirably selected, according to purpose, from those employed in known radiation intensifying screens. For instance, there is preferably employed polymer films containing white pigments such as titanium dioxide or black pigments such as carbon black. An undercoat layer such as a light-reflecting layer containing light-reflecting material may be provided on the surface of the support (on the surface of the side where the phosphor layer is provided). Light-reflecting layers disclosed in JP-A-2001-124898 are also preferable. Particularly, the light-reflecting layer adopting yttrium oxide described in the first and the fourth embodiments of JP-A-2001-124898 are preferably employed. In relation to preferable light-reflecting layers, refer to descriptions in JP-A-2001-124898 (section 3, line 15 of the right column, to section 4, line 23 of the right column).

A surface protective layer is preferably provided on the surface of the phosphor layer. The scattering length measured in the main light emission wavelength of the phosphor preferably falls within the range of 5 to 80 μm, more preferably 10 to 70 μm, particularly preferably 10 to 60 μm. The term "scattering length" referred to here means an average distance over which light travels straight until it is scattered; wherein the shorter the scatter length, the more the light is scattered. The absorption length—which denotes a mean free distance in which light travels until being absorbed—is arbitrary. However, from the viewpoint of sensitivity of the screen, the surface protective layer preferably does not absorb light, because this leads to a drop in photosensitivity. However, as means to compensate for shortage in the scattering, the surface protective layer can be provided with fairly low absorbability. The absorption length is preferably 800 µm or longer, particularly preferably 1,200 µm or longer. The light scattering length and the light absorption length can be calculated from an expression derived from the Kubeluka-Munk theory by use of measured values which have been obtained in accordance with the following procedures.

First, three or more film samples having the same composition as the target surface protective layer and different thicknesses are obtained. Next, thicknesses (µm) and diffuse transmission factors (%) of the respective samples are measured. The diffuse transmission factor can be measured by means of a spectrophotometer provided with an integrating sphere. In the invention, measurement was performed by use of an automatic recording spectrophotometer (U-3210 model; manufactured by HITACHI Ltd.) provided with an integrating sphere of 150Φ (150-0901). In the measurement, the wavelength must correspond to the main light emission peak wavelength of the phosphor contained in the phosphor layer on which the target surface protective layer is provided. Subsequently, the film thickness (µm) and the diffuse transmittance (%) obtained in the above measurement are substituted into the following equation (A) derived from Kubeluka-Munk theory. The equation (A) can be easily derived, under the boundary condition giving the diffuse transmittance T (%), from equations 5.1.12 to 5.1.15 described "Keikotai Handbook," page 403, Ohm Publishing, 1987.

$$T/100 = 4\beta/[(1+\beta)^2 \cdot \exp(\alpha d) - (1-\beta)^2 \cdot \exp(-\alpha d)] \quad \text{(Equation A)},$$

where T denotes diffuse transmittance factor (%), "d" denotes film thickness (µm), and α and β are defined by the following equations, respectively:

$$\alpha = [K \cdot (K+2S)]^{1/2}, \text{ and}$$

$$\beta = [K/(K+2S)]^{1/2}.$$

The measured T (diffuse transmission factor: %) and "d" (film thickness: µm) of the three or more films are substituted in the above equation (A), where by values of K and S which satisfy equation (A) are determined. The scattering length (µm) is defined by 1/S, and the absorption length (µm) is defined by 1/K.

The surface protective layer is preferably configured such that light-scattering particles are contained in resin material in a dispersed manner. The light refractive index of the light-scattering particles is usually 1.6 or higher, preferably 1.9 or higher. A particle size of the light-scattering particles usually falls within the range of 0.1 to 1.0 µm. Examples of such a light-scattering particle include fine particles of aluminum oxide, magnesium oxide, zinc oxide, zinc sulfide, titanium oxide, niobium oxide, barium sulfide, lead carbonate, silicon oxide, polymethyl methacrylate, styrene, and melamine.

No particular limitations are imposed on resin materials used to form the surface protective layer; however, there is preferably employed polyethylene terephthalate, polyethylene naphthalate, polyamide, aramid, a fluorocarbon resin, polyester, or the like. The surface protective layer can be formed as follows: a dispersion is prepared by dispersing the aforementioned light-scattering particles in an organic solvent solution containing resin material (binder resin); subsequently, the dispersion is applied directly on the phosphor layer (alternatively, by way of an arbitrary auxiliary layer); and the applied dispersion is dried so as to obtain the surface protective layer. Alternatively, a protective layer sheet which has been separately formed may be provided on a phosphor layer by mediation of an adhesive. The thickness of the surface protective layer usually falls within the range of 2 to 12 µm, preferably 3.5 to 10 µm.

Detailed descriptions of the preferable manufacturing method for preparation of a radiation intensifying screen and materials therefor are given in JP-A-9-21899 (page 6, line 47 of the left column, to page 8, line 5 of the left column), and JP-A-6-347598 (page 2, line 17 of the right column, to page 3, line 33 of the left column) and (page 3, line 42 of the left column, to page 4, line 22 of the left column).

The fluorescent intensifying screen used in the embodiment preferably embeds phosphors having a gradient grain structure. Particularly preferably, the surface side of the protective layer is coated with large grains and the support side is coated with small size grains. Preferred size of the small grains is 0.5 to 2.0 µm, and that of the large grain is 10 to 30 µm.

(Single-sided Photothermographic Material)

A single-sided photothermographic material according to the embodiment is particularly preferably used as a photosensitive material for X-ray mammography.

Designing the photothermographic material for the use of the above purpose is particularly important, so as to provide images having an appropriate range of contrast.

For preferred component requirements for photosensitive materials for X-ray mammography, reference can be made to descriptions in JP-A-5-45807, JP-A-10-62881, JP-A-10-54900, and JP-A-11-109564.

(Combination with Ultraviolet Fluorescent Screen)

The image forming methods using the photothermographic material in the embodiment include a preferred method of forming an image by combined use with a phosphor having its main peak at 400 nm or less. A more preferred method is forming a virtual image by combined use with a phosphor having its main peak at 380 nm or less. Either the double-sided photo sensitive material or the single-sided material can be used as an assembly. The screen described in JP-A-6-11804 and WO-93-01521 can be used as a screen having its main light-emitting peak at 400 nm or less; however, such a screen is not limited thereto. As techniques for reducing crossover (for double-sided photosensitive material) and for antihalation (for single-sided photo sensitive material), the technique described in JP-8-78307 can be used. The dye described in Japanese Patent Application No. 2000-320809 is particularly preferable as an ultraviolet absorptive dye.

3-2. Thermal Development

The photothermographic material of the embodiment may be developed by any method, and in general the development is performed by elevating the temperature of an imagewise-exposed photothermographic material. The development temperature is preferably 80 to 250° C., more preferably 100 to 140° C.

The development time is preferably 1 to 60 seconds, more preferably 5 to 30 seconds, and particularly preferably 5 to 20 seconds.

In addition to the thermal development system according to the embodiment, a plate heater method may also be used as the thermal development system. In the thermal development system involving use of the plate heating system, the method disclosed in JP-A-11-133572 is preferred. Specifically, there is used a thermal development device in which a photothermographic material having a latent image formed thereon is brought into contact with a heating unit at a heat development portion, whereby a visible image is obtained.

The thermal development device includes a plate heater serving as the heating unit and a plurality of pressing rollers that are arranged along one surface of the plate heater and face the plate heater, such that thermal development is performed by allowing the photothermographic material to pass between the pressing rollers and the plate heater. The plate heater is divided into two to six sections serving as heating stages, and the temperature of a tip end portion is preferably lowered substantially, by 1 to 10° C. or thereabouts.

Such a method is also described in JP-A-54-30032, in which moisture and an organic solvent included in the photothermographic material can be removed outside of the system, and the support of the photothermographic material may be prevented from rapidly heating and deforming.

3-3. System

As a medical laser imager that is equipped with an exposure unit and a thermal development unit, a Fuji Medical Dry Imager model FM-DPL may be mentioned. Details of this system are described in Fuji Medical Review, No. 8, pp 39 to 55 and the techniques thereof may be utilized. Furthermore, the photothermographic material of the embodiment may be used as a photothermographic material for use in laser imagers in "AD network," which has been proposed by Fuji Medical System as a network system that conforms to the DICOM standard.

4. Use of the Embodiment

The photothermographic material according to the embodiment forms a monochrome silver image, and hence is preferably used as photothermographic material for use in medical diagnosis, industrial photography, printing, and COM (computer output microfilm).

The photothermographic material described hitherto will be described in detail by Examples; however, the photothermographic material is not limited thereto.

EXAMPLES

1. Preparation of PET Support, and Undercoating

1-1. Film Formation

From terephthalic acid and ethylene glycol, PET having intrinsic viscosity IV of 0.66 (as measured in phenol/tetrachloroethane=6/4 by weight at 25° C.) was produced in an ordinary manner. The obtained PET was pelletized, dried at 130° C. for 4 hours, colored blue with a blue die (1,4-bis-(2,6-diethylanilinoanthraquinone)), extruded from a T-die, and rapidly cooled, to thereby produce an unstretched film.

The resultant film was stretched to 3.3 times in the MD (machine direction) by use of a roll at different rotating speeds, then stretched to 4.5 times in the CD (cross direction) by use of a tenter. The temperatures for MD stretching and CD stretching were 110° C. and 130° C., respectively. Then, the film was thermally fixed at 240° C. for 20 seconds, and relaxed by 4% in the CD at the same temperature. Thereafter, after the chuck of the tenter was released, both edges of the film were knurled, and the film was rolled up under a pressure of 4 kg/cm$^2$ to thereby produce a rolled film having a thickness of 175 μm.

1-2. Surface Corona Treatment

By use of a solid-state corona discharge system, Model 6KVA (manufactured by Pillar Technologies), both surfaces of the support were subjected to corona treatment at room temperature and a speed of 20 m/min. From the values of the current and the voltage read from the system at this time, the support was found to have been processed at 0.375 kV·A·min/m$^2$. The frequency for the treatment was 9.6 kHz, and the gap clearance between an electrode and a dielectric roll was 1.6 mm.

1-3. Preparation of Undercoated Support (1) Preparation of Coating Solution for Undercoat Layer Prescription (1) (for an undercoat layer on the photosensitive layer side):

SnO$_2$/SbO (SnO$_2$:SbO=9:1 (by mass); mean particle size: 0.5 μm) 17% by mass dispersion: 84 g Pesuresin A-520 (manufactured by TAKAMATSU OIL & FAT Co., Ltd) 30% by mass solution: 46.8 g VYLONAL MD-1200 (manufactured by TOYOBO. Co. Ltd.): 10.4

Polyethylene glycol monononylphenyl ether (average ethylene oxide number=8.5) 1 mol % solution: 11.0 g MP-1000 (PMMA polymer fine particles; manufactured by Soken Chemical & Engineering Co., Ltd.; mean particle diameter: 0.4 μm): 0.91 g Distilled water: 847 ml After both surfaces of the biaxially stretched polyethylene terephthalate support (thickness: 175 μm) were subjected to corona discharge treatment in the same manner as described above, a coating solution of the undercoat layer (Prescription (1)) was applied on one side thereof by use of a wire bar, and then dried at 180° C. for 5 minutes so as to provide a wet coated amount of 6.6 ml/m$^2$ (per one surface). Then, the other side was subjected to the same treatment to there by prepare an undercoated support.

2. Preparation of Coating Materials

1) Silver Halide Emulsion (Preparation of Silver Halide Emulsion A)

To 1421 ml of distilled water, 4.3 ml of a 1% by mass potassium iodide solution was added, followed by further addition of 3.5 ml of sulfuric acid having a concentration of 0.5 mol/L, 36.5 g of phthalized gelatin, and 160 ml of a 5% by mass methanol solution of 2,2'-(ethylenediethio)diethanol. The resultant solution was heated, with stirring, in a stainless reaction vessel to a liquid temperature of 75° C., and an entirety of a solution A in which 22.22 g of silver nitrate had been diluted with distilled water to 218 ml was added thereto at a constant flow rate over 16 minutes, and a solution B in which 36.6 g of potassium iodide had been diluted to 366 ml with distilled water was added by the controlled double jet method while pAg was maintained at 10.2. Subsequently, 10 ml of a 3.5% by mass aqueous hydrogen peroxide solution was added and further, 10.8 ml of a 10% by mass aqueous solution of benzimidazole was added. Furthermore, a solution C in which 51.86 g of silver nitrate had been diluted with distilled water to 508.2 ml was added at a constant rate over 80 minutes. Simultaneously, a solution D in which 63.9 g of potassium iodide had been diluted with distilled water to 639 ml was added by the controlled double jet method while pAg was maintained at 10.2. After ten minutes have lapsed since addition of solutions C and D was started, potassium hexachloroiriddate (III) was added so as to attain a concentration of 1×10$^{-4}$ mol per mol of silver. Furthermore, after 5 seconds have lapsed since addition of the solution C was completed, an aqueous solution of potassium hexacyano ferrate (II) was added so as to attain a concentration of 3×10$^{-4}$ mol per mol of silver. Then, pH was adjusted to 3.8 with 0.5 mol/L sulfuric acid, and after stirring was stopped, the solution was subjected to precipitation/desalting/water washing steps. Furthermore, the pH was adjusted to 5.9 with 1 mol/L sodium hydroxide, whereby a silver halide dispersion having pAg of 11.0 was prepared.

The silver halide emulsion A consists of pure silver iodide grains, wherein tabular grains having a mean diameter of 0.93 μm of projected area, a variation coefficient of the projected area diameter of 17.7%, a mean thickness of 0.057 μm, and a mean aspect ratio of 16.3 made up 80% or more of the total projected area. The equivalent sphere diameter was 0.42 μm. X-ray powder diffraction analysis showed that 30% or more of the silver iodide existed in a gamma phase structure.

<<Preparation of Silver Halide Emulsion B>>

One mol of tabular grain silver iodide emulsion prepared as described in (Preparation of Silver Halide Emulsion A) was placed in a reaction vessel. The pAg measured at 38° C. was 10.2. Subsequently, a 0.5 mol/L KBr solution and a 0.5 mol/L AgNO$_3$ solution were added at 10 ml/minute over 20 minutes, whereby a 10 mol % solution of silver bromide was substantially deposited epitaxially on an AgI host emulsion. During the operation, pAg was maintained at 10.2. Then, the pH was adjusted to 3.8 with 0.5 mol/L sulfuric acid, and after stirring was stopped, the solution was subjected to precipitation/desalting/water washing steps. Furthermore, the pH was adjusted to 5.9 with 1 mol/L sodium hydroxide, whereby a silver halide dispersion having pAg of 11.0 was prepared.

While the silver halide dispersion was maintained at 38° C. with stirring, 5 ml of a 0.34% by mass methanol solution of 1,2-benzoisothiazolin-3-one was added thereto, and after 40 minutes, the mixture was heated to 47° C. After 20 minutes have lapsed since heating was performed, a methanol solution of sodium benzenethiosulfonate was added in an amount of $7.6 \times 10^{-5}$ per mol of silver. After five minutes, a methanol solution of Tellurium sensitizer C was added in an amount of $2.9 \times 10^{-5}$ mol per mol of silver, followed by ripening for 91 minutes. Then, 1.3 ml of a 0.8% by mass methanol solution of N,N'-dihydroxy-N''-diethylmelamine was added, and after 4 minutes, a methanol solution of 5-methyl-2-mercaptobenzimidazole in an amount of $4.8 \times 10^{-3}$ mol per mol of silver, a methanol solution of 1-phenyl-2-heptyl-5-mercapto-1,3,4-triazole in an amount of $5.4 \times 10^{-3}$ mol per mol of silver, and an aqueous solution of 1-(3-methylureidophenyl)-5-mercaptotetrazol in an amount of $8.5 \times 10^{-3}$ mol per mol of silver were added to thereby prepare a silver halide emulsion B.

<<Preparation of Silver Halide Emulsion C>>

To 1421 ml of distilled water, 8 ml of a 10% by mass potassium iodide solution was added, followed by further addition of 4.6 g of phthalized gelatin, and 160 ml of a 5% by mass methanol solution of 2.2'-(ethylenediethio) diethanol. The resultant solution was heated, with stirring, in a stainless reaction vessel to a liquid temperature of 75° C., and the entirety of a solution A in which 22.7 g of silver nitrate had been diluted with distilled water to 223 ml was added thereto at a constant flow rate over 15 minutes and 22 seconds, and a solution B in which 36.6 g of potassium iodide had been diluted to 366 ml with distilled water was added by the controlled double jet method while pAg was maintained at 9.96. Subsequently, 10 ml of a 3.5% by mass aqueous hydrogen peroxide solution was added and, further, 0.8 ml of a 10% by mass aqueous solution of benzimidazole was added. Furthermore, a solution C in which 53.1 g of silver nitrate had been diluted with distilled water to 520.2 ml was added at a constant rate over 80 minutes. Simultaneously, a solution D in which 63.9 g of potassium iodide had been diluted with distilled water to 639 ml was added by the controlled double jet method while pAg was maintained at 9.96. Ten minutes after the start of addition of solutions C and D, potassium hexachloroiridate (III) was added instantaneously so as to attain a concentration of $1 \times 10^{-4}$ mol per mol of silver. Also, five seconds after completion of the addition of Solution C, an aqueous potassium hexacyanoferrate (II) solution was added in an amount of $3 \times 10^{-4}$ mol per mol of silver. Subsequently, the pH was adjusted to 3.8 with 0.5 mol/L sulfuric acid and the stirring was stopped. The solution was subjected to precipitation/desalting/water washing steps. Furthermore, pH was adjusted to 5.9 with 1 mol/L sodium hydroxide, whereby a silver halide dispersion having a pAg of 11.0 was prepared.

The thus-obtained host grains were pure silver iodide emulsion, wherein tabular grains having a mean projected-area diameter of 1.36 μm, a variation coefficient of the mean projected-area diameter of 17.7%, a mean thickness of 0.113 μm, and a mean aspect ratio of 12.0 accounted for 80% or more of the total projected area. The equivalent sphere diameter was 0.68 μm. X-ray powder diffraction analysis showed that 15% or more of the silver halide assumed γ phase structure.

<Preparation of Silver Halide Emulsion D>

One mol of the above-mentioned AgI host grains was placed into a reaction vessel. The pAg measured at 40° C. was 9.1. Subsequently, a halogen solution containing 0.088 mol of KBr and 0.038 mol of NaCl per liter, and 0.125 mol/L AgNO$_3$ solution were added at 28.7 ml/minute over 31 minutes, whereby silver bromochloride having an amount of 10 mol % of the total amount of the silver was substantially deposited epitaxially on six corner points on the AgI host emulsion. During the operation, pAg was maintained at 7.13.

Then, the pH was adjusted to 3.8 with 0.5 mol/L sulfuric acid, and the stirring was stopped. The solution was subjected to precipitation/desalting/water washing steps. Furthermore, the pH was adjusted to 5.9 with 1 mol/L sodium hydroxide, whereby a silver halide dispersion having a pAg of 11.0 was prepared.

A mean halogen composition of the epitaxial portion, which had been obtained by applying a super-thin piece of the epitaxial portion of the silver halide grain on an analytical electron microscope of field emission type, was as follows: bromine 80 mol %, chlorine 17 mol %, and iodine 3 mol %.

While the silver halide dispersion was stirred and maintained at 38° C., 5 ml of a 0.34% by mass methanol solution of 1,2-benzisothiazolin-3-one was added. After 40 minutes, the mixture was heated to 60° C. Twenty minutes after the temperature reached 60° C., a methanol solution of sodium benzenethiosulfonate was added in an amount of $7.6 \times 10^{-5}$ per mol of silver. After five minutes, a methanol solution of tellurium sensitizer C was added in an amount of $2.9 \times 10^{-5}$ mol per mol of silver, followed by aging for 91 minutes. Subsequently, 1.3 ml of a 0.8% by mass methanol solution of N,N'-dihydroxy-N'',N'''-diethylmelamine was added, and after four minutes, a methanol solution of 5-methyl-2-mercaptobenzoimidazole was added in an amount of $4.8 \times 10^{-3}$ mol per mol of silver, along with a methanol solution of 1-phenyl-2-heptyl-5-mercapto-1,3,4-triazole in an amount of $5.4 \times 10^{-3}$ mol per mol of silver, and an aqueous solution of 1-(3-methylureidophenyl)-5-mercaptotetrazol in an amount of $8.5 \times 10^{-3}$ mol per mol of silver, to thereby prepare a silver halide emulsion D having an epitaxial bond.

<<Preparation of Emulsion Mixture for Coating>>

The silver halide emulsion B and the silver halide emulsion D were dissolved at a ratio of 5 to 1 in terms of silver molar ratio. A 1% by mass solution of benzothiazolium iodide was added thereto so as to attain a concentration of $7 \times 10^{-3}$ mol per mol of silver.

Further, there were added compounds 1, 2, and 3. capable of undergoing a one-electron oxidation to thereby form a one-electron oxidation product thereof, wherein the one-electron oxidation product is capable of releasing one or more electrons, so as to attain respective concentrations of $2 \times 10^{-3}$ mol per mol of silver.

Furthermore, compounds having an adsorptive group and a reducing group 1, 2, and 3 were added so as to attain respective concentrations of $8 \times 10^{-3}$ mol per mol of silver.

In addition, water was added so as to attain a final silver halide content of 15.6 g in terms of silver per liter of the emulsion mixture for coating.

2) Preparation of Aliphatic Acid Silver Dispersion

<Preparation of Recrystallization Behenic Acid>

One hundred kilograms of behenic acid (product name: Edenor C22-85R: manufactured by Henkel Corp.) was mixed with 1,200 kg of isopropyl alcohol, dissolved at 50° C. after filtering through a filter of 10 μm, and cooled to 30° C., to thereby be recrystallized. A cooling rate for recrystallization was controlled to 30° C./hr. The obtained grains were processed by centrifugal filtration, washed by pouring 100 kg of isopropyl alcohol, and then dried. When the obtained grains were esterized and subjected to GC-FID measurement, the content of behenic acid was found to be 96% by mass, and additionally lignoceric acid content was found to be 2%, arachidic acid content was found to be 2%, and erucic acid content was found to be 0.001%.

<Preparation of Aliphatic Acid Silver Dispersion>

Eighty-eight kg of recrystallized behenic acid, 442 L of distilled water, 49.2 L of an aqueous solution of 5 mol/L concentration sodium hydroxide, and 120 L of t-butyl alcohol were mixed, then stirred at 75° C. for 1 hour to induce a reaction, to thereby provide a solution of sodium behenate B. Separately, 206.2 L of an aqueous solution of 40.4 kg of silver nitrate (pH 4.0) was prepared and maintained at 10° C. A reaction vessel containing 635 L of distilled water and 30 L of t-butyl alcohol was maintained at 30° C., and the entire amount of the sodium behenate solution and the entire amount of the silver nitrate aqueous solution were added thereto under thorough stirring, at constant rates over a period of 93 minutes and 15 seconds and a period of 90 minutes, respectively. In this process, only the aqueous silver nitrate solution was added in a first 11-minute period following the start of addition of the aqueous silver nitrate solution. Then, addition of the sodium behenate solution was started, and only the sodium behenate solution was added for a 14-minute, 15-second period after completion of the addition of the aqueous silver nitrate solution. During this procedure, the outside temperature was controlled so as to maintain the internal temperature of the reaction vessel at 30° C. Piping in a feeding system of the sodium behenate solution was kept warm by circulating hot water in an outer portion of the double pipe, whereby the outlet liquid temperature at the end of the feed nozzle was adjusted to 75° C. Meanwhile, piping in a feeding system of the aqueous silver nitrate solution was kept warm by circulating cold water in an outer portion of the double pipe. Points from which the sodium behenate solution and aqueous silver nitrate solution were added were arranged symmetrically with respect to a stirring axis. The points were also arranged at such a height to avoid contact with the reaction solution.

After completion of the addition of the sodium behenate solution, the mixture was left at that temperature for 20 minutes under stirring. The reaction mixture was then heated to 35° C. over 30 minutes, followed by ripening for 210 minutes. Immediately after the completion of ripening, the solid content was filtered out by centrifugal filtration, and washed with water until the conductivity of the filtrate reached 30 μS/cm. In this manner, an aliphatic acid silver salt was obtained. The obtained solid content was not dried, but stored as wet cake.

The shape of the thus-obtained silver behenate grains was analyzed by electron microphotography. The grains were crystals having the following average size: a=0.21 μm, b=0.4 μm, and c=0.4 μm, having an average aspect ratio of 2.1 and an average sphere-equivalent coefficient of variation of 11% (a, b, and c are previously defined in this specification).

To the wet cake equivalent to 260 kg as solids, 19.3 kg of polyvinyl alcohol (Product name: PVA-217) and water were added to make 1000 kg in total, and the resultant mixture was formed into a slurry by use of a dissolver blade, and subjected to preliminary dispersing operation with a pipe line mixer (model PM-10: manufactured by Mizuho Kogyou Kabushiki Kaisha).

Then, the preliminarily dispersed stock solution was processed three times while a pressure of a disperser (Product name; Micro-Fluidzer M-610: manufactured by Microfluidex International Corporation and having a Z type interaction chamber) was adjusted to 1,150 kg/cm² to thereby obtain a silver behenate dispersion. In cooling operation, circularly jetting heat exchangers were provided before and after the interaction chamber. Accordingly, by adjusting the temperature of a coolant, the dispersion temperature was set at 18° C.

3) Preparation of Reducing Agent Dispersion

<<Preparation of Reducing Agent-1 Dispersion>>

Ten kg of water was added to a solution of 10 kg of reducing agent-1 (1,1-bis(2-hydroxy-3,5-dimethylphenyl)-3,5,5-trimethylhexa ne) and 16 kg of 10% by mass modified polyvinyl alcohol (Poval MP203: manufactured by Kuraray Co., Ltd.), and the resultant mixture stirred thoroughly to obtain a slurry. The resultant slurry was sent by a diaphragm pump and dispersed in a horizontal sand mill (UVM-2: manufactured by Aimex, Ltd.) filled with zirconia beads having an average diameter of 0.5 mm, and processed therein for 3 hours. Thereafter, 0.2 g of benzisothiazolinone sodium salt and water were added such that the concentration of the reducing agent became 25% by mass. The dispersion was heated at 60° C. for 5 hours, whereby a reducing-agent-1 dispersion was obtained. Particles of the reducing agent contained in the thus-obtained reducing agent dispersion had a median diameter of 0.40 μm and a maximum particle diameter of 1.4 μm or less. The resultant reducing agent dispersion was filtered through a polypropylene filter having a pore diameter of 3.0 μm for removal of foreign matter such as dust, then stored.

4) Preparation of Hydrogen-Bond-Forming Compound Dispersion

<<Preparation of Hydrogen-Bond-Forming Compound-1 Dispersion>>

Ten kg of water was added to a solution of 10 kg hydrogen-bond-forming compound-1 (tri(4-t-butylphenyl) phosphinoxide) and 16 kg of 10% mol by mass modified polyvinyl alcohol (Poval MP203: manufactured by Kuraray Co., Ltd.), and the resultant mixture was stirred thoroughly to obtain a slurry. The resultant slurry was sent by a diaphragm pump and dispersed in a horizontal sand mill (UVM-2: manufactured by Aimex, Ltd.) filled with zirconia beads having an average diameter of 0.5 mm, and processed therein for 4 hours. Thereafter, 0.2 g of benzisothiazolinone sodium salt and water were added such that a concentration of the hydrogen bond forming compound became 25% by mass. The resultant dispersion was heated at 40° C. for one hour, followed by heating at 80° C. for one hour to obtain a hydrogen-bond-forming compound-1 dispersion. Particles of the hydrogen-bond-forming compound contained in the thus-obtained hydrogen-bond-forming compound dispersion had a median diameter of 0.45 µm and a maximum particle diameter of 1.3 µm or less. The resultant hydrogen-bond-forming compound dispersion was filtered through a polypropylene filter having a pore diameter of 3.0 µm for removal of foreign matter such as dust, then stored.

5) Preparation of Development Accelerator Dispersion and Color-Tone-Controlling Agent Dispersion <<Preparation of Development Accelerator-1 Dispersion>>

Ten kg of water was added to a solution of 10 kg of development accelerator-1 and 20 kg of 10% mol by mass modified polyvinyl alcohol (Poval MP203: manufactured by Kuraray Co., Ltd.), and the resultant mixture was stirred thoroughly to obtain a slurry. The resultant slurry was sent by a diaphragm pump and dispersed in a horizontal sand mill (UVM-2: manufactured by Aimex, Ltd.) filled with zirconia beads having an average diameter of 0.5 mm, and processed therein for 3 hours and 30 minutes. Thereafter, 0.2 g of benzisothiazolinone sodium salt and water were added such that a concentration of the development accelerator became 20% by mass, thereby obtaining a development accelerator-1 dispersion. Particles of the development accelerator contained in the thus-obtained development accelerator dispersion had a median diameter of 0.48 µm and a maximum particle diameter of 1.4 µm or less. The resultant development accelerator dispersion was filtered through a polypropylene filter having a pore diameter of 3.0 m for removal of foreign matter such as dust, then stored.

Dispersions of a development accelerator 2 and a color-tone-controlling agent-1 were obtained in manners similar to that employed for development accelerator-1, whereby a 20% by mass dispersion and a 15% by mass dispersion were obtained, respectively.

6) Preparation of Polyhalogen Compound Dispersion

<<Preparation of Organic Polyhalogen Compound-1 Dispersion>>

Ten kg of organic polyhalogen compound-1 (tribromomethanesulfonyl-benzene), 10 kg of a 20% by mass aqueous solution of modified polyvinyl alcohol (Poval MP203: manufactured by Kuraray Co., Ltd.), 0.4 kg of a 20% by mass aqueous solution of sodium triisopropylnaphthalenesulfonate, and 14 kg of water were combined and stirred thoroughly to obtain a slurry. The resultant slurry was sent by a diaphragm pump and dispersed in a horizontal sand mill (UVM-2: manufactured by Aimex, Ltd.) filled with zirconia beads having an average diameter of 0.5 mm, and processed therein for 5 hours. Thereafter, 0.2 g of benzisothiazolinone sodium salt and water were added such that a concentration of the organic polyhalogen compound became 30% by mass, thereby obtaining an organic polyhalogen compound-1 dispersion. Particles of the organic polyhalogen compound contained in the thus-obtained polyhalogen compound dispersion had a median diameter of 0.41 µm and a maximum particle diameter of 2.0 µm or less. The resultant organic polyhalogen compound dispersion was filtered through a polypropylene filter having a pore diameter of 10.0 µm for removal of foreign matter such as dust, then stored.

<<Preparation of Organic Polyhalogen Compound-2 Dispersion>>

Ten kg of organic polyhalogen compound-2 (N-butyl-3-tribromomethanesulfonylbenzoamide), 20 kg of a 10% by mass aqueous solution of modified polyvinyl alcohol (Poval. MP203: manufactured by Kuraray Co., Ltd.), and 0.4 kg of a 20% by mass aqueous solution of sodium triisopropylnaphthalenesulfonate were combined and stirred thoroughly to obtain a slurry. The resultant slurry was sent by a diaphragm pump and dispersed in a horizontal sand mill (UVM-2: manufactured by Aimex, Ltd.) filled with zirconia beads having an average diameter of 0.5 mm, and processed therein for 5 hours. Thereafter, 0.2 g of benzisothiazolinone sodium salt and water were added such that a concentration of the organic polyhalogen compound became 30% by mass. The dispersion was heated at 40° C. for 5 hours, whereby an organic polyhalogen compound-2 dispersion was obtained. Particles of the organic polyhalogen compound contained in the thus-obtained polyhalogen compound dispersion had a median diameter of 0.40 µm and a maximum particle diameter of 1.3 µm or less. The resultant organic polyhalogen compound dispersion was filtered through a polypropylene filter having a pore diameter of 3.0 µm for removal foreign matter such as dust, then stored.

7) Preparation of Silver-Iodide-Complex-Forming Agent

Eight kg of modified polyvinyl alcohol "MP203" was added to 174.57 kg of water, followed by 3.15 kg of a 20% mol by mass aqueous solution of sodium triisopropylnaphthalenesulfonate and 14.28 kg of 70% mol by mass solution of 6-isopropylphthalazine, thereby obtaining a 5% by mass solution of silver-iodide-complex-forming agent compound.

8) Preparation of Mercapto Compound (Preparation of Mercapto Compound)

<<Preparation of Mercapto Compound-1 Aqueous Solution>>

Seven g of mercapto compound-1(1-(3-sulfophenyl)-5-mercaptotetrazole sodium salt) was dissolved in 993 g of water, to prepare a 0.7% by mass aqueous solution.

<<Preparation of Mercapto Compound-2 Aqueous Solution>>

Twenty g of mercapto Compound-2(1-(3-methylureide)-5-mercaptotetrazole sodium salt) was dissolved in 980 g of water, to prepare a 2.0% by mass aqueous solution.

9-1) Preparation of SBR Latex Solution

An SBR latex solution (TP-1) was prepared as follows.

Into a polymerization vessel of a gas monomer reactor (TAS-2J Model: manufactured by Taiatu Techno Corp.), 287 g of distilled water, 7.73 g of a surfactant (Pionin A-43-S: manufactured by Takemoto oil&fat Co., Ltd.), 14.06 ml of an aqueous solution of 1 mol/L sodium hydroxide, 0.15 g of sodium ethylenediamine tetraacetate, 255 g of styrene, 11.25 g of acrylic acid, and 3.0 g of tert-dodecylmercaptan were added, then, the reactor was sealed in an airtight manner, and the mixture stirred at 200 rpm. After evacuation by a vacuum pump and several repetitions of flushing with nitrogen gas, 108.75 g of 1,3-butadiene was charged into the reactor, while the inner temperature was elevated to 60° C. A solution of 1.875 g of ammonium persulfate dissolved in 50 ml of water was added to the mixture, under continuous stirring for 5 hours. The internal temperature was further elevated to 90° C., under stirring for 3 hours. After completion of the reaction, the internal temperature was lowered to room temperature, then, the pH was adjusted to 8.4 with 1 mol/L solution of LiOH. Thereafter, the solution was filtered through a polypropylene filter having a pore diameter of 1.0 μm for removal of foreign matter, followed by storing, whereby 774.7 g of the SBR latex TP-1 was obtained. Measurement of the halogen ion concentration by ion chromatography revealed that the concentration of chloride ion was 3 ppm. The concentration of a chelating agent was measured by high-speed liquid chromatography and found to be 145 ppm.

The latex had a mean particle diameter of 90 nm, a Tg of 17° C., a solid concentration of 44% by mass, an equilibrium moisture content of 0.6% by mass at 25° C. and 60% RH, an ionic conductivity of 4.80 mS/cm (ionic conductivity was measured with a conductometer CM-30S manufactured by Toa Denpa Kogyo Co., at 25° C.).

9-2) Preparation of Isoprene Latex Solution

An isoprene latex solution (TP-2) was prepared as follows.

Into a polymerization vessel of a gas monomer reactor (TAS-2J Model: manufactured by Taiatu Techno Corp.), 1,500 g of distilled water was added, and the water was heated at 90° C. for three hours, thereby applying passivation coating on stainless surfaces of the polymerization vessel or members of a stainless stirrer. Into the polymerization vessel subjected to the above processing, 582.28 g of distilled water in which nitrogen gas had been bubbled for one hour, 9.49 g of a surfactant (Pionin A-43-S: manufactured by Takemoto oil&fat Co., Ltd.), 19.56 g of an aqueous solution of 1 mol/L sodium hydroxide, 0.20 g of sodium ethylenediamine tetraacetate, 314.99 g of styrene, 190.87 g of isoprene, 10.43 g of acrylic acid, and 2.09 g of tert-dodecylmercaptan were added, then, the reactor was sealed in an airtight manner, and the mixture was stirred at 225 rpm. A solution of 2.61 g of ammonium persulfate dissolved in 40 ml of water was added to the mixture, under continuous stirring for 6 hours. Measurement of solid content confirmed that the monomer-to-polymer conversion ratio at this time was 90%. At this time, a solution of 5.22 acrylic acid dissolved in 46.98 g of water was added, 10 g of water was subsequently added, and a solution of 1.30 g of ammonium persulfate dissolved in 50.7 ml of water was further added. After completion of the addition, the mixture was heated to 90° C., followed by stirring for 3 hours. After completion of the reaction, the internal temperature was lowered to room temperature, then, the pH was adjusted to 8.4 with 1 mol/L solution of LiOH. Thereafter, the solution was filtered through a polypropylene filter having a pore diameter of 1.0 m for removal of foreign matter, followed by storing, whereby 1,248 g of the isoprene latex TP-1 was obtained. Measurement of the halogen ion concentration by ion chromatography revealed that the concentration of chloride ion was 3 ppm. The concentration of a chelating agent was measured by high-speed liquid chromatography and found to be 142 ppm.

The latex had a mean particle diameter of 113 nm, a Tg of 15° C., a solid concentration of 41.3% by mass, an equilibrium moisture content of 0.4% by mass at 25° C. and 60% RH, and an ionic conductivity of 5.23 mS/cm (ionic conductivity was measured with a conductometer CM-30S manufactured by Toa Denpa Kogyo Co., at 25° C.).

10) Preparation of Nucleating Agent Dispersion

To 10 g of compound No. SH-7 serving as a nucleating agent, 2.5 g of polyvinyl alcohol (PVA-217: manufactured by Kuraray Co., Ltd.) and 87.5 g of water were added, and the resultant mixture was thoroughly mixed, and left as a slurry for three hours. Subsequently, the resultant slurry and 240 g of zirconia beads of 0.5 mm diameter were put together into a vessel and dispersed for 10 hours in a dispersing machine (1/4G sand grinder mill: manufactured by AIMEX Corp.), thereby preparing a solid fine particle dispersion of the nucleating agent. Particle sizes of 80% by mass of the particles fell within a range of 0.1 μm to 1.0 μm, and mean particle size was 0.5 μm.

1-3-2. Preparation of Coating Solution

1) Preparation of Coating Solution for Emulsion Layer (Photosensitive Layer)-1

To a mixture of 1,000 g of aliphatic acid silver dispersion prepared as described above and 276 ml of water, organic polyhalogen compound-1 dispersion, organic polyhalogen compound-2 dispersion, phthalazine compound-1 solution, SBR latex (TP-1) solution, isoprene latex (TP-2) solution, reducing agent-1 dispersion, nucleating agent dispersion, hydrogen-bond-forming compound-1 dispersion, development accelerator-1 dispersion, development accelerator-2 dispersion, development accelerator-3 dispersion, color-tone-controlling agent-1 dispersion, and mercapto compound-2 aqueous solution were sequentially added, followed by addition of silver-iodide-complex-forming agent. Immediately before the coating, silver halide mixture emulsion was added so as to attain a concentration of 0.22 mol per mol of aliphatic acid silver in terms of silver amount, and the resultant mixture was thoroughly stirred. The resultant coating solution for emulsion layer was sent as it was to a coating die and used for coating.

In a measurement using a Brookfield viscometer manufactured by Tokyo Keiki Kogyo K.K., the coating solution for emulsion layer exhibited a viscosity of 25 [mPa·s] at 40° C. (No. 1 rotor, 60 rpm).

The viscosities of the coating solution measured at 25° C. using RFS Field Spectrometer (manufactured by Rheometrics Far East K.K.) were 242, 65, 48, 26, and 20 [mPa·s] at shear rates of 0.1, 1, 10, 100 and 1,000 [1/sec], respectively.

The content of zirconium in the coating solution was 0.52 mg per gram of silver.

2) Preparation of Interlayer Coating Solution on Emulsion Surface

To a mixture of 1,000 g of polyvinyl alcohol PVA-205 (manufactured by Kuraray Corp.) and 4,200 ml of 19% by mass solution of methylmethacrylate/styrene/butylacrylate/hydroxyethyl-meth acrylate/acrylic acid copolymer (copolymerization ratio by mass=64/9/20/5/2) latex, 27 ml of an aqueous solution of 5% by mass Aerosol OT (manufactured by American Cyanamid Company), 135 ml of an aqueous solution of 20% by mass of diammonium phthalate, and water were added to prepare 10,000 g in total while pH was adjusted to 7.5 by adding NaOH, thereby obtaining an interlayer coating solution. The resultant coating solution was sent to a coating die at 9.1 ml/m².

The coating composition had a viscosity of 58 mPa·s measured at 40° C. with a Brookfield viscometer (No. 1 rotor, 60 rpm).

3) Preparation of Coating Solution for First Protective Layer

Sixty-four grams of inert gelatin were dissolved in water, to which 112 g of a 19.0% by mass solution of methylmethacrylate/styrene/butylacrylate/hydroxyethylmetha crylate/acrylic acid copolymer (with copolymerization ratio by mass of 64/9/20/5/2) latex, 30 ml of a methanol solution of 15% by mass phthalic acid, 23 ml of an aqueous solution of 10% by mass 4-methylphthalic acid, 28 ml of 0.5 mol/L concentration sulfuric acid, 5 ml of an aqueous solution of 5% by mass Aerosol OT (manufactured by American Cyanamid Company), 0.5 g of phenoxy ethanol, 0.1 g of benzisothiazolinone, and water were added to prepare 750 g in total, thereby obtaining a coating solution. By use of a static mixer, the coating solution was mixed with 26 ml of 4% by mass of chrome alum immediately before coating, and sent to a coating die at 18.6 ml/m$^2$.

The coating composition had a viscosity of 20 mPa·s measured at 40° C. with a Brookfield viscometer (No. 1 rotor, 60 rpm).

4) Preparation of Coating Solution for Second Protective Layer

Eighty grams of inert gelatin was dissolved in water, to which 102 g of a 27.5% by mass solution of methylmethacrylate/styrene/butylacrylate/hydroxyethylmetha crylate/acrylic acid copolymer (copolymerization ratio by mass=64/9/20/5/2) latex, 5.4 ml of a 2% by mass solution of fluorinated surfactant (F-1), 5.4 ml of a 2% by mass solution of fluorinated surfactant (F-2), 23 ml of an aqueous solution of 5% by mass Aerosol OT (manufactured by American Cyanamid Company), 4 g of fine particles (mean particle diameter: 0.7 μm, distribution of volume weighted average: 30%) of polymethylmethacrylate, 21 g of fine particles (mean particle diameter: 3.6 μm, distribution of volume weighted average: 60%) of polymethylmethacrylate, 1.6 g of 4-methylphthalic acid, 4.8 g of phthalic acid, 44 ml of 0.5 mol/L concentration sulfuric acid, 10 mg of benzisothiazolinone, and water were added to prepare 650 g in total, followed by further addition of 445 ml of an aqueous solution containing 0.67% by mass phthalic acid, and then mixed by use of a static mixer immediately before the coating, whereby a coating solution of protective layer was prepared. The coating solution was sent to a coating die at 8.3 ml/m$^2$.

The coating composition had a viscosity of 19 mPa·s measured at 40° C. with a Brookfield viscometer (No. 1 rotor, 60 rpm).

1-4. Preparation of Photothermographic Material-1

On both sides of the support, an image-forming layer, an interlayer, a first surface protective layer, and a second surface protective layer were simultaneously coated in the named given from the undercoat surface by means of coating with sliding beads, whereby photothermographic material samples 1 to 7 were prepared. During the above step, the temperatures of the image-forming layer and the interlayer were adjusted to 31° C., that of the first surface protective layer was adjusted to 36° C., and that of the second surface protective layer was adjusted to 37° C. An amount of coated silver of one side of the support, in terms of a total of aliphatic silver and silver halide per one side of the support, was 0.861 g/m$^2$; and that of the both sides; i.e., a total for the entire image-forming layer, was 1.72 g/m$^2$.

Total coated amount (g/m$^2$) of each compound per one side of the image-forming layer is shown below:

| | |
|---|---|
| Aliphatic silver (on silver basis): | 0.686 |
| Polyhalogen compound-1: | 0.028 |
| Polyhalogen compound-2: | 0.094 |
| Silver-iodide-complex-forming agent: | 0.46 |
| SBR latex: | 5.20 |
| SBR latex (TP-1): | 2.09 |
| Isoprene latex (TP-2): | 3.13 |
| Reducing agent: | 0.46 |
| Nucleating agent-1: | 0.036 |
| Hydrogen-bond-forming compound-1: | 0.15 |
| Development accelerator-1: | 0.005 |
| Development accelerator-2: | 0.035 |
| Color-tone-controlling agent-1: | 0.002 |
| Mercapto compound-1: | 0.001 |
| Mercapto compound-2: | 0.003 |
| Silver halide (on Ag basis): | 0.175 |

The conditions for coating and drying were as follows. The support was destatized by means of anion wind before coating. Coating was applied at a rate of 160 m/min. The coating and drying conditions for each sample were adjusted within the following range so as to obtain the most stable surface condition.

The clearance between the end of the coating die and the support was set to be 0.10 to 0.30 mm;

the pressure of the decompression chamber was set to be lower than the atmospheric pressure by 196 to 882 Pa;

in a subsequent chilling zone, the film was cooled with a wind at a dry bulb temperature of 10 to 20° C.;

the film was transported without contact and dried with a dry wind having a dry-bulb temperatures of 23 to 45° C. and a wet-bulb temperatures of 15 to 21° C.;

after drying, the film was conditioned for moisture content at 40 to 60% RH and 25° C.;

subsequently, the film was heated so that the film surface temperature became 70 to 90° C., and after heating, the film surface was cooled to 25° C.

The thus-prepared photothermographic material had a matting degree, in terms of the Beck smoothness, of 250 seconds. Furthermore, measurement showed that the pH on the layer surface on the photosensitive layer side was 6.0.

Chemical structures of the compounds used in Examples of the embodiment are shown below.

Tellurium Sensitizer C

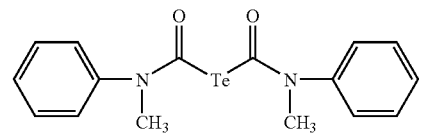

Compound Capable of an Undergoing One-Electron Oxidation to Thereby Form a One-Electron Oxidation Product Thereof, Wherein the One-Electron Oxidation Product Is Capable of Releasing One Or More Electrons 1

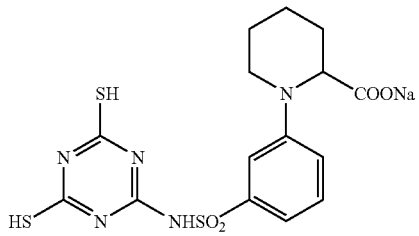

Compound Capable of an Undergoing One-Electron Oxidation to Thereby Form a One-Electron Oxidation Product Thereof, Wherein the One-Electron Oxidation Product Is Capable of Releasing One Or More Electrons 2

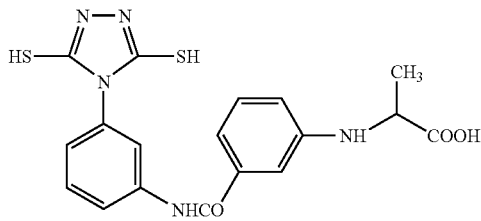

Compound Capable of an Undergoing One-Electron Oxidation to Thereby Form a One-Electron Oxidation Product Thereof, Wherein the One-Electron Oxidation Product Is Capable of Releasing One Or More Electrons 3

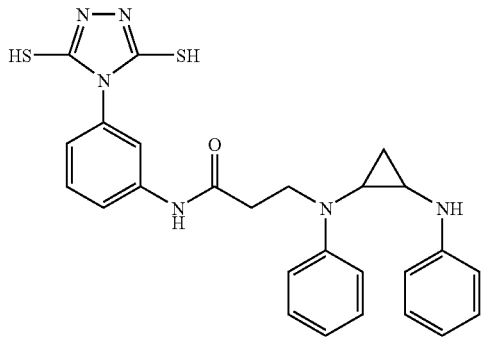

Compounds Having an Adsorptive Group and a Reducing Group 1

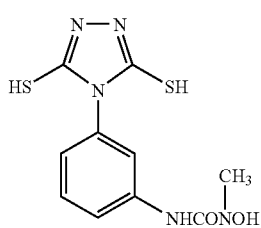

Compounds Having an Adsorptive Group and a Reducing Group 2

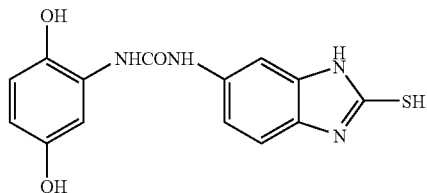

Compounds Having an Adsorptive Group and a Reducing Group 3

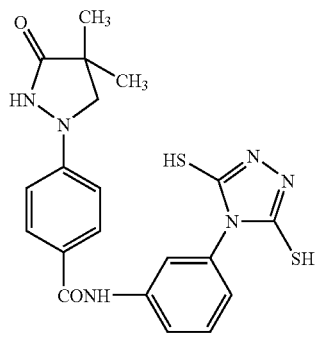

(Reducing Agent-1)

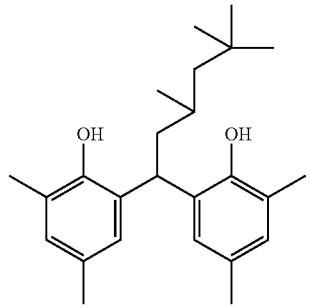

(Hydrogen-Bond-Forming Compound-1)

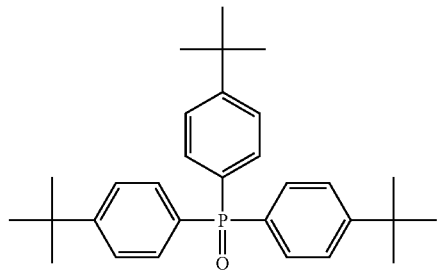

(Polyhalogen Compound-1)

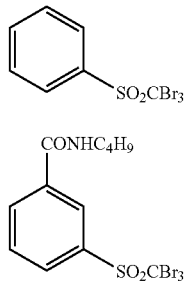

(Polyhalogen Compound-2)

-continued (Mercapto Compound-1)

(Mercapto Compound-2)

(Silver-iodide-complex-forming agent)

(Development accelerator-1)

(Development accelerator-2)

(Color-tone-controlling agent-1)

(F-1)

-continued (F-2)

(Evaluation of Photographic Properties)

The resultant sample was cut into a half-cut size, wrapped with the following packaging material. under an environment of 25° C. and 50% RH, and stored for 2 weeks at room temperature. Following storage, the sample was subjected to the following evaluations.

(Packaging Material)

PET (10 μm)/PE (12 μm)/aluminum foil (9 μm)/Ny (15 μm)/polyethylene having a carbon content of 3% (50 μm), Oxygen permeability: 0.02 mL/atm·m$^2$·25° C.·day, Moisture permeability: 0.10 g/atm·m$^2$·25° C.·day The thus-prepared double-sided coating photosensitive material was evaluated as follows.

A sample was sandwiched between two sheets of the fluorescent intensifying screen A described below, to thereby fabricate a combination for image formation. The combination was subjected to X-ray radiation for 0.05 seconds in order to perform X-ray sensitometry by use of an X-ray system, DRX-3724HD (manufactured by TOSHIBA CORPORATION) with a tungsten target. X-rays, emitted by applying an electric potential of 80 kVp to the apparatus by means of a three-phase pulse generator, were allowed to pass through a filter of water of 7 cm thickness having absorption approximately equivalent to that of a human body. The thus obtained X-ray was used as a light source. Stepwise exposure was conducted with a step width of "log E=0.15" by means of changing an amount of X-ray exposure by means of a distance method. After exposure, the material was subjected to thermal development processing by means of the thermal developing apparatus of the invention. The thus-obtained image was evaluated with a densitometer.

<Preparation of Fluorescent Intensifying Screen A>

(1) Preparation of Undercoat Layer

In the same manner as in the Example 4 of JP-A-2001-124898, a light-reflecting layer, whose thickness was 50 μm after drying and which was made of alumina powder, was formed on 250 μm-thick polyethylene terephthalate (i.e., a support).

(2) Preparation of Phosphor Sheet

A coating solution for forming a phosphor layer having a viscosity of 25 PS (at 25° C.) was prepared by adding 250 g of BaFbr:Eu phosphor (mean particle size: 3.5 μm); 8 g of polyurethane binder resin (Pandex T5265M, manufactured by DAINIPPON INK AND CHEMICALS, Inc.); 2 g of epoxy binder resin (Epikote 1001, manufactured by Japan Epoxy Resins Co.,Ltd.); and 0.5 g of isocyanate compound (Colonate HX, manufactured by NIPPON POLYURETHANE INDUSTRY Co., Ltd.) into methyl ethyl ketone, and mixing by use of a propeller mixer. The coating solution was applied onto a temporary support (a polyethylene terephthalate sheet on which a silicon releasing agent had been coated beforehand), and dried to form a phosphor layer. The phosphor layer was peeled off from the temporary support, whereby a phosphor sheet was obtained.

(3) Fixing Phosphor Sheet onto Light-Reflecting Layer

The phosphor sheet prepared as described above was placed on the support with the light-reflecting layer which had been prepared in the above process (1), and pressed by means of a calendar roll at a pressure of 400 kgw/cm² at 80° C., thereby fixed the phosphor layer on the light-reflecting layer. The thickness of the resultant phosphor layer was 125 µm, and the volume filling ratio of the phosphor particles in the phosphor layer was 68%.

(4) Preparation of Surface Protective Layer

A polyester adhesive was applied on one side of a 6 µm-thick polyethylene terephtalate, whereby a surface protective layer was provided on the phosphor layer in a laminating manner. Consequently, a fluorescent intensifying screen A formed from the support, the light-reflecting layer, the phosphor layer, and the surface protective layer was obtained as described above.

(5) Light-Emitting Characteristic

FIG. 4 shows a light-emission spectrum of the fluorescent intensifying screen A measured with X-ray radiation at 40 kVp. The fluorescent intensifying screen A showed a light-emission of narrow half bandwidth having its peak at 390 nm.

Meanwhile, a conventional photosensitive material for wet developing method RX-U (manufactured by Fuji Photo Film Co., Ltd.) was subjected to exposure by use of two sheets of X-ray regular screen HI-SCREEN B3 (light-emission peak wavelength: 425nm; $CaWO_4$ being used as a phosphor) (manufactured by Fuji Photo Film Co., Ltd.) under the same conditions as described hitherto, and then processed by use of an Auto Processor CEPROS M2 (manufactured by Fuji Photo Film Co., Ltd.) with processing solution CE-D1 for 45 seconds.

The photographic properties of the images obtained by use of the photothermographic material according to the embodiment and those obtained by use of a wet developing method were compared and found to have similar preferable properties.

As has been described, according to the above structure, in addition to the original usage of a thermal development unit which performs exposure and development of CT films within a single unit, thermal development of double-sided photosensitive films can also be performed. Therefore, it can eliminate purchase of a development apparatus dedicated to double-sided photosensitive films, as well as the installation space that would be required. In addition, this thermal development apparatus is also capable of film loading, and does not require a skilled person for loading of raw films.

The entire disclosure of each and every foreign patent application from which the benefit of foreign priority has been claimed in the present application is incorporated herein by reference, as if fully set forth.

What is claimed is:

1. A thermal development apparatus comprising:
   a photothermographic recording material feed section that contains a supply tray in the photothermographic recording material feed section, the supply tray being for containing a photothermographic recording material;
   an exposure section that subjects the photothermographic recording material to exposure;
   a first conveyance section that conveys the photothermographic recording material from the supply tray to the exposure section;
   a thermal development section that effects thermal development of the photothermographic recording material;
   a second conveyance section that conveys the photothermographic recording material from the exposure section to the thermal development section;
   a cassette storage section that contains a cassette, the cassette being for containing a double-sided photothermographic recording material having image forming layers on both sides of the double-sided photothermographic recording material; and
   a third conveyance section that conveys the double-sided photothermographic recording material from the cassette to the first conveyance section.

2. The thermal development apparatus according to claim 1, wherein the thermal development section comprises a heating section that heats both front and back sides of the photothermographic recording material passing through a conveyance path.

3. The thermal development apparatus according to claim 2, wherein the heating section is a combination of a curved plate heater and heated pressing rollers which are arranged close to the curved plate heater.

4. The thermal development apparatus according to claim 2, wherein the heating section is a combination of a heating drum and heating rollers which are arranged close to a surface of the heating drum.

5. The thermal development apparatus according to claim 2, wherein a conveyance speed of the double-sided photothermographic recording material while passing through the heating section, the double-sided photothermographic recording material being from the cassette, is set at a different speed from that of the photothermographic recording material while passing through the heating section, the photothermographic recording material being from the supply tray.

6. The thermal development apparatus according to claim 2, wherein, a temperature of the double-sided photothermographic recording material while passing through the heating section, the double-sided photothermographic recording material being from the cassette, is set at a different temperature from that of the photothermographic recording material while passing through the heating section, the photothermographic recording material being from the supply tray.

7. The thermal development apparatus according to claim 1, wherein the third conveyance section comprises a photothermographic recording material detection sensor, and an operation of the exposure section is switched ON or OFF based on an output of the photothermographic recording material detection sensor.

8. The thermal development apparatus according to claim 1, wherein, at the exposure section, an apparatus information of the thermal development apparatus is recorded on the photothermographic recording material from the supply tray and on the double-sided photothermographic recording material from the cassette.

9. The thermal development apparatus according to claim 1, wherein the first conveyance section and second conveyance section are operable to convey the photothermographic recording material from the supply tray to the cassette.

10. The thermal development apparatus according to claim 1, wherein an operation of the exposure section is deactivated in the case where the double-sided photothermographic recording material is subjected to thermal development.

* * * * *